(12) United States Patent
Shen et al.

(10) Patent No.: US 8,811,509 B2
(45) Date of Patent: Aug. 19, 2014

(54) FORWARD ERROR CORRECTION (FEC) M-BIT SYMBOL MODULATION

(75) Inventors: Ba-Zhong Shen, Irvine, CA (US); Avi Kliger, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 406 days.

(21) Appl. No.: 13/239,841

(22) Filed: Sep. 22, 2011

(65) Prior Publication Data

US 2012/0300861 A1  Nov. 29, 2012

Related U.S. Application Data

(60) Provisional application No. 61/490,046, filed on May 25, 2011.

(51) Int. Cl.
*H04L 5/12* (2006.01)
*H04L 23/02* (2006.01)

(52) U.S. Cl.
USPC ........... 375/264; 375/262; 375/261; 375/298; 375/341; 375/265; 714/755; 714/756; 714/757; 714/786; 714/752; 332/103

(58) Field of Classification Search
CPC ..... H04L 1/0054; H04L 1/005; H04L 25/067; H04L 1/0066; H04L 27/38; H04L 27/34; H04L 27/3488; H04L 1/0041; H04L 1/0071; H04L 25/4925; H04L 25/061; H04L 25/4902; H04L 1/0065; H04L 27/362; H04L 27/2071; H04L 27/364; H03M 13/41; H03M 13/2957; H03M 13/29; H03M 13/1515; H03M 13/2909; H03M 13/15; H03M 13/27; H03M 13/09; H03M 13/091; H03M 13/23

USPC ................ 375/262, 261, 264, 298, 341, 265; 714/755, 756, 758, 786, 752; 332/103
See application file for complete search history.

(56) References Cited

U.S. PATENT DOCUMENTS

| | | | |
|---|---|---|---|
| 5,966,412 A * | 10/1999 | Ramaswamy | 375/341 |
| 7,656,966 B2 * | 2/2010 | Walker et al. | 375/308 |
| 7,778,341 B2 * | 8/2010 | Tong et al. | 375/265 |
| 2013/0246879 A1 * | 9/2013 | Chaichanavong et al. | 714/752 |

* cited by examiner

*Primary Examiner* — Phuong Phu

(74) *Attorney, Agent, or Firm* — Garlick & Markison; Shayne X. Short

(57) ABSTRACT

Forward error correction (FEC) m-bit symbol modulation. Any desired FEC, error correction code (ECC), and/or combination thereof generates coded bits for combination with either uncoded bits, separately generated coded bits, and/or combination thereof to generate a number of symbols that undergo mapping to a constellation whose respective constellation points have a mapping characterized by a maximum minimum intra-Euclidean distance between the respective constellation points thereby generating a sequence of discrete-valued modulation symbols. The sequence of discrete-valued modulation symbols may then undergo modulation of any of a number of different operations (e.g., digital to analog conversion [e.g., digital to analog converter (DAC)], scaling, frequency shifting, filtering, etc.) to generate a continuous time signal for transmission via a communication channel. Such a device operative to perform including such functionality, circuitry, capability, etc., may be implemented to be operative within any desired communication system (e.g., satellite, wireless, wired, fiber-optic, and/or combination thereof, etc.).

26 Claims, 44 Drawing Sheets

1300

United States Patent US 8,811,509 B2

FORWARD ERROR CORRECTION (FEC) M-BIT SYMBOL MODULATION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/490, 046, entitled "Forward error correction (FEC) m-bit symbol modulation," filed May 25, 2011, pending.

BACKGROUND OF THE INVENTION

1. Technical Field of the Invention

The invention relates generally to communication systems; and, more particularly, it relates to symbol modulation as may be employed for forward error correction (FEC) coding including low density parity check (LDPC) coding.

2. Description of Related Art

Data communication systems have been under continual development for many years. One such type of communication system that has been of significant interest lately is a communication system that employs iterative error correction codes (ECCs). Of particular interest is a communication system that employs LDPC (Low Density Parity Check) code. Communications systems with iterative codes are often able to achieve lower bit error rates (BER) than alternative codes for a given signal to noise ratio (SNR).

A continual and primary directive in this area of development has been to try continually to lower the SNR required to achieve a given BER within a communication system. The ideal goal has been to try to reach Shannon's limit in a communication channel. Shannon's limit may be viewed as being the data rate to be used in a communication channel, having a particular SNR, that achieves error free transmission through the communication channel. In other words, the Shannon limit is the theoretical bound for channel capacity for a given modulation and code rate.

LDPC code has been shown to provide for excellent decoding performance that can approach the Shannon limit in some cases. For example, some LDPC decoders have been shown to come within 0.3 dB (decibels) from the theoretical Shannon limit. While this example was achieved using an irregular LDPC code with a length of one million, it nevertheless demonstrates the very promising application of LDPC codes within communication systems.

The use of LDPC coded signals continues to be explored within many newer application areas. Some examples of possible communication systems that may employ LDPC coded signals include communication systems employing 4 wire twisted pair cables for high speed Ethernet applications (e.g., 10 Gbps (Giga-bits per second) Ethernet operation according to the IEEE 802.3an (10 GBASE-T) emerging standard) as well as communication systems operating within a wireless context (e.g., in the IEEE 802.11 context space including the IEEE 802.11n emerging standard).

For any of these particular communication system application areas, near-capacity achieving error correction codes are very desirable. The latency constraints, which would be involved by using traditional concatenated codes, simply preclude their use in such applications in very high data rate communication system application areas.

Generally speaking, within the context of communication systems including those that may employ LDPC codes, there is a first communication device at one end of a communication channel with encoder capability and second communication device at the other end of the communication channel with decoder capability. In many instances, one or both of these two communication devices includes encoder and decoder capability (e.g., within a bi-directional communication system). LDPC codes can be applied in a variety of additional applications as well, including those that employ some form of data storage (e.g., hard disk drive (HDD) applications and other memory storage devices) in which data is encoded before writing to the storage media, and then the data is decoded after being read/retrieved from the storage media.

DETAILED DESCRIPTION OF THE INVENTION

Figure 1:
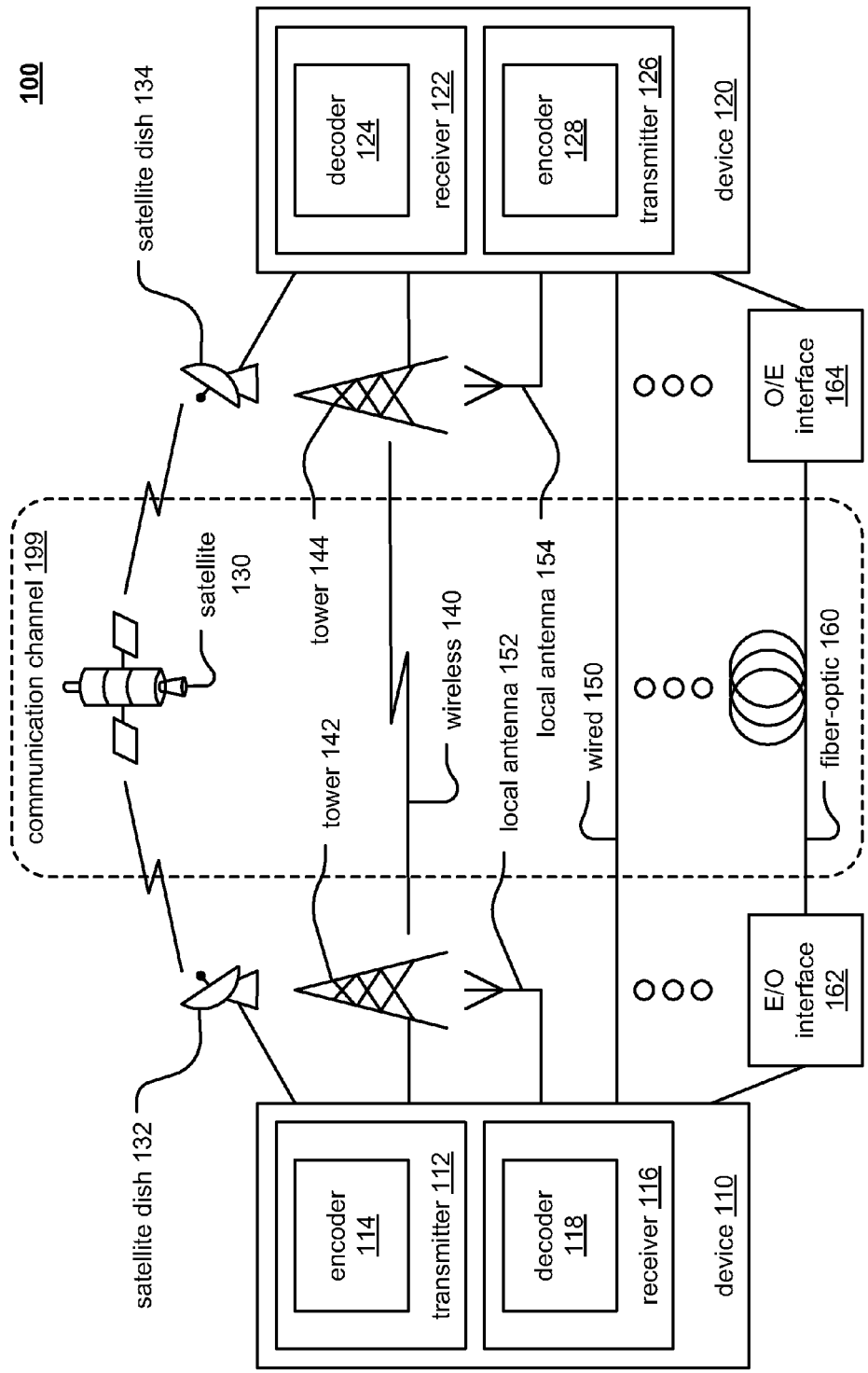
FIG. 1 and FIG. 2 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
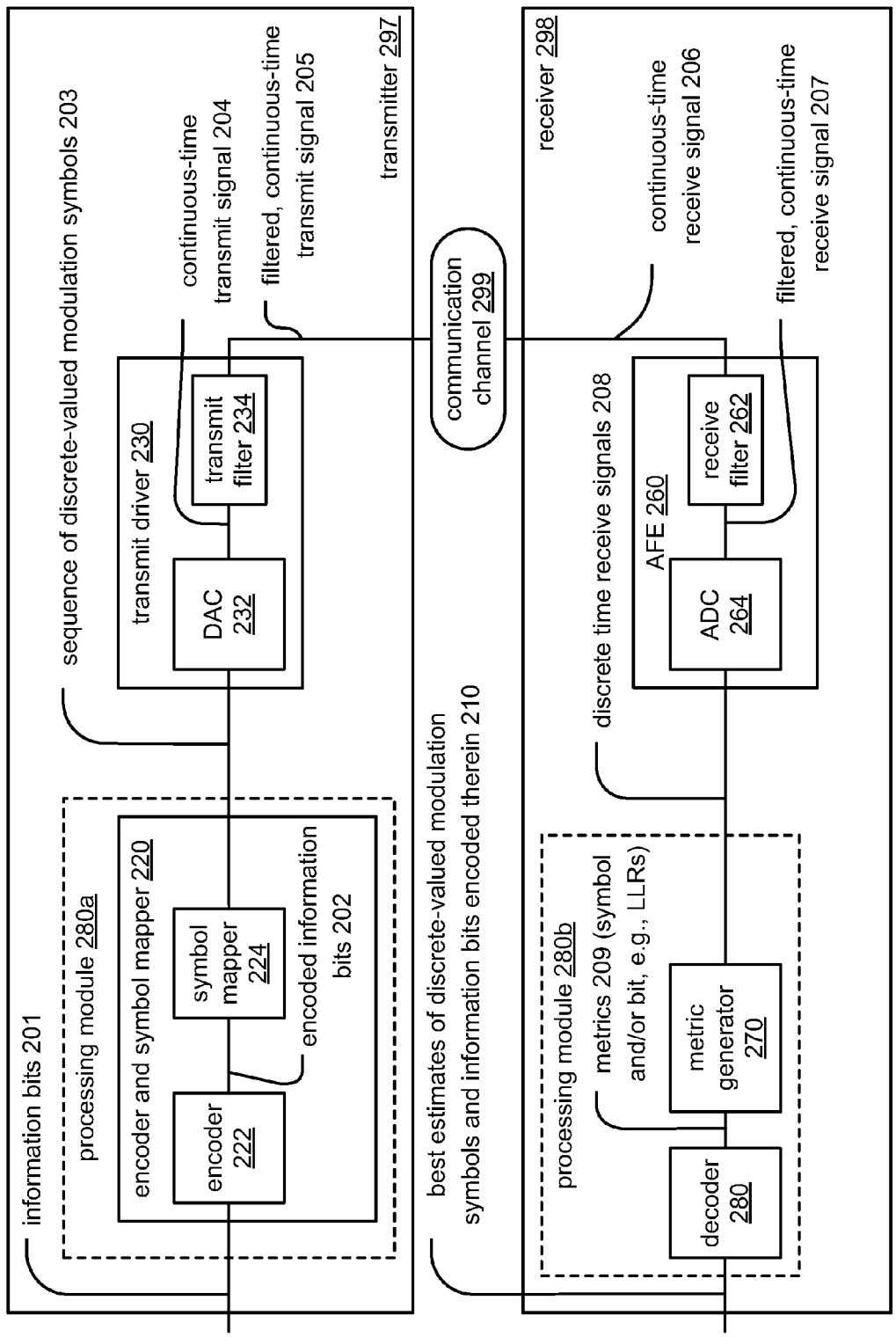

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
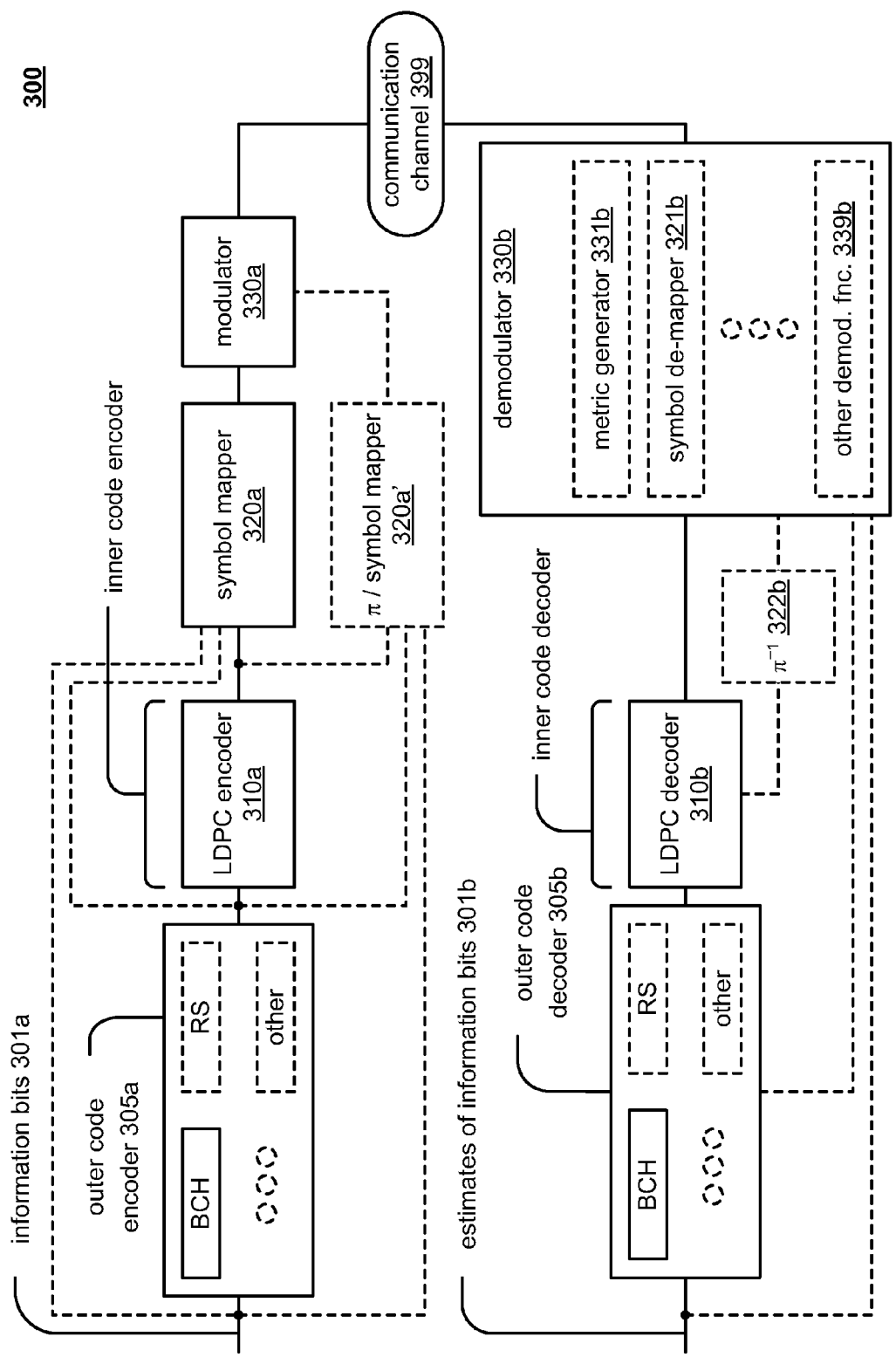
FIG. 3 illustrates an alternative embodiment of a communication system.

FIG. 3 illustrates an alternative embodiment of a communication system 300. Initially, information bits 301*a* are provided to an outer code encoder 305*a*. Such an outer code encoder may be implemented in accordance with any of a variety of error correction codes (ECCs). For example, the outer code encoder 305*a* may be implemented in accordance with BCH (Bose and Ray-Chaudhuri coding, Reed-Solomon (RS) coding, convolutional coding, turbo coding, turbo trellis coded modulation (TTCM) coding, LDPC (Low Density Parity Check) coding, etc. and/or any combination thereof.

The encoded bits (e.g., alternatively and equivalently referred to as coded bits in various diagrams and/or embodiments herein) output from the outer code encoder 305*a* are provided to an LDPC encoder 310*a* from which at least one LDPC codeword is output. The architecture shown in this diagram may be viewed as including outer coding and inner coding. The LDPC encoder 310*a* may be viewed as being an inner code encoder.

This one or more LDPC codewords is provided to a symbol mapper 320*a* implemented to perform any desired symbol mapping which may symbol map different symbols to different modulations (i.e., constellations with respective mappings of the constellation points therein). In addition, a given shaped constellation may have at least two corresponding mappings of the constellation points therein such that any one of the various mappings is employed at a given time or for mapping a given label or symbol.

In alternative embodiments, this one or more LDPC codewords is provided to an interleaver ($\pi$)/symbol mapper 320*a*' implemented to perform any desired combination of interleaving and symbol mapping which may symbol map different symbols to different modulations (i.e., constellations with respective mappings of the constellation points therein). In such an embodiment, the operational characteristics of the LDPC encoder 310*a* in combination with the interleaver ($\pi$)/symbol mapper 320*a*' can be performed with any desired combination.

A modulator 330*a* (e.g., which may be viewed as being an embodiment of a transmit driver) performs any necessary modification (e.g., frequency conversion, gain adjustment, filtering, etc.) to the sequence of discrete-valued modulation symbols output from the symbol mapper 320*a* or the interleaver ($\pi$)/symbol mapper 320*a*' to generate a continuous time signal that comports with the characteristics of communication channel 399 (e.g., including filtering, digital to analog conversion, frequency conversion, gain adjustment, etc.).

A demodulator 330*b* is operative to receive the signal from the communication channel 399 (e.g., the signal may have incurred certain deleterious effects including noise, interference, multi-path effects, etc.) and perform demodulation thereon. This may involve the calculation of certain metrics (e.g., by a metric generator 331*b*) and symbol de-mapping (e.g., by a symbol de-mapper 321*b*) for use in subsequent decoding. This may also involve any other demodulation function (e.g., as shown by reference numeral 339*b*) including filtering, analog to digital conversion, frequency conversion, gain adjustment, etc.

After undergoing the demodulation operations, in embodiments that include the interleaver ($\pi$)/symbol mapper 320*a*', the bit sequence generated by the demodulator 330*b* undergoes de-interleaving in de-interleaver ($\pi^{-1}$) 322*b*. After undergoing the demodulation operations, in embodiments that include the symbol de-mapper 321*b*, the bit sequence generated by the demodulator 330*b* is provided to an LDPC decoder 310*b* (shown as an inner code decoder).

The LDPC decoder 310*b* (shown as an inner code decoder) then decodes the bit sequence output from the demodulator 330*b* or the de-interleaver ($\pi^{-1}$) 322*b* to generate a sequence of estimated bits that subsequently undergo outer decoding in an outer decoder 305*b* from which estimates of the information bits 301*b* are generated.

The outer code decoder 305*b* includes and is operative to employ a corresponding ECC as employed by the outer code encoder 305*a* (e.g., BCH (Bose and Ray-Chaudhuri coding, Reed-Solomon (RS) coding, convolutional coding, turbo coding, turbo trellis coded modulation (TTCM) coding, LDPC (Low Density Parity Check) coding, etc. and/or any combination thereof). Generally speaking, the outer code decoder 305*b* is implemented using a code corresponding to the type of code employed within the outer code encoder 305*a*. Estimates of the original information bits 301*b* are output from the outer code decoder 305*b*.

A novel system and architecture is presented herein by which signal mapping may be performed for symbols composed of mixed coded and uncoded bits. Generally speaking, signal mapping may be viewed as corresponding a symbol or label (e.g., one or more bits, though typically two or more bits) to a given constellation point associated with that symbol or label in a two-dimensional mapping. Typically, the two axes of such a two-dimensional mapping are I and Q axes (e.g., in phase and quadrature axes). A given modulation may generally be viewed as a plurality of constellation points such that each respective constellation point therein has a label associated thereto. For example, when a given symbol undergoes signal mapping in accordance with a given modulation, the particular bits of that symbol are associated with a particular constellation point within the two-dimensional mapping. A continuous time signal may be generated such that a symbol, after undergoing signal mapping in accordance with a given modulation, is translated to a signal having a particular magnitude (e.g., associated with Euclidean distance from the origin of the two-dimensional mapping) and a particular phase (e.g., the angular trajectory extending from the origin of the two-dimensional mapping to the particular constellation point to which that symbol gets associated).

In addition, certain embodiments relate to the selection of a best suitable number of coded bits may be used within a given modulation to achieve the highest possible code rates. When uncoded bits are employed within a given modulation, an error floor may unfortunately be generated. Certain embodiments herein relate to mitigating any such error floor as may be caused by uncoded bits.

Also, as can be seen with respect to this diagram, any desired combination of coded bits and/or uncoded bits may be differentially and/or separately provided for undergoing symbol mapping. For example, uncoded bits extracted from or selected from the information bits 301*a* may be provided directly to the symbol mapper 320*a* and/or the interleaver ($\pi$)/symbol mapper 320*a*'. Also, coded bits that have been generated by the outer code encoder 305*a* may be provided directly to the symbol mapper 320*a* and/or the interleaver (π)/symbol mapper 320*a'*. Of course, those coded bits which may be generated by the LDPC encoder 310*a* may also be provided directly to the symbol mapper 320*a* and/or the interleaver (π)/symbol mapper 320*a'*. It is also noted that bits which have not undergone encoding in accordance with the outer code encoder, such as one or more of the information bits 301*a*, may also bypass the outer code encoder 305*a* and be provided directly to the inner code encoder. That is to say, certain coded bits may be generated such that they are only encoded in accordance with the inner code encoder, but they are not encoded in accordance with the outer code encoder. Any desired combination of coded bits, which may be generated by one or both of an inner code encoder and an outer code encoder, as well as uncoded bits may be differentially and/or separately provided for undergoing symbol mapping.

Figure 4:
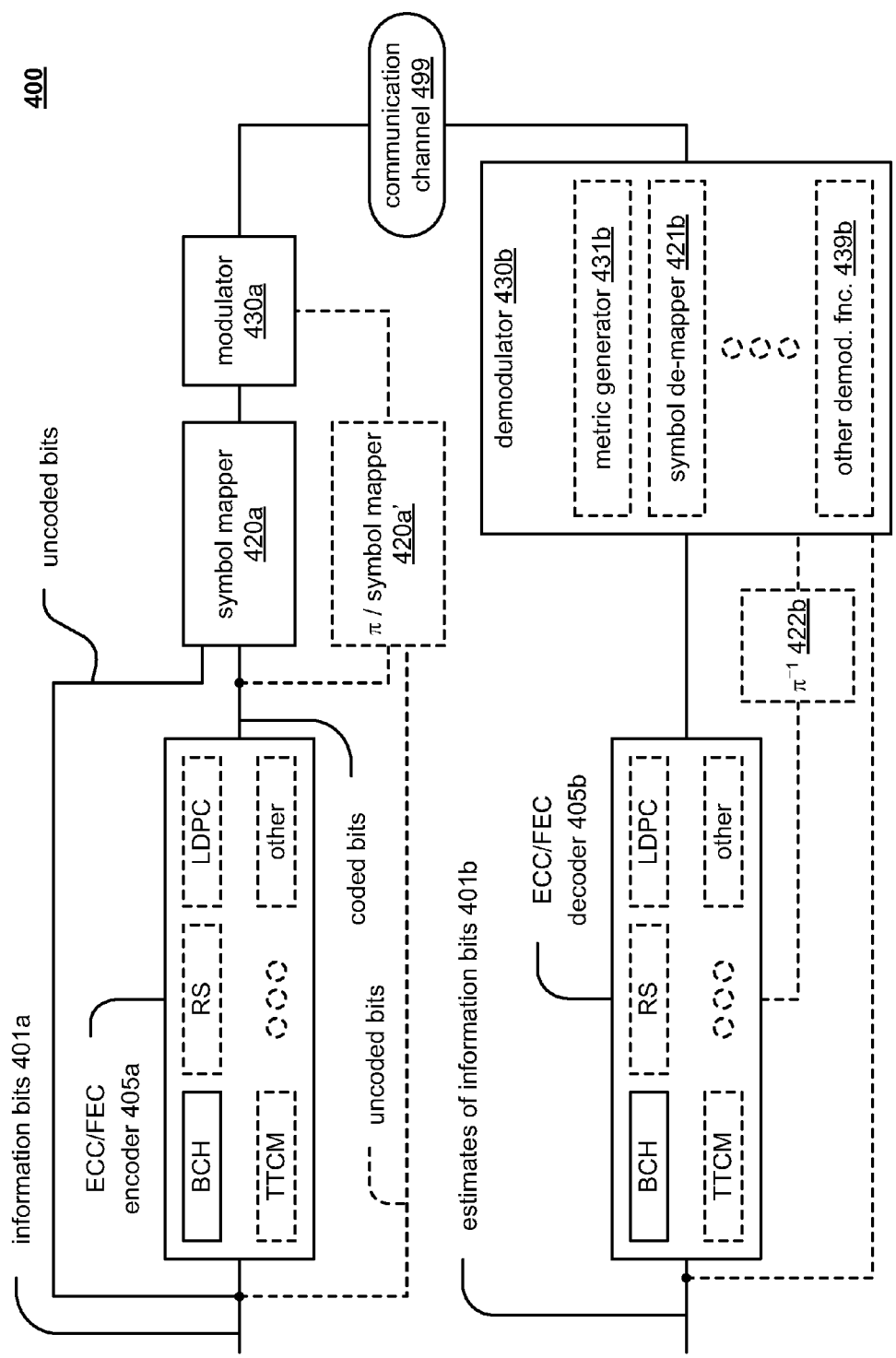
FIG. 4 and FIG. 5 illustrate even other alternative embodiments of a communication system.
Figure 5:
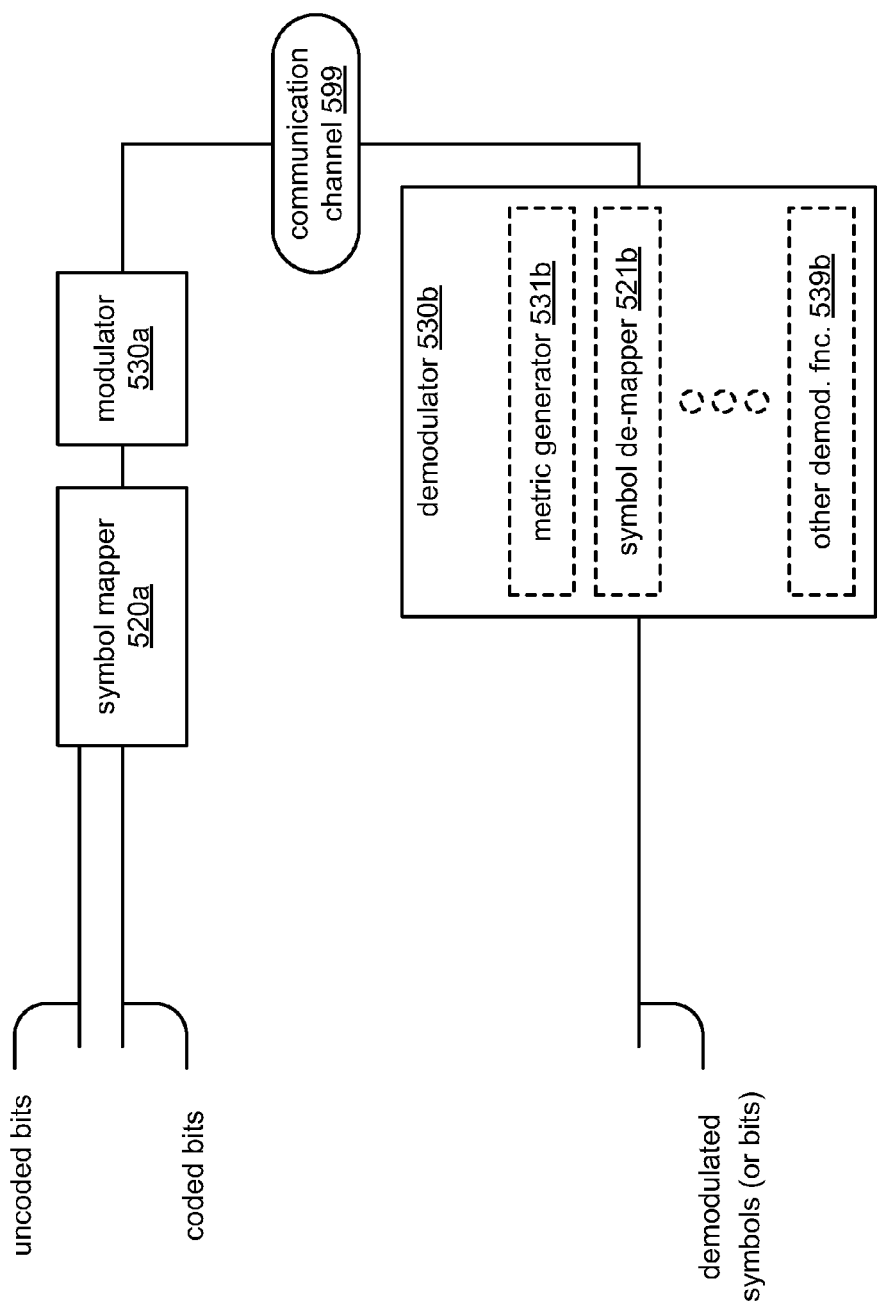

FIG. 4 and FIG. 5 illustrate even other alternative embodiments of a communication system.

Referring to embodiment 400 of FIG. 4, as can be seen with respect to this diagram, uncoded bits and coded bits are both respectively provided to a symbol mapper 420*a*. The coded bits may be generated from the very same information bits 401*a* view which the uncoded bits are extracted and provided. As described also elsewhere with respect other diagrams and/or embodiments herein, any of a variety of different types of error correction code (ECC) and/or forward error correction (FEC) may be employed in accordance with generating the coded bits as may be desired within a particular application; such encoding operations may be performed within an ECC/FEC encoder 405*a*.

Within this diagram, the uncoded bits and encoded bits (alternatively and equivalently referred to as coded bits) are both provided to the symbol mapper 420*a* and may then appropriately undergo combination thereby generating respective symbols that include both at least one coded bit and at least one uncoded bit. As is discussed in further detail below, for a given symbol, uncoded bits and coded bits each provide respective indication and correspondence of a particular constellation point to which that symbol is to be mapped within a constellation. For example, in some embodiments, the uncoded bits are employed to indicate a particular area within the constellation that can include a subset of the overall constellation points, and the coded bits are employed to indicate a particular constellation point within that area and that particular subset of constellation points. As well to be seen with respect to other embodiments and/or diagrams herein, one or more of the respective areas, and particularly the subset of constellation points therein, may be mapped in accordance with essentially or substantially a copy of a mapping employed within another respective area. That is to say, different respective areas within the overall constellation may themselves have very similar mappings. However, each respective area may be indicated by different of the uncoded bits.

In some situations and embodiments, the respective mapping of the uncoded bits, and correspondingly the mapping of the respective areas of the overall constellation, are performed in accordance with Gray mapping. Analogously, in some embodiments, the respective mapping of the constellation points within at least one of the areas may be made in accordance with Gray mapping.

Generally speaking, from certain perspectives, the overall mapping is designed to ensure a relative maximum minimum value of the intra-Euclidean distance between respective constellation points. Further details regarding the definition of intro Euclidean distance are provided below, and a maximally possible minimum intro Euclidean distance under a given mapping of the constellation points of the constellation can provide for better improvement, lower error rate, greater throughput, etc., among many other advantages.

The sequence of discrete-valued modulation symbols as generated by the symbol mapper 420*a* are then provided to the modulator 430*a*. In some embodiments, a variant of a symbol mapper is implemented as a combined interleaver (π)/symbol mapper 420*a'* implemented to perform any desired combination of interleaving and symbol mapping which may symbol map different symbols to different modulations (i.e., constellations with respective mappings of the constellation points therein). In such an embodiment, the operational characteristics of the ECC/FEC encoder 405*a* in combination with the interleaver (π)/symbol mapper 420*a'* can be performed with any desired combination.

A modulator 430*a* (e.g., which may be viewed as being an embodiment of a transmit driver) performs any necessary modification (e.g., frequency conversion, gain adjustment, filtering, etc.) to the sequence of discrete-valued modulation symbols output from the symbol mapper 420*a* or the interleaver (π)/symbol mapper 420*a'* to generate a continuous time signal that comports with the characteristics of communication channel 499 (e.g., including filtering, digital to analog conversion, frequency conversion, gain adjustment, etc.).

A demodulator 430*b* is operative to receive the signal from the communication channel 499 (e.g., the signal may have incurred certain deleterious effects including noise, interference, multi-path effects, etc.) and perform demodulation thereon. This may involve the calculation of certain metrics (e.g., by a metric generator 431*b*) and symbol de-mapping (e.g., by a symbol de-mapper 421*b*) for use in subsequent decoding. This may also involve any other demodulation function (e.g., as shown by reference numeral 439*b*) including filtering, analog to digital conversion, frequency conversion, gain adjustment, etc.

After undergoing the demodulation operations, in embodiments that include the interleaver (π)/symbol mapper 420*a'*, the bit sequence generated by the demodulator 430*b* undergoes de-interleaving in de-interleaver ($\pi^{-1}$) 422*b*. After undergoing the demodulation operations, in embodiments that include the symbol de-mapper 421*b*, the bit sequence generated by the demodulator 430*b* is provided to an ECC/FEC decoder 405*b*. The ECC/FEC decoder 405*b* includes and is operative to employ a corresponding ECC and/or FEC as employed by the ECC/FEC encoder 405*a* (e.g., BCH (Bose and Ray-Chaudhuri coding, Reed-Solomon (RS) coding, convolutional coding, turbo coding, turbo trellis coded modulation (TTCM) coding, LDPC (Low Density Parity Check) coding, etc. and/or any combination thereof). Generally speaking, the ECC/FEC decoder 405*b* is implemented using a code corresponding to the type of code employed within the ECC/FEC encoder 405*a*. Estimates of the original information bits 401*b* are output from the outer code decoder 405*b*.

Generally speaking, as can be seen with respect to this diagram, coded bits and/or uncoded bits may be differentially and/or separately provided for undergoing symbol mapping.

Also, as can be seen with respect to this diagram as with respect to other diagrams and/or embodiments herein, any desired combination of coded bits and/or uncoded bits may be differentially and/or separately provided for undergoing symbol mapping. For example, uncoded bits extracted from or selected from the information bits 401*a* may be provided directly to the symbol mapper 420*a* and/or the interleaver (π)/symbol mapper 420*a'*. Also, coded bits that have been generated by the ECC/FEC encoder 405*a* may be provided directly to the symbol mapper 420*a* and/or the interleaver ($\pi$)/symbol mapper 420a'. Any desired combination of coded bits, which may be generated by one or both of an inner code encoder and an outer code encoder, as well as uncoded bits may be differentially and/or separately provided for undergoing symbol mapping.

Referring to embodiment 500 of FIG. 5, as can be seen with respect to this diagram, generally speaking, uncoded bits and coded bits, regardless of where or from what other component and/or device they are provided, are provided to a symbol mapper 520a and may then appropriately undergo combination thereby generating respective symbols that include both at least one coded bit and at least one uncoded bit. As is also discussed in further detail below, for a given symbol, uncoded bits and coded bits each provide respective indication and correspondence of a particular constellation point to which that symbol is to be mapped within a constellation. For example, in some embodiments, the uncoded bits are employed to indicate a particular area within the constellation that can include a subset of the overall constellation points, and the coded bits are employed to indicate a particular constellation point within that area and that particular subset of constellation points. As well as may be seen with respect to other embodiments and/or diagrams herein, one or more of the respective areas, and particularly the subset of constellation points therein, may be mapped in accordance with essentially or substantially a copy of a mapping employed within another respective area. That is to say, different respective areas within the overall constellation may themselves have very similar mappings. However, each respective area may be indicated by different of the uncoded bits.

In some situations and embodiments, the respective mapping of the uncoded bits, and correspondingly the mapping of the respective areas of the overall constellation, are performed in accordance with Gray mapping. Analogously, in some embodiments, the respective mapping of the constellation points within at least one of the areas may be made in accordance with Gray mapping.

As also described elsewhere herein, from certain perspectives, the overall mapping is designed to ensure a relative maximum minimum value of the intra-Euclidean distance between respective constellation points. Further details regarding the definition of intro Euclidean distance are provided below, and a maximally possible minimum intro Euclidean distance under a given mapping of the constellation points of the constellation can provide for better improvement, lower error rate, greater throughput, etc., among many other advantages.

The sequence of discrete-valued modulation symbols as generated by the symbol mapper 520a are then provided to the modulator 530a. In some embodiments, a variant of a symbol mapper is implemented as a combined interleaver ($\pi$)/symbol mapper 520a' implemented to perform any desired combination of interleaving and symbol mapping which may symbol map different symbols to different modulations (i.e., constellations with respective mappings of the constellation points therein). In such an embodiment, the operational characteristics of the ECC/FEC encoder 505a in combination with the interleaver ($\pi$)/symbol mapper 520a' can be performed with any desired combination.

A modulator 530a (e.g., which may be viewed as being an embodiment of a transmit driver) performs any necessary modification (e.g., frequency conversion, gain adjustment, filtering, etc.) to the sequence of discrete-valued modulation symbols output from the symbol mapper 520a or the interleaver ($\pi$)/symbol mapper 520a' to generate a continuous time signal that comports with the characteristics of communication channel 599 (e.g., including filtering, digital to analog conversion, frequency conversion, gain adjustment, etc.).

A demodulator 530b is operative to receive the signal from the communication channel 599 (e.g., the signal may have incurred certain deleterious effects including noise, interference, multi-path effects, etc.) and perform demodulation thereon. This may involve the calculation of certain metrics (e.g., by a metric generator 531b) and symbol de-mapping (e.g., by a symbol de-mapper 521b) for use in subsequent decoding. This may also involve any other demodulation function (e.g., as shown by reference numeral 539b) including filtering, analog to digital conversion, frequency conversion, gain adjustment, etc.

After undergoing the demodulation operations, in embodiments that include the interleaver ($\pi$)/symbol mapper 520a', the bit sequence generated by the demodulator 530b may undergo de-interleaving such as in a de-interleaver ($\pi^{-1}$). After undergoing the demodulation operations, in embodiments that include the symbol de-mapper 521b, the bit sequence generated by the demodulator 530b may be provided to one or more ECC/FEC decoders. Generally speaking, as can be seen with respect to this diagram, coded bits and/or uncoded bits may be differentially and/or separately provided for undergoing symbol mapping.

Figure 6:
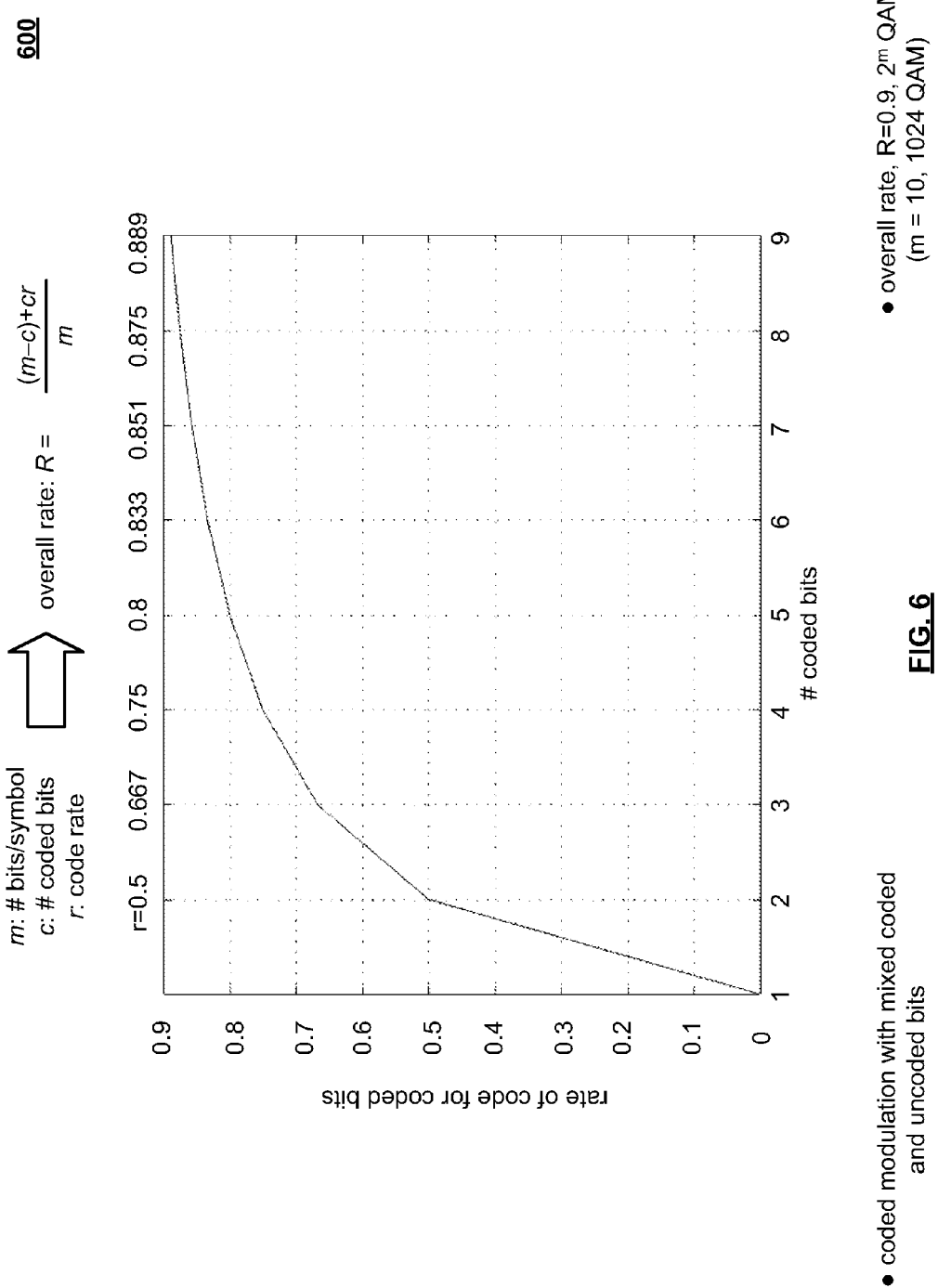
FIG. 6 illustrates an embodiment indicating relationship between rate of code for coded bits and number of coded bits for coded modulation including coded and uncoded bits.

FIG. 6 illustrates an embodiment 600 indicating relationship between rate of code for coded bits and number of coded bits for coded modulation including coded and uncoded bits. With respect to this diagram, it may be seen that for a coded modulation employing both coded bits and uncoded bits (e.g., a mixture of coded and uncoded bits within a given modulation), a corresponding overall rate may be calculated therefore. The lowercase letter 'r' corresponds to the code rate of the error correction code (ECC) and/or a forward error correction code (FEC) such as may be employed for generating error correction capability and/or redundancy based upon one or more information bits. Any of a variety of different types of codes may be employed in accordance with in accordance with various aspects, and their equivalents, of the invention (e.g., BCH (Bose and Ray-Chaudhuri coding, Reed-Solomon (RS) coding, convolutional coding, turbo coding, turbo trellis coded modulation (TTCM) coding, LDPC (Low Density Parity Check) coding, etc., any other ECC and/or FEC, and/or any combination thereof).

The letter 'm' corresponds to the number of bits per symbol of the overall modulation. The letter 'c' specifically corresponds to the number of coded bits within a symbol of the overall modulation. The letter 'u', which is the difference between 'm' and 'c', corresponds to the number of uncoded bits within a symbol of the overall modulation. The overall rate of such a modulation is a function of a first term composed of the number of coded bits within a symbol times the code rate of the ECC and/or FEC added to the number of uncoded bits within a symbol divided by a second term being the number of coded bits within a symbol of the overall modulation. As may be understood, as the number of uncoded bits within a given modulation including a mixture of both coded and uncoded bits increases, the overall rate will decrease. Look at another way, as the number of coded bits within a given modulation including a mixture of both coded and uncoded bits increases, the overall rate will increase.

Figure 7:
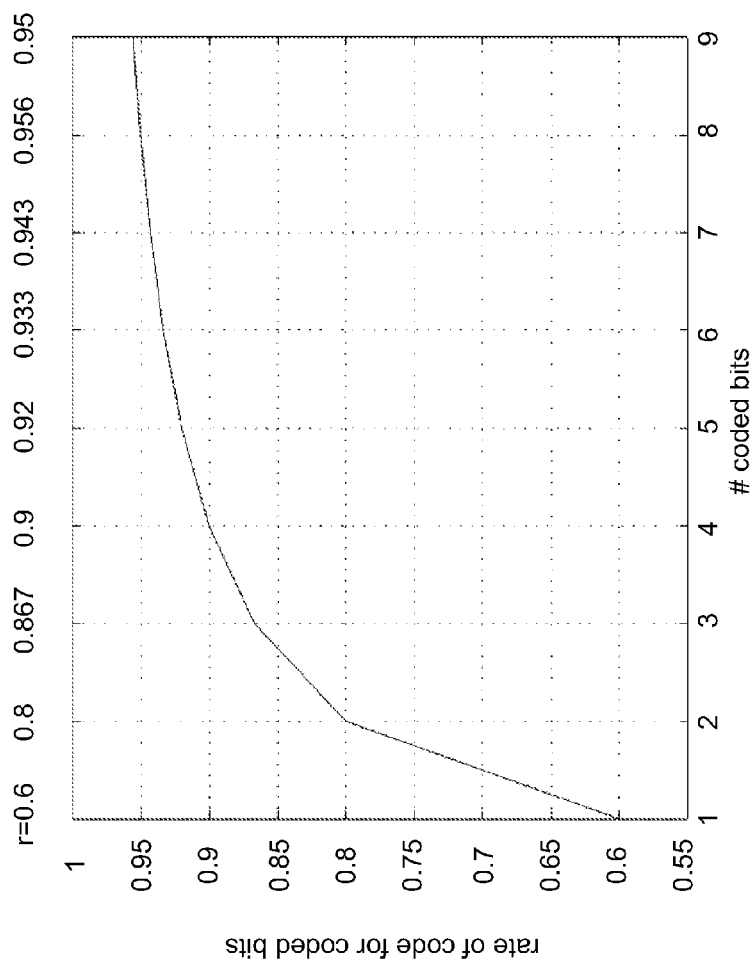
FIG. 7 illustrates an alternative embodiment indicating relationship between rate of code for coded bits and number of coded bits for coded modulation including coded and uncoded bits.

FIG. 7 illustrates an alternative embodiment 700 indicating relationship between rate of code for coded bits and number of coded bits for coded modulation including coded and uncoded bits. As may be seen with respect to this diagram, to have an overall rate≥0.96, only 4 or fewer bits can be coded since it may be difficult to constructed a modulation including a mixture of coded and uncoded bits such that the overall rate>0.9 LDPC code with an acceptably low error floor.

A novel approach is presented herein by which signal mapping may be performed for symbols that are composed of a mixture of coded and uncoded bits. As the reader may understand in accordance with the teaching and disclosure herein, signal mapping may be performed in a variety of ways. One embodiment operates in accordance with trellis/turbo coded modulation (TTCM). In accordance with TTCM, signal mapping may be performed in accordance with set-partitioning. With respect to an embodiment that operates in accordance with a coded bits mapping, Gray mapping need not necessarily be employed. With respect to other types of coded modulation (e.g., linear block coded modulation), embodiments that operate by coding all bits, Gray mapping may be employed. One possible variant of a linear block coded modulation that employees signal mapping for symbols that are composed of a mixture of coded and uncoded bits is in accordance with Multimedia over coax alliance (MoCA®, or generally referred to as MoCA) network. For example, MoCA 2.0 operates in accordance with 1024 QAM mapping for LDPC coded modulation with 8-coded bits.

The performance curve described with reference to the below-referenced diagram is in the context of BER (Bit Error Rate) versus $E_b/N_o$ (ratio of energy per bit $E_b$ to the Spectral Noise Density $N_o$). This term $E_b/N_o$ is the measure of SNR (Signal to Noise Ratio) for a digital communication system. When looking at these performance curves, the BER may be determined for any given $E_b/N_o$ (or SNR).

Figure 8:
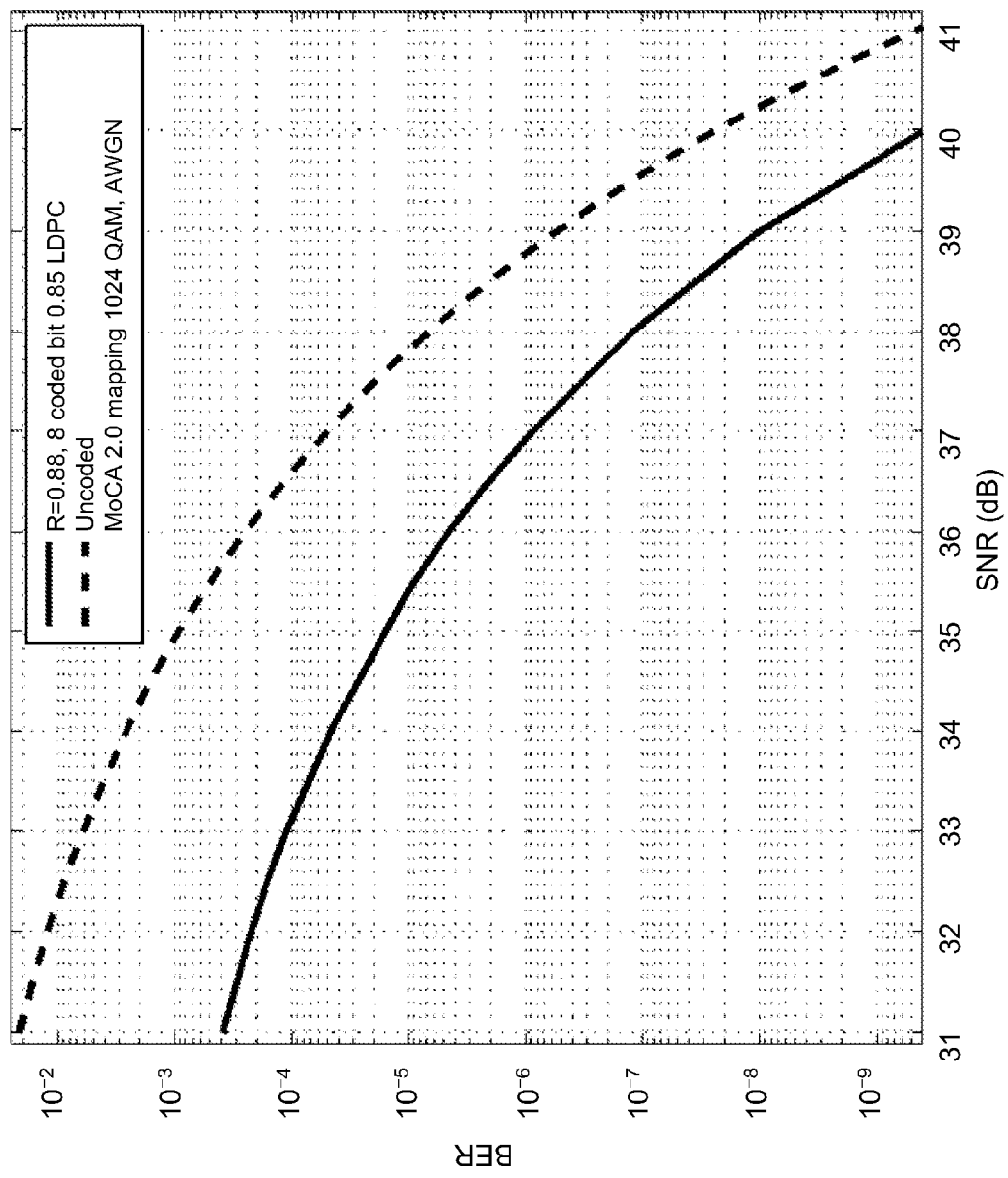
FIG. 8 illustrates an embodiment of performance comparison of low density parity check (LDPC) coded modulation and uncoded modulation.

FIG. 8 illustrates an embodiment 800 of performance comparison of low density parity check (LDPC) coded modulation and uncoded modulation.

In accordance with the novel manner of performing signal mapping for symbols that are composed of a mixture of coded and uncoded bits, the mapping considers the distance (e.g., Euclidean distance) with respect to uncoded bits within the overall modulation. The most significant bits (MSBs) within any given symbol are the uncoded bits therein. The remaining least significant bits (LSBs) of a given symbol are the coded bits therein the minimum intra (Euclidean) distance with respect to the uncoded bits may be described as follows:

M—bit symbol: $b=(b_{M-1}b_{M-2}\ldots b_1b_0)$
U: # uncoded bits.
Location of uncoded bits: U MSBs, i.e $(b_{M-1}\ldots b_{M-U})$
Mapping P: $\{0,1\}^M \to R^2$
Suppose we do set—partition $2^M$—QAM symbols start with coded bits and with M-U levels
⇒ leafs of the partition tree are subsets $$S_{b_{M-U-1}\ldots b_0} = \{ub_{M-U-1}\ldots b_0 | u=(u_{M-1}\ldots u_{M-U}) \in \{0,1\}^U\}$$

where $b_{M-U-1}\ldots b_0$ are M−U coded bits.
(Euclidean) Distance inside $S_{b_{M-U-1}\ldots b_0}$: $d(P(x),P(y))$, $x,y \in S_{b_{M-U-1}\ldots b_0}$
Intra subset distance: $d_p(S_{b_{M-U-1}\ldots b_0}) = \min\{d(P(x), P(y)) | x \neq y, x, y \in S_{b_{M-U-1}\ldots b_0}\}$
Min Intra (Eudlidean) Distance Under the Mapping P:

$$iD = \text{Min}\{d_p(S_{b_{M-U-1}\ldots b_0}) | \forall (b_{M-U-1}\ldots b_0) \in \{0,1\}^{M-U}\}$$

As can be seen, a given symbol includes M bits. The uncoded bits are located as the MSBs of a given symbol. Mapping, P, may be viewed as being a default or initial mapping that may be characterized to determine whether or not it has an acceptable minimum intra-Euclidean distance as to be a viable signal mapping.

A set partitioning of the respective $2^M$ QAM symbols begins with coded bits and with M−U levels. That is to say, for each respective possible value for the coded bits within a given symbol, a respective element set may be generated based upon each and every combination of uncoded bits that may be combined there with. For example, considering a symbol that includes 10 bits (8 of which are coded bits), then for a given uncoded bit value of 00000000, there are four associated uncoded bit combinations to be considered (e.g., 00 00000000, 10 00000000, 10, 00000000, and 11 00000000). That is to say, the coded bit portion of a given symbol is fixed, and each possible permutation of the uncoded bits undergoes mapping based upon the mapping, P.

In other words, in such an example, there are 4 separate 10 bits symbols that undergo signal mapping to a given or existing constellation mapping. Then, each and every possible Euclidean distance between those for respective consolation points may be determined. For example, the Euclidean distance between any two constellation points among those 4 separate 10 bits symbols that undergo signal mapping is calculated. This will result in a set of Euclidean distances for a given fixed bit value of the coded bit portion of a given symbol. The minimum Euclidean distance among that set is then selected, and the minimum intra-Euclidean distance under the mapping, P, may be described as, iD.

In an ideal case, the modulation (e.g., a constellation having a particular mapping) will give the maximum possible minimum intra-Euclidean distance, iD. That is to say, the maximum possible minimum intra-Euclidean distance, iD, will provide for the best performance and greatest gain FIG. 8 and FIG. 9 illustrate embodiments 800 and 900, respectively, of multimedia over coax alliance (MoCA®, or generally referred to as MoCA) 2.0 mapping for symbols with 8 coded bits.

Figure 9:
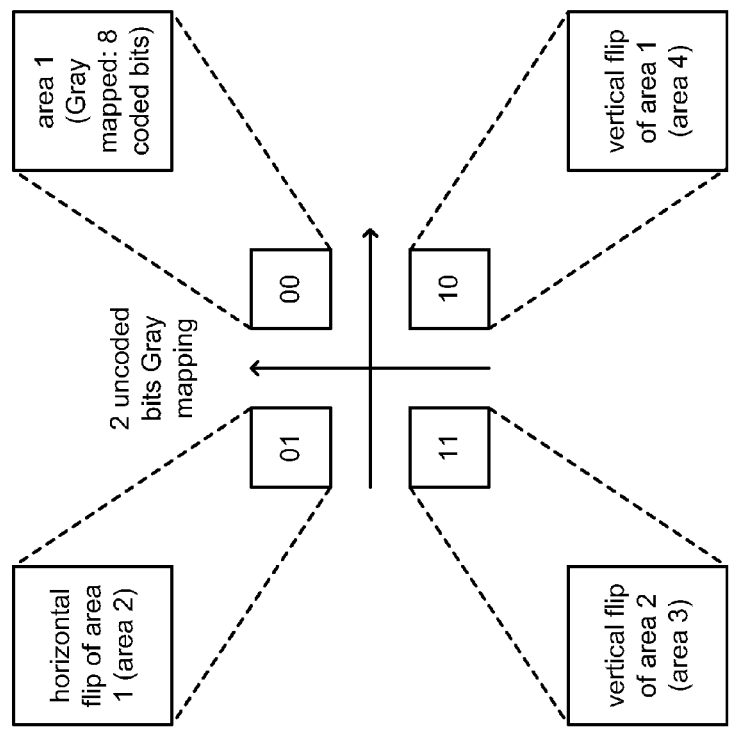
FIG. 9 and FIG. 10 illustrate embodiments of multimedia over coax alliance (MoCA®, or generally referred to as MoCA) 2.0 mapping for symbols with 8 coded bits.

Referring to FIG. 9, the MoCA 2.0 mapping is employed for the eight respected coded bits of a signal mapping having 10 overall bits (e.g., 2 of which are uncoded bits and 8 of which are coded bits). The two uncoded bits are used to indicate the respective quadrant among the I and Q two-dimensional plane. For example, the uncoded bits 00 correspond to the upper right quadrant, the uncoded bits 11 correspond to the lower left quadrant, etc.

Again, the uncoded bits are placed as the MSBs of a given symbol. The remaining eight bits in such an embodiment using 10 bits symbols are mapped as indicated in the diagram. With respect to the upper right quadrant, area I, those 8 coded bits undergo Gray mapping. However, with respect to the other quadrants, the mapping of the 8 coded bits therein may be a variant of the MoCA 2.0 mapping. That is to say, the MoCA 2.0 mapping is modified appropriately with respect to the other quadrants. For example, area II (which corresponds to the upper left quadrant) is a horizontal flip of that which is depicted in area I. The lower left quadrant corresponds to a vertical flip of area II. The lower right quadrant corresponds to a vertical flip of area I.

The reader will understand that the entire constellation is composed of 1024 overall constellation points. That is to say, a $2^m$ quadrature amplitude modulation (QAM) constellation operating on 10 bits symbols (e.g., m=10), will include 1024 overall constellation points. One fourth of those 1024 overall constellation points are respectively included within each of the four quadrants.

Referring to FIG. 10, it is again noted that all of the 1024 overall constellation points are not specifically depicted within the diagram for ease of understanding for the reader.

The constellation points are mapped respectively at odd intersection locations of the respective I and Q axes. For example, a first group of constellation points are located along the respective axes at locations (1, 1), (3, 1), (5, 1), (7, 1), and so on up to (31, 1). a first group of constellation points are located along the respective axes at locations (1, 3), (3, 3) (5, 3), (7, 3), and so on up to (31, 3). This placement of the respective constellation points is analogously made in the negative directions along the respective I and Q axes.

As may be understood with respect to the teaching and disclosure presented herein, for a given value of coded bits being fixed (e.g., 0000 0000), a respective group of constellation points will be identified based upon each combination of uncoded bits that will be included therewith. In an embodiment of 10 bit overall symbols, such that 8 bits thereof are coded bits, then for a given value of those coded bits being fixed, there will be 4 associated constellation points identified (e.g., in an embodiment including 2 uncoded bits within the overall 10 bit symbol). The Euclidean distances between these respective for consolation points are then calculated thereby generating a set of Euclidean distances for a given fixed bit value of the coded bit portion of a given symbol. The minimum Euclidean distance among that set is then selected, and the minimum intra-Euclidean distance under the mapping, P, may be described as, iD.

Figure 10:
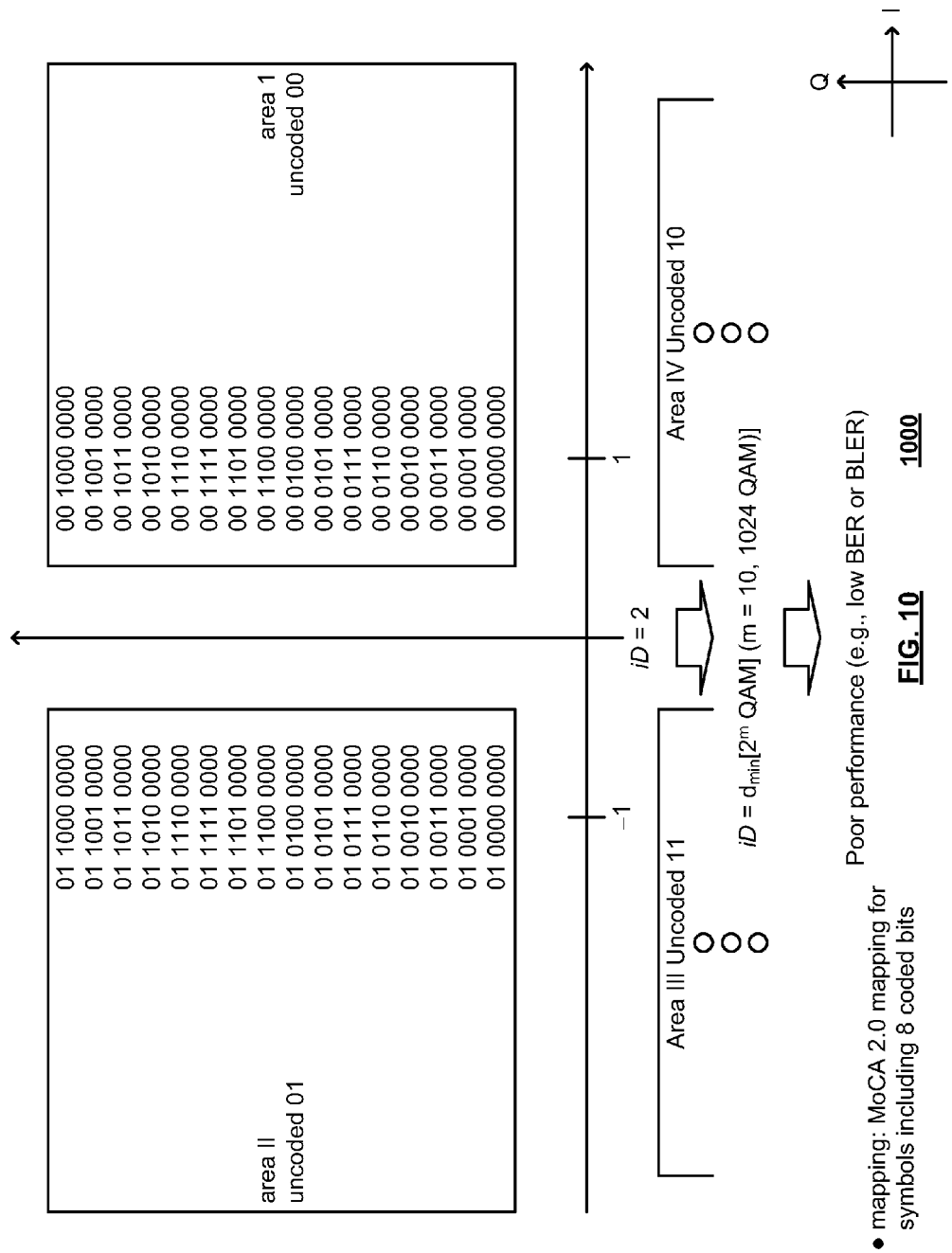

As may be seen with respect to the embodiment of FIG. 9 and FIG. 10, the minimum intra-Euclidean distance under the mapping, P, which is described as, iD, is 2 (i.e., iD=2). Such a minimum intra-Euclidean distance value is essentially the same as what would be achieved in accordance with 1024 QAM uncoded modulation. As such, this overall signal mapping does not provide very good performance (e.g., a relatively low bit error rate (BER) and/or block error rate (BLER)).

Figure 11:
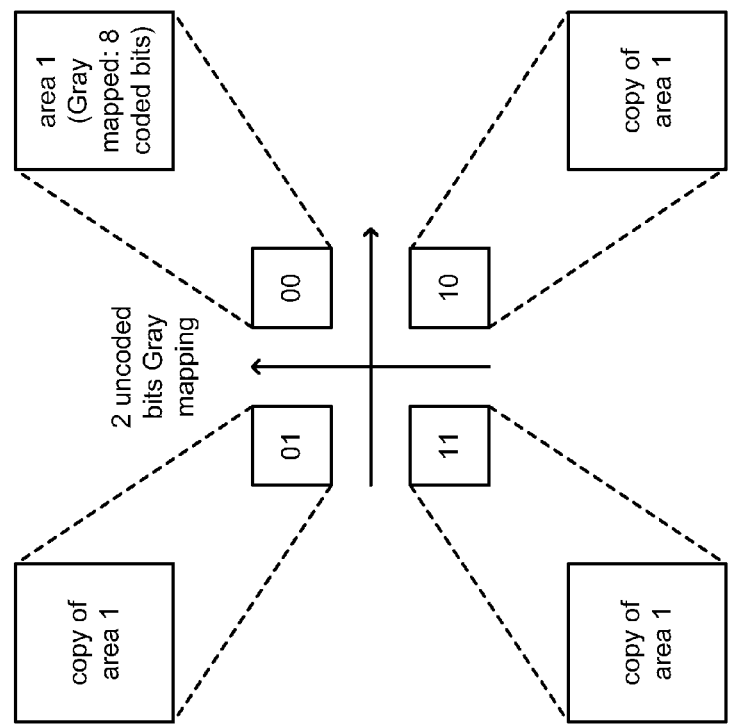
FIG. 11 illustrates an embodiment of increasing minimum intra-distance in accordance with mapping for symbols with 2 uncoded bits and 8 coded bits (Gray mapping).

FIG. 11 illustrates an embodiment 1100 of increasing minimum intra-distance in accordance with mapping for symbols with 2 uncoded bits and 8 coded bits (Gray mapping).

Figure 12:
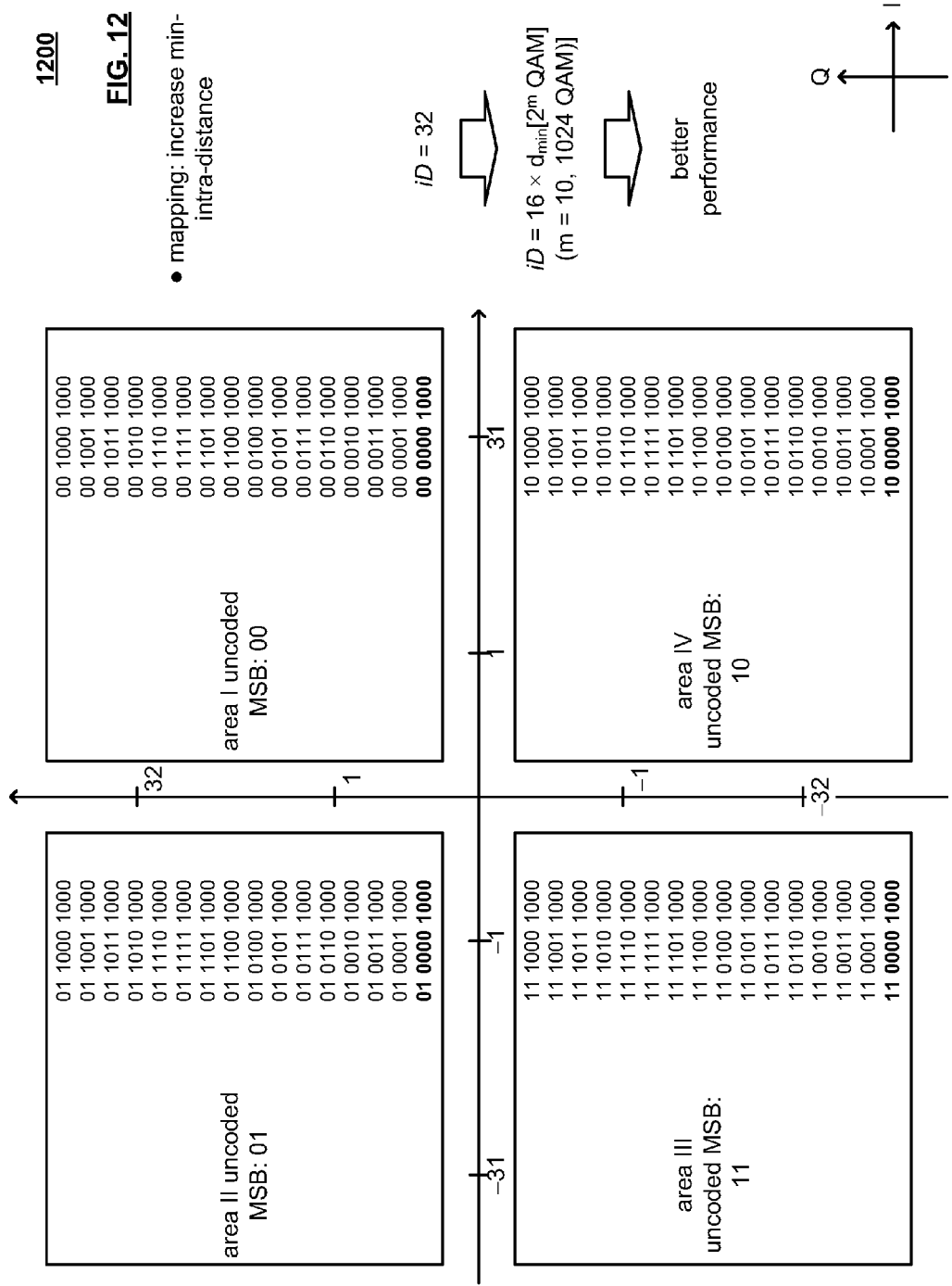
FIG. 12, FIG. 13, and FIG. 14 illustrate other embodiments of increasing minimum intra-distance in accordance with mapping of symbols.
Figure 13:
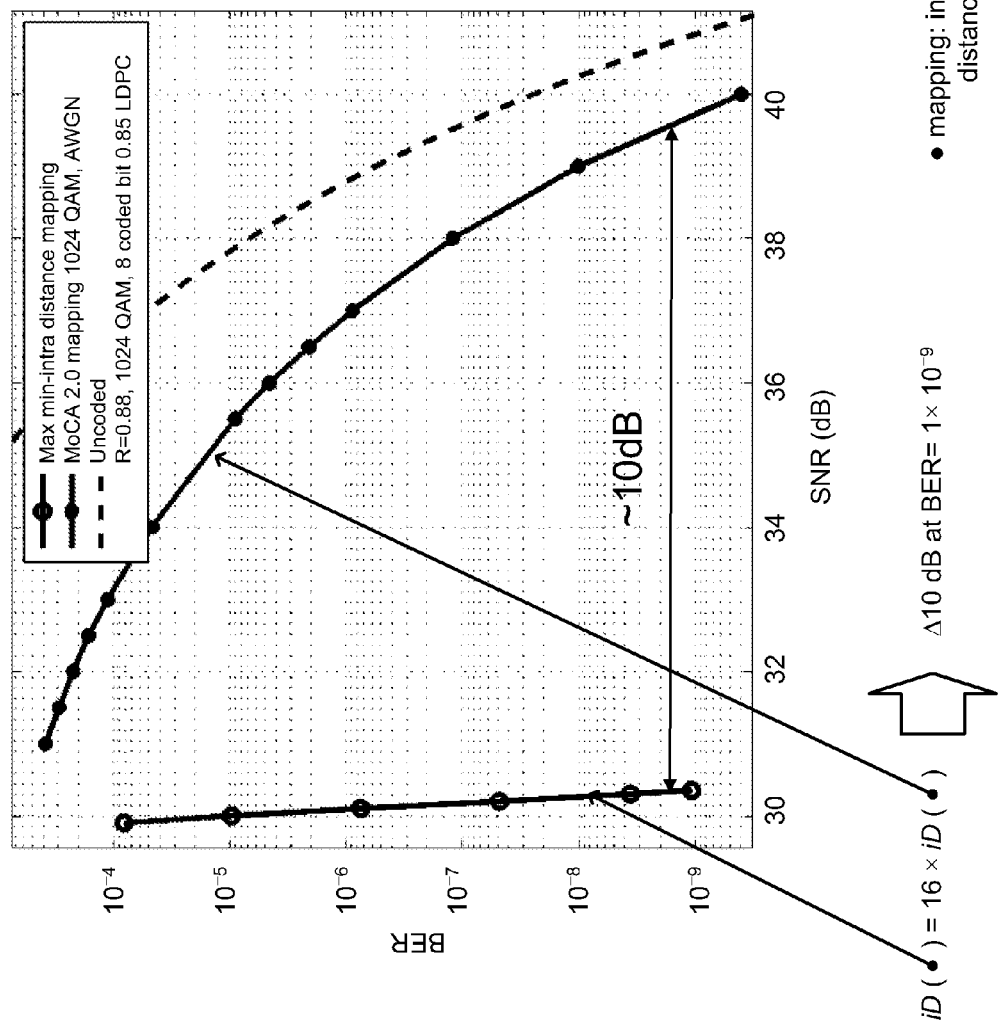
Figure 14:
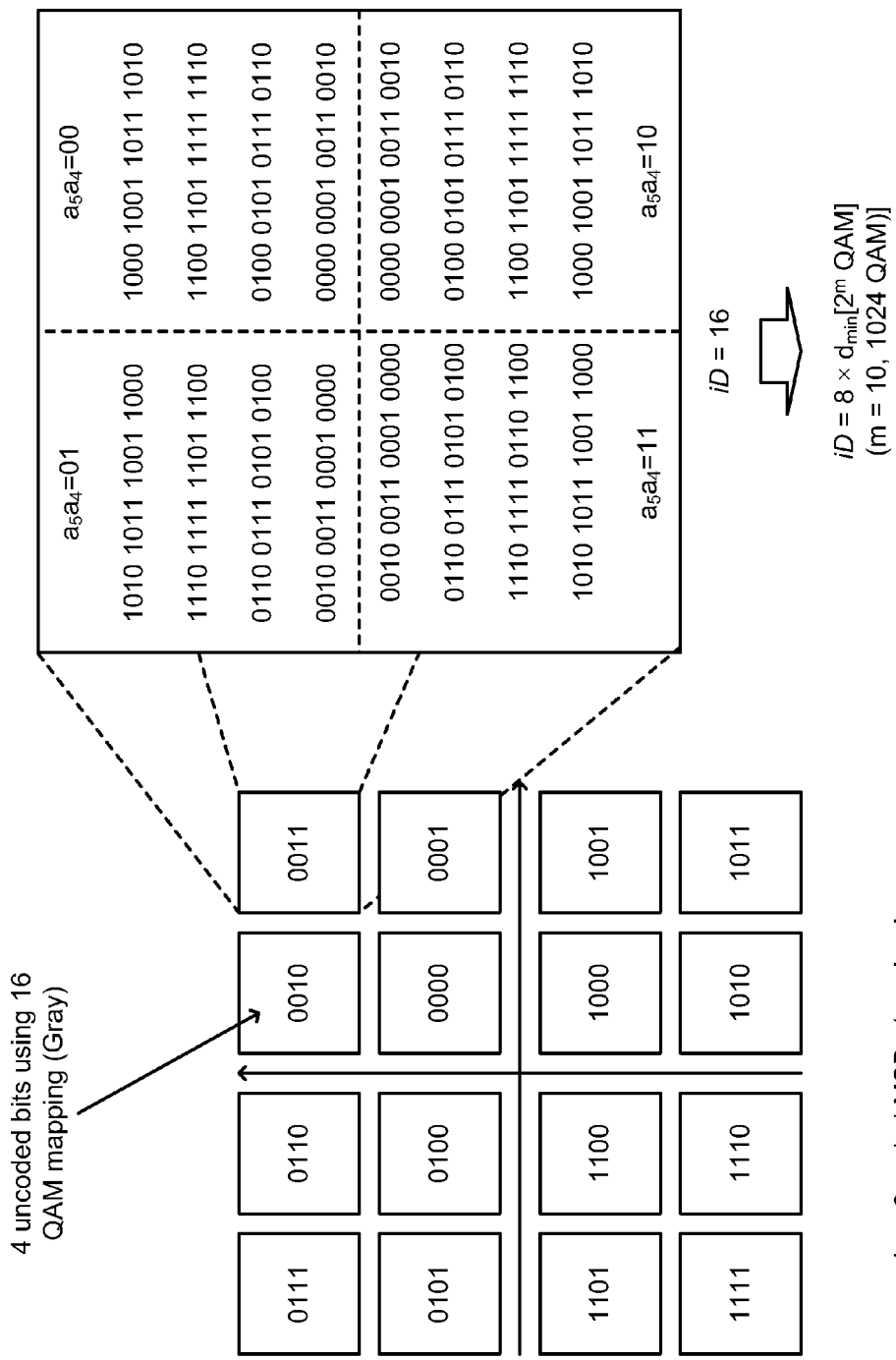

FIG. 12, FIG. 13, and FIG. 14 illustrate other embodiments 1200, 1300, and 1400, respectively, of increasing minimum intra-distance in accordance with mapping of symbols.

Referring to FIG. 11, this embodiment relates to increasing the minimum intra-Euclidean distance by appropriately selecting and implementing the mapping of the coded bits within the overall signal mapping. Again, as mentioned with respect to other embodiments, the uncoded bits are placed as the MSBs of a given symbol. The remaining eight bits in such an embodiment using 10 bits symbols are mapped as indicated in the diagram. With respect to the upper right quadrant, area I, those 8 coded bits undergo Gray mapping. With respect to the other 3 quadrants, the mapping of the 8 coded bits therein is the same as that which is employed within the upper right quadrant, area I. That is to say, the signal mapping of the coded bits within each respective quadrant is the same.

Again, with respect to this embodiment, it is noted that each and every constellation point is not specifically illustrated within the diagram for ease of understanding for the reader. The overall modulation includes 1024 overall constellation points.

Referring to FIG. 12, for a given fixed value of the coded bits of a given symbol, (e.g., 0000 1000), each combination of uncoded bits is associated therewith thereby forming a group of associated constellation points. Again, in an embodiment of 10 bit overall symbols, such that 8 bits thereof are coded bits, then for a given value of those coded bits being fixed, there will be 4 associated constellation points identified (e.g., in an embodiment including 2 uncoded bits within the overall 10 bit symbol).

As may be seen with respect to the diagram, the minimum intra-Euclidean distance between any 4 associated constellation points associated with a fixed value of the 8 coded bits within an overall 10 bit symbol (e.g., 4 elements within the set). Every possible Euclidean distance is calculated between those for respective constellation points. As may be seen, the minimum intra-Euclidean distance among that set of Euclidean distances is 32 (i.e., iD=32). Such an embodiment will provide significantly better performance than the previous embodiment having a relatively lower minimum intra-Euclidean distance (i.e., iD=2).

Referring to FIG. 13, it can be seen then a performance gain of approximately 10 dB may be achieved by the signal mapping has provided with respect to FIG. 11 and FIG. 12 in comparison to the signal mapping as provided with respect to FIG. 9 and FIG. 10.

Referring to FIG. 14, this embodiment operates by decreasing the number of coded bits while increasing the number of uncoded bits. This embodiment also operates using symbols having 10 overall bits, yet the number of coded bits is reduced to 6, and the number of uncoded bits is increased to 4.

By performing an analogous analysis as with respect to previous embodiments, it may be seen that the minimum intra-Euclidean distance decreases as the number of uncoded bits increases. Specifically, with respect to this embodiment, the minimum intra-Euclidean distance decreases (i.e., iD=16).

Figure 15:
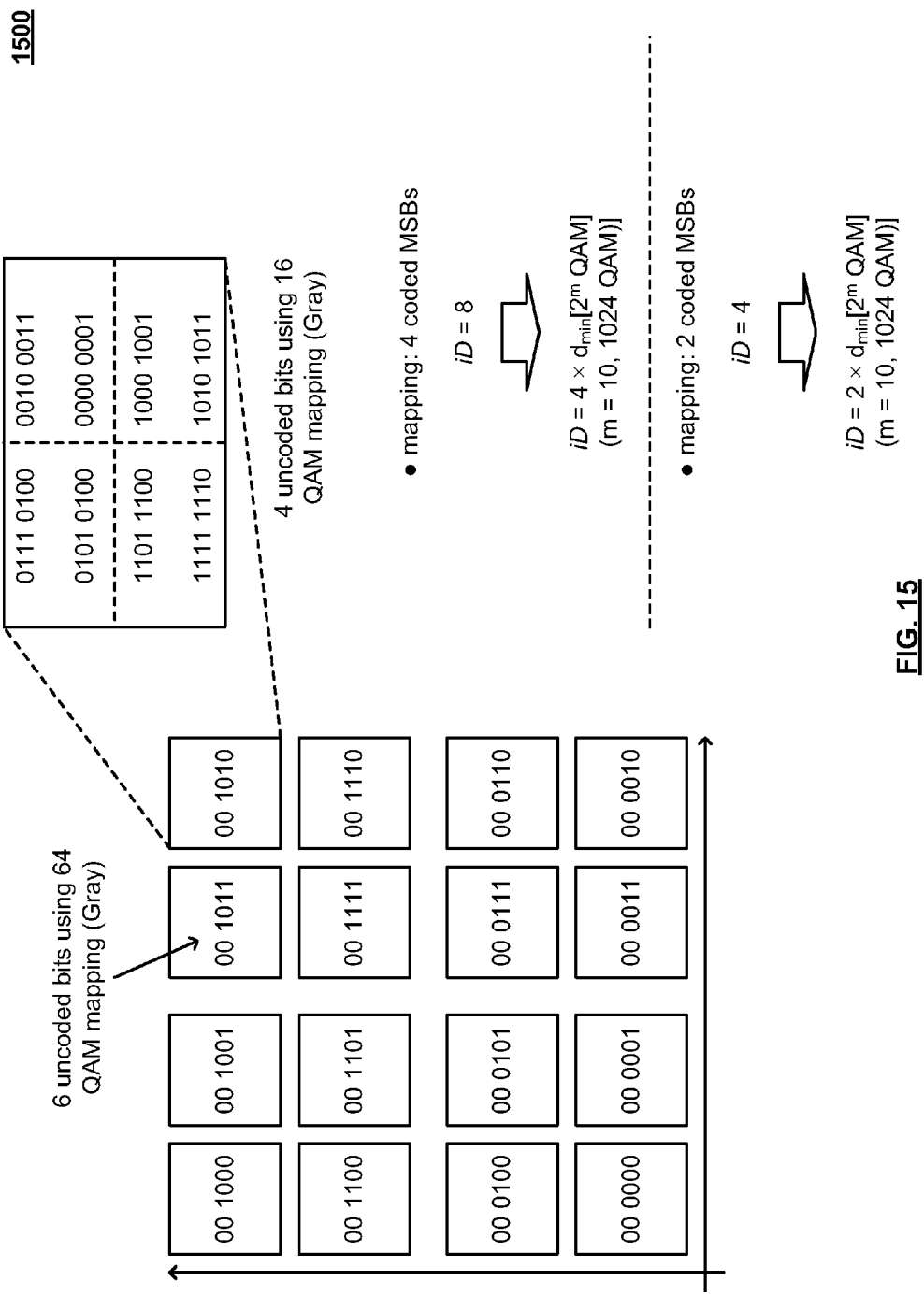
FIG. 15 illustrates another embodiment of increasing minimum intra-distance in accordance with mapping of symbols using 4 coded most significant bits (MSBs).

FIG. 15 illustrates another embodiment 1500 of increasing minimum intra-distance in accordance with mapping of symbols using 4 coded most significant bits (MSBs). This embodiment also operates by decreasing the number of coded bits while increasing the number of uncoded bits. This embodiment also operates using symbols having 10 overall bits, yet the number of coded bits is reduced to 4, and the number of uncoded bits is increased to 6.

By performing an analogous analysis as with respect to previous embodiments, it may be seen that the minimum intra-Euclidean distance also consequently decreases as the number of uncoded bits increases. Specifically, with respect to this embodiment, the minimum intra-Euclidean distance decreases (i.e., iD=8).

With respect to an embodiment that operates by decreasing the number of coded bits while increasing the number of uncoded bits, and specifically operating using symbols having 10 overall bits, yet the number of coded bits is reduced to 2, and the number of uncoded bits is increased to 8, the minimum intra-Euclidean distance also consequently decreases (i.e., iD=4).

A novel and generic formula is presented herein by which a minimum intra-Euclidean distance may be determined for any given signal mapping. For example, consider a $2^{2m}$ QAM signal constellation $\rightarrow 2^{2m}$ symbols.

Such a signal mapping includes a mixture of uncoded bits and coded bits as indicated below:
\# uncoded bits: ucb(even)$\rightarrow$\# coded bits: cb=2m−ucb(even)
$M=2^{(cb/2)}$, $N=2^{(ucb/2)}$
$2^{ucb}$-QAM mapping $P_u$: $(b_{2m-1} \ldots b_{2m-ucb})a(I_u,Q_u)$ where $I_u,Q_u \in \{-N+(2k+1)|k=0,\ldots,N-1\}$
$2^{cb}$-QAM mapping $P_c$: $(b_{2m-1-ucb} \ldots b_0)a(I_c,Q_c)I_c,Q_c \in \{-M+(2k+1)|k=0,\ldots,M-1\}$
Final mapping $P_f$:

$$P_f(b_{2m-1} \ldots b_{2m-ucb}b_{2m-1-ucb} \ldots b_0) = MP_u(b_{m-1} \ldots b_{m-ucb}) + P_c(b_{m01-ucb} \ldots b_0) = (MI_u+I_c, MQ_u+Q_c)$$

Figure 16:
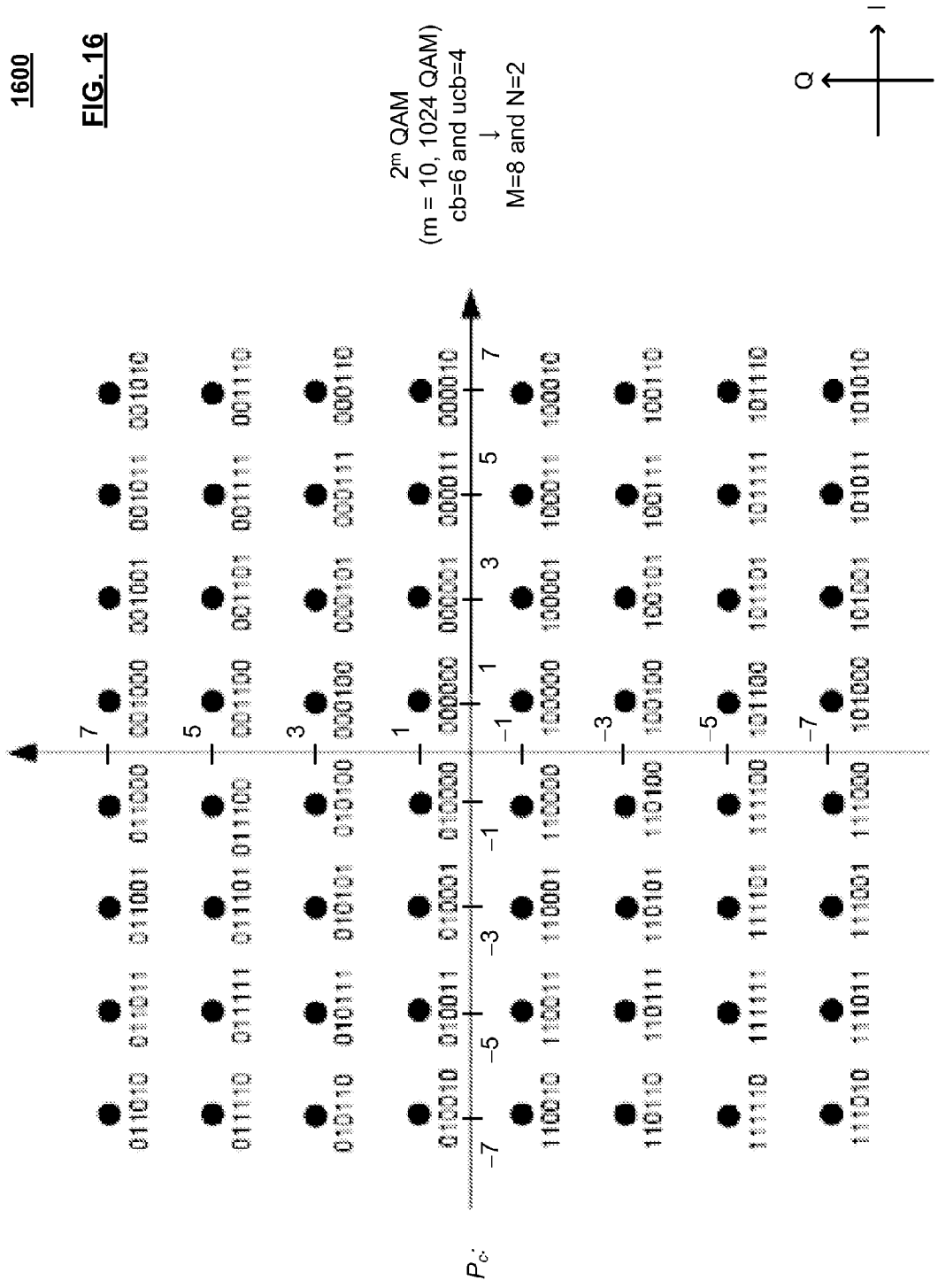
FIG. 16 and FIG. 17 illustrate an embodiment of minimum intra-distance mapping formulation.
Figure 17:
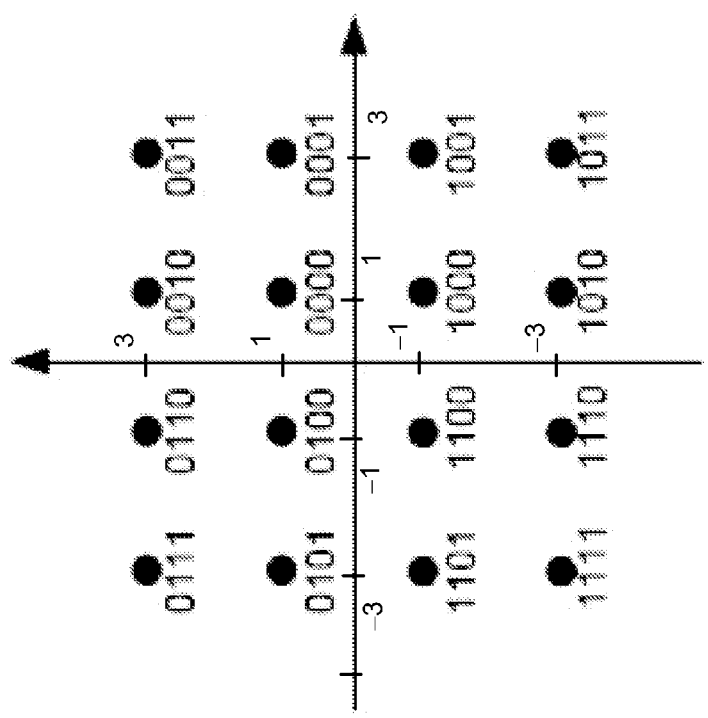

FIG. 16 and FIG. 17 illustrate an embodiment of minimum intra-distance mapping formulation. The FIG. 16 and the FIG. 17, as indicated by reference numerals 1600 and 1700, respectively, show a particular embodiment of 1024 QAM that includes 10 bits symbols composed of a mixture of 6 coded bits (cb) and 4 uncoded bits (ucb).

Example: 1024QAM with cb=6 and ubc=4→M=8 and N=2

$P_c(b_5\ b_4\ b_3\ b_2, b_1, b_0)$=(x, y), with both x and y belong to {−7, −5, −3, −1, 1, 3, 5, 7}

$P_u(b_9\ b_8\ b_7\ b_6)$=(a, b) with both a and b belong to {−3, −1, 1, 3} if $P_u(b_9\ b_8\ b_7\ b_6)$=(1, 1), then $P_f(b_9\ b_8\ b_7\ b_6\ b_5\ b_4\ b_3\ b_2, b_1, b_0)$=(8+x, 8+y) belongs to {1, 3, 5, 7, 9, 11, 13, 15}×{1, 3, 5, 7, 9, 11, 13, 15}

$P_f(b_9\ b_8\ b_7\ b_6\ 00\ 00\ 00)$=(8+1, 8+1)=(9, 9)

if $P_u(b_9\ b_8\ b_7\ b_6)$=(3, 1)

$P_f(b_9\ b_8\ b_7\ b_6\ b_5\ b_4\ b_3\ b_2, b_1, b_0)$=(24+x, 8+y) belongs to {17, 19, 21, 23, 25, 27, 29, 31}×{1, 3, 5, 7, 9, 11, 13, 15}

If $P_u(b_9\ b_8\ b_7\ b_6)$=(−1, 1)

$P_f(b_9\ b_8\ b_7\ b_6\ b_5\ b_4\ b_3\ b_2, b_1, b_0)$=(−8+x, 8+y) belongs to {−1, −3, −5, −7, −9, −11, −13, −15}×{1, 3, 5, 7, 9, 11, 13, 15}

If $P_u(b_9\ b_8\ b_7\ b_6)$=(−3, 1)

$P_f(b_9\ b_8\ b_7\ b_6\ b_5\ b_4\ b_3\ b_2, b_1, b_0)$=(−24+x, 8+y) belongs to {−17, −19, −21, −23, −25, −27, −29, −31}×{1, 3, 5, 7, 9, 11, 13, 15}

It is noted that while certain embodiments described herein use exemplary embodiments including constellations whose constellation points therein are mapped in accordance with symbols having even numbers of bits, the in accordance with various aspects, and their equivalents, of the invention may also be extended to constellations whose constellation points therein are mapped in accordance with symbols having odd numbers of bits.

FIG. 17, FIG. 18, FIG. 19, and FIG. 20 illustrate various embodiments 1800, 1900, 2000, and 2100, respectively, of performance comparisons showing performance improvement as may be achieved in accordance with increasing minimum intra-distance in accordance with mapping of symbols.

When considering the various diagrams of the previous 4 diagrams and/or Figures, it can be seen that a more optimal operating point, such as a sweet spot, may be identified including appropriate combination of a certain number of coded bits with a certain number of uncoded bits to provide a best possible performance.

Figure 18:
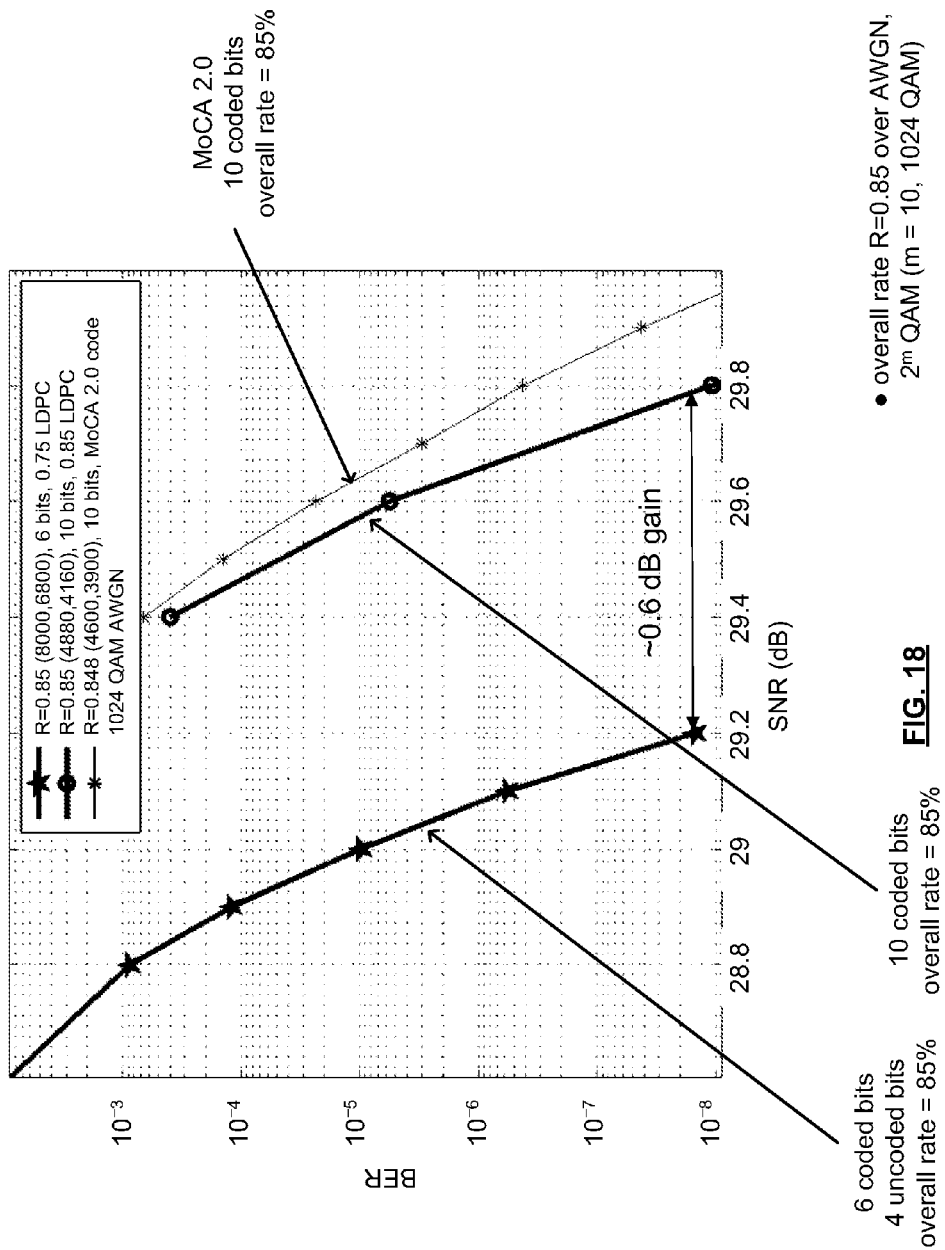
FIG. 18, FIG. 19, FIG. 20, and FIG. 21 illustrate various embodiments of performance comparisons showing performance improvement as may be achieved in accordance with increasing minimum intra-distance in accordance with mapping of symbols.

Referring to embodiment 1800 of FIG. 18, a significant performance improvement of approximately 0.6 dB may be achieved by employing a combination of certain coded bits and uncoded bits, in comparison to employing all coded bits, while nonetheless providing the same overall rate.

Figure 19:
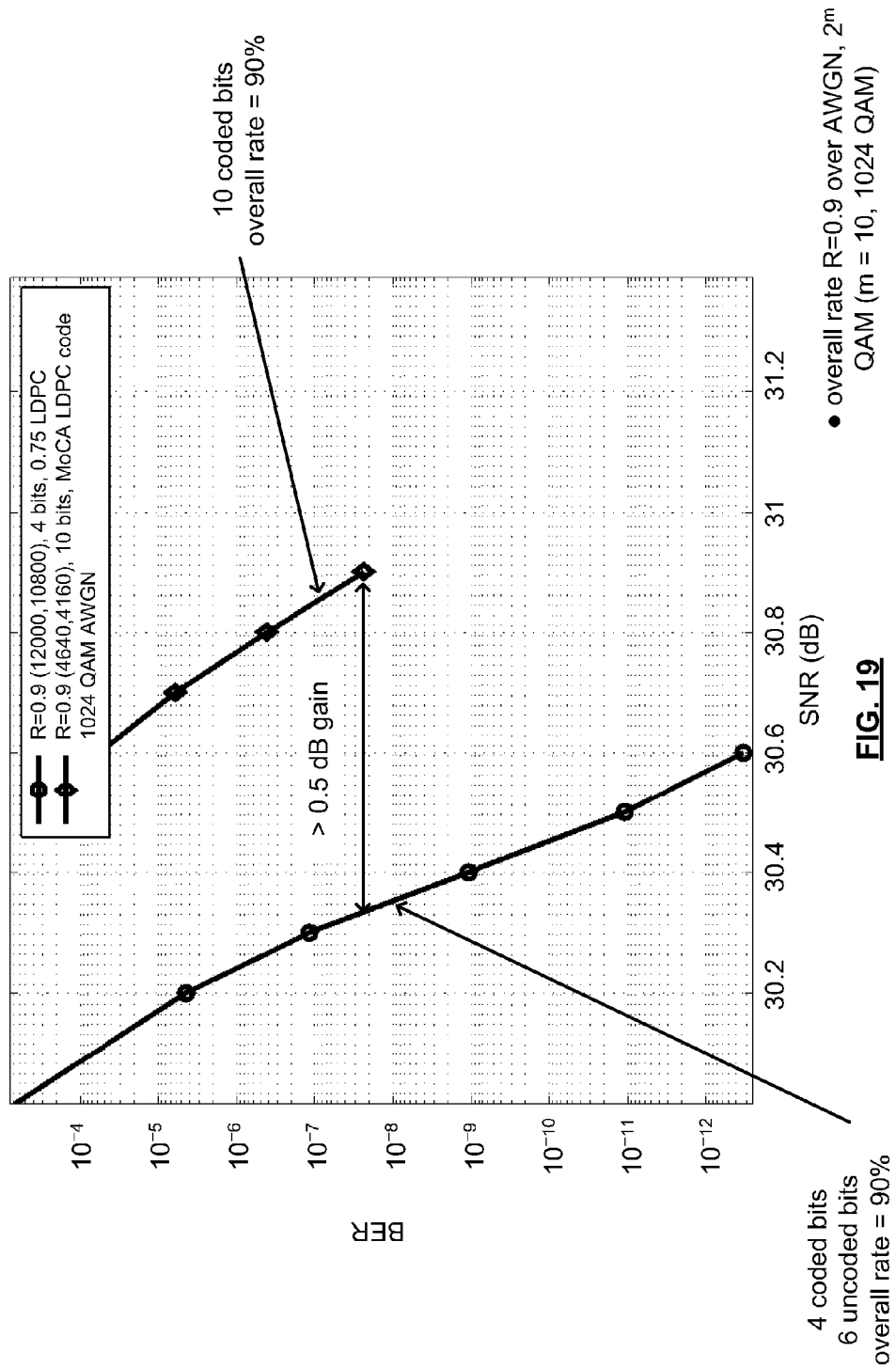

Referring to embodiment 1900 of FIG. 19, a significant performance improvement of approximately more than 0.5 dB may be achieved by employing a combination of certain coded bits and uncoded bits, in comparison to employing all coded bits, while nonetheless providing the same overall rate.

Figure 20:
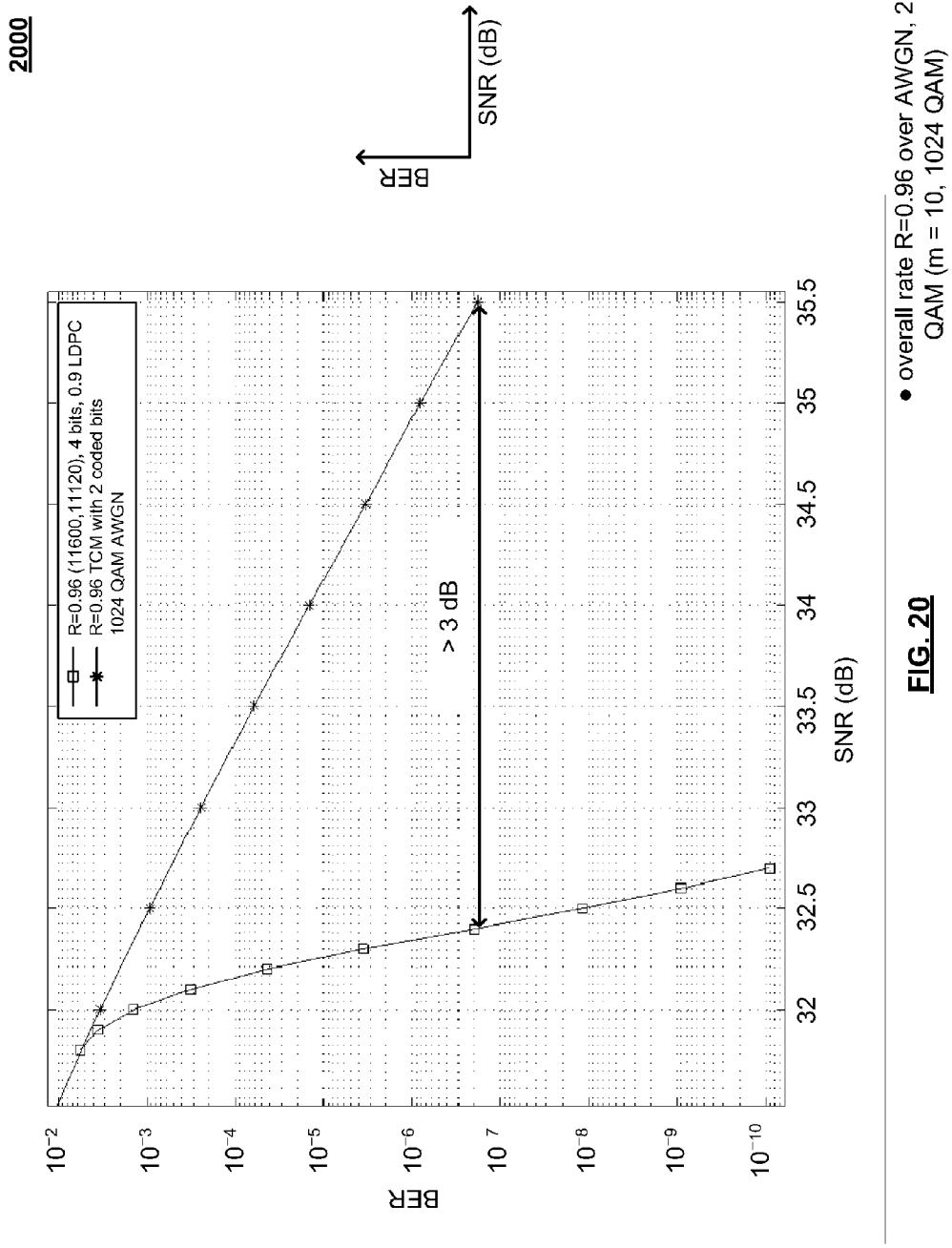

Referring to embodiment 2000 of FIG. 20, a significant performance improvement of approximately more than 3 dB may be achieved by employing a combination of certain coded bits and uncoded bits, in comparison to employing all coded bits, while nonetheless providing the same overall rate.

Figure 21:
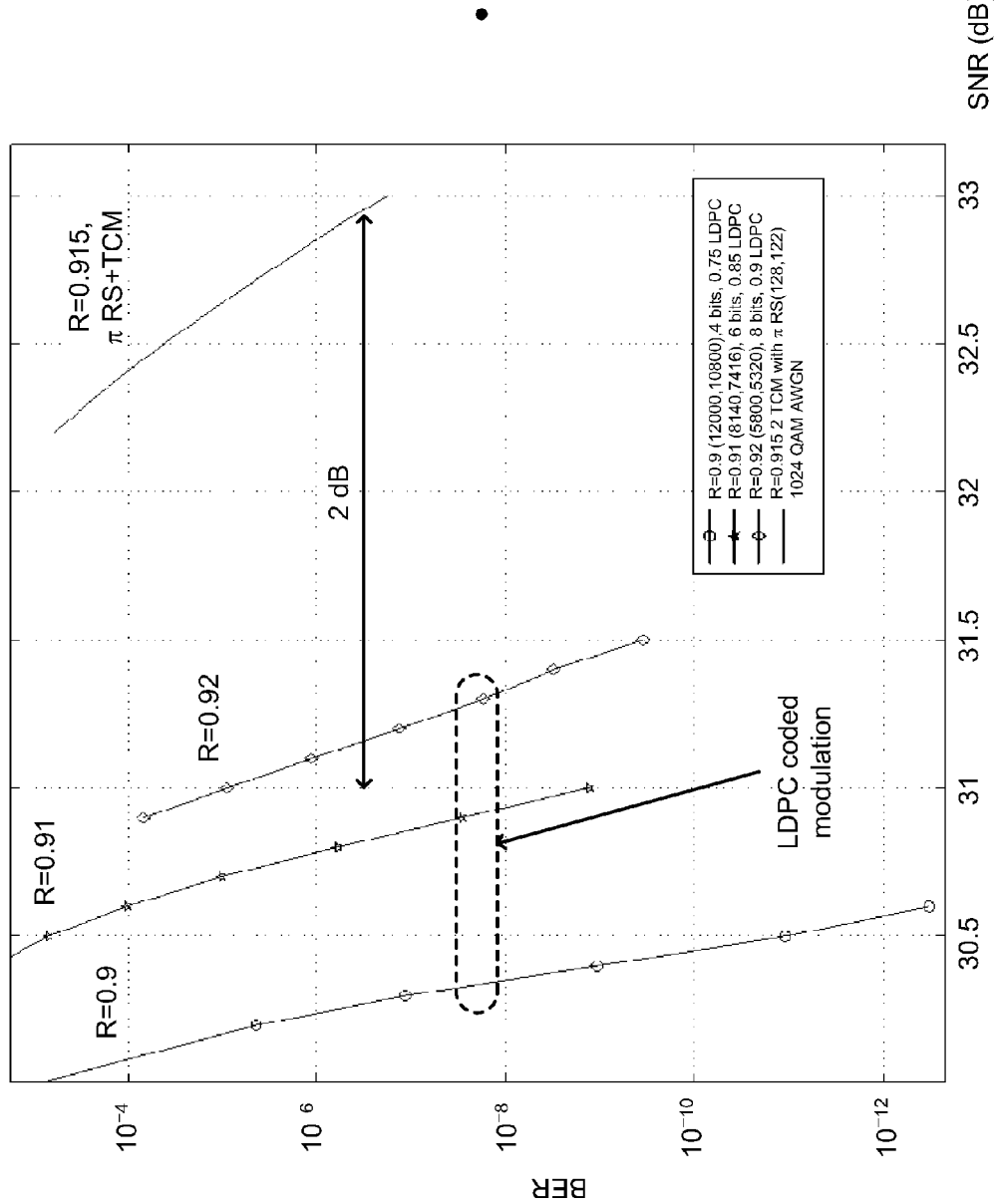

Referring to embodiment 2100 of FIG. 21, a significant performance improvement of approximately 2 dB may be achieved by employing a combination of certain coded bits and uncoded bits, in comparison to employing all coded bits, while nonetheless providing the same overall rate.

Generally speaking, a best suitable number of coded bits may be selected for higher overall rates. Again, a more optimal operating point, such as a sweet spot, may be identified specifically with respect to higher overall rates.

Figure 22:
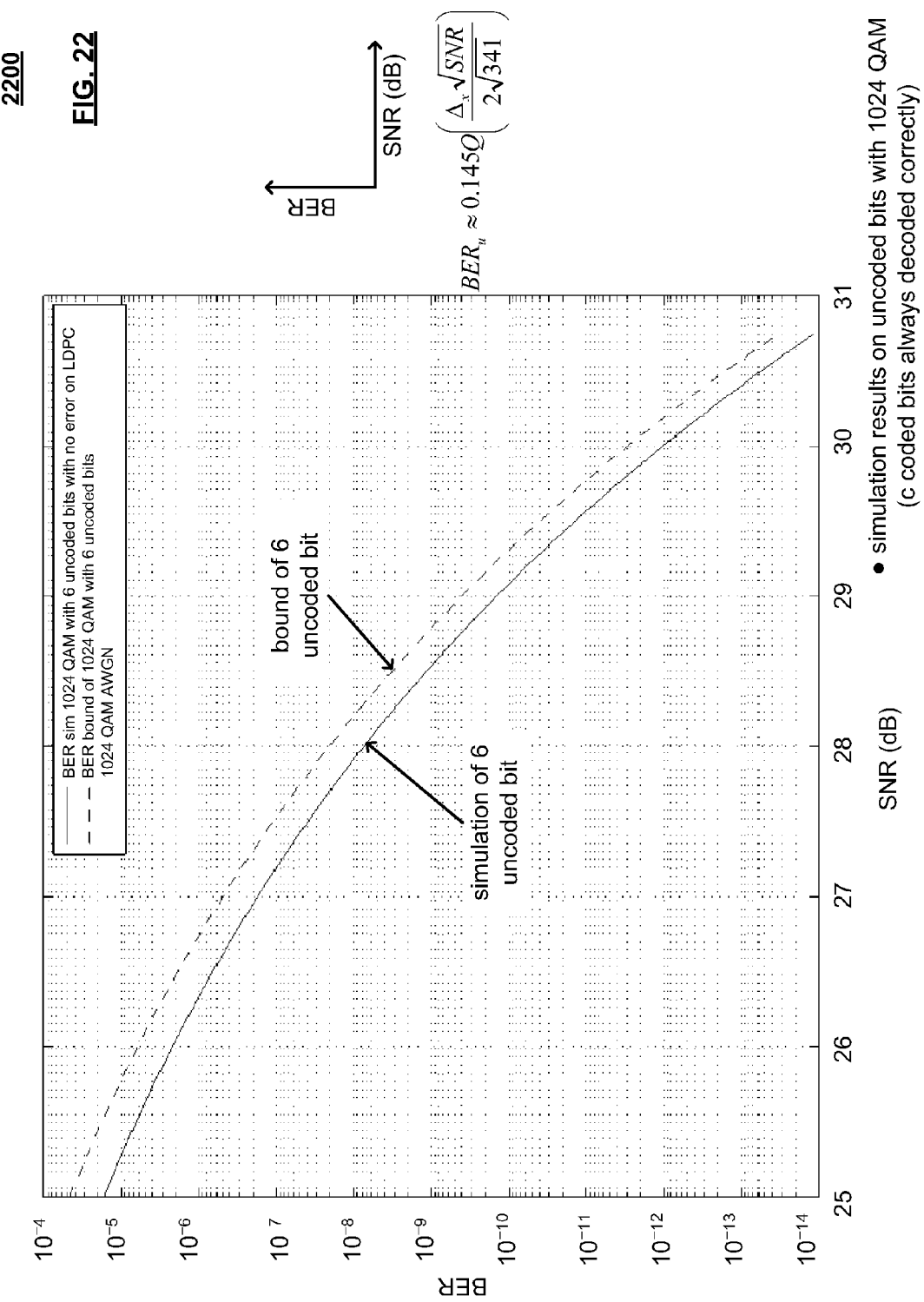
FIG. 22 illustrates an embodiment of performance comparison showing simulation and bound of symbol modulation with 6 uncoded bits.

FIG. 22 illustrates an embodiment 2200 of performance comparison showing simulation and bound of symbol modulation with 6 uncoded bits. This diagram depicts the bit error rate bound for a particular selection of 6 uncoded bits.

This error rate bound is related to the minimum Euclidean distance of a given signal constellation as follows:

$\Delta_x$: minimum euclidean distance of a signal constellation $M_n$: largest number of neighboring points that are at distance $\Delta_x$ from any constellation point ⇒ Symbol error rate: $Pr(e) < M_n Q(\sqrt{\Delta_x^2/2N_o})$ Assuming all 'c' coded bits are correct for any given embodiment, then the error bound for the corresponding uncoded bits may be described as follows:

1024 QAM with constellation signal (I, Q) where I, Q∈{±1, ±3, ±5, L, ±31}

Average power $$P = \left(\sum_{I,Q}(I^2+Q^2)\right)/1024 = 682 \Rightarrow \frac{N_0}{2} = \sigma^2 = \frac{P}{2SNR} = \frac{341}{SNR}$$

c: # coded bits

Mapping: maximal min intra distance mapping ⇒ Min intra distance: $\Delta_x = \sqrt{2^c}\Delta_0$ where $\Delta_0=2$ is the minimun distance of 1024QAM Moreover, $M_n=4$ ⇒ probability of error on uncoded bits:

$$Pr(e) < 4Q\left(\frac{\Delta_x}{2\sigma}\right) = 4Q\left(\frac{\Delta_x}{2\sqrt{\frac{341}{SNR}}}\right) = 4Q\left(\frac{\Delta_x\sqrt{SNR}}{2\sqrt{341}}\right) \Rightarrow BER_u = \frac{Pr(e)}{10/2} < \frac{4}{5}Q\left(\frac{\Delta_x\sqrt{SNR}}{2\sqrt{341}}\right)$$

Figure 23:
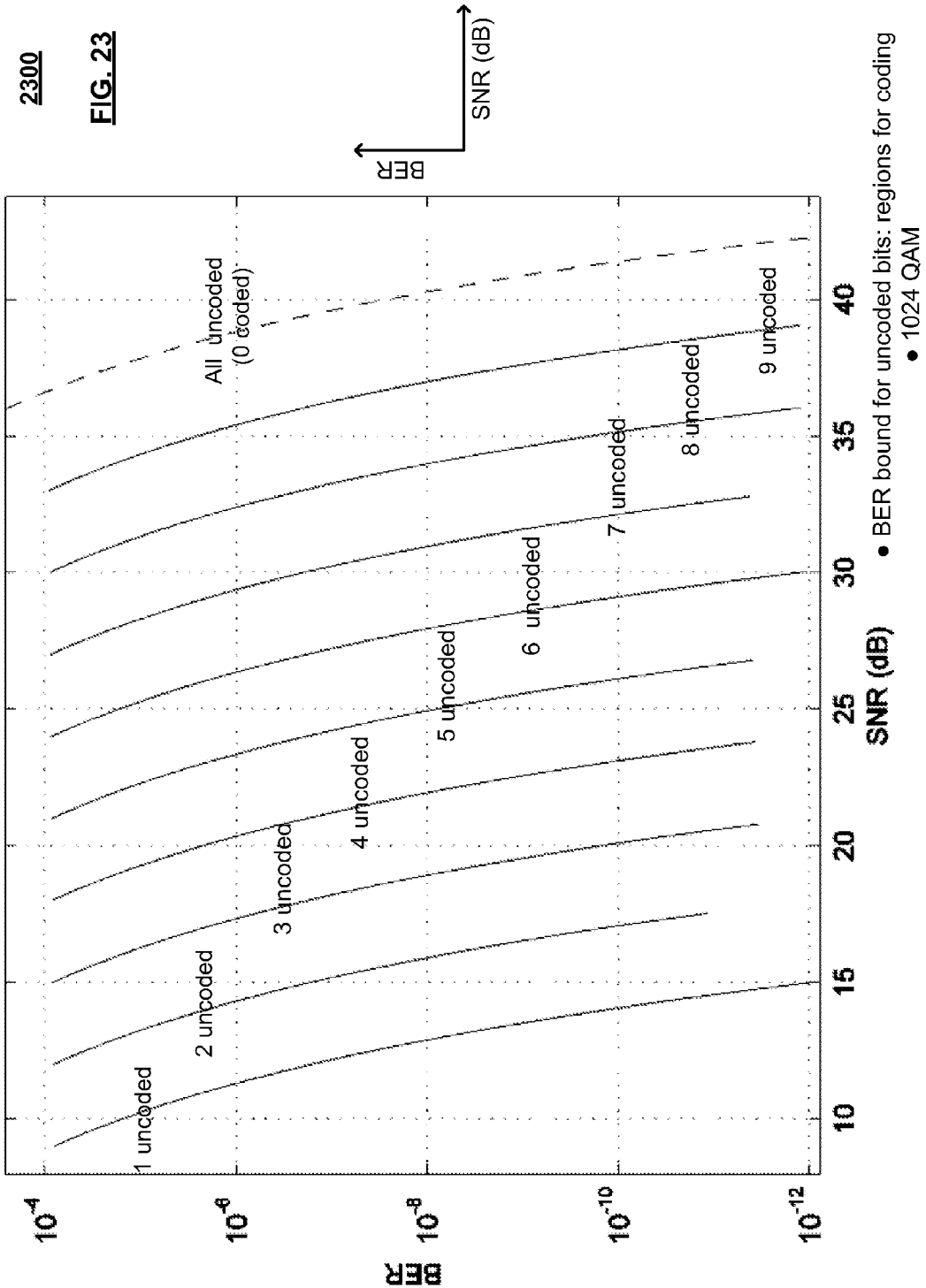
FIG. 23 illustrates an embodiment of performance comparisons and showing bit error rate (BER) bound for various numbers of uncoded bits.

FIG. 23 illustrates an embodiment 2300 of performance comparisons and showing bit error rate (BER) bound for various numbers of uncoded bits. As can be seen with respect to this diagram, for different respective numbers of uncoded bits, the bit error rate (BER) bounds are substantially evenly distributed. Based upon such a diagram, for a given signal to noise ratio (SNR), a particular number of uncoded bits may be selected for a given application. That is to say, depending upon what SNR a given communication and/or communication channel may provide, then an appropriate number of uncoded bits may be selected for such a given application.

Figure 24:
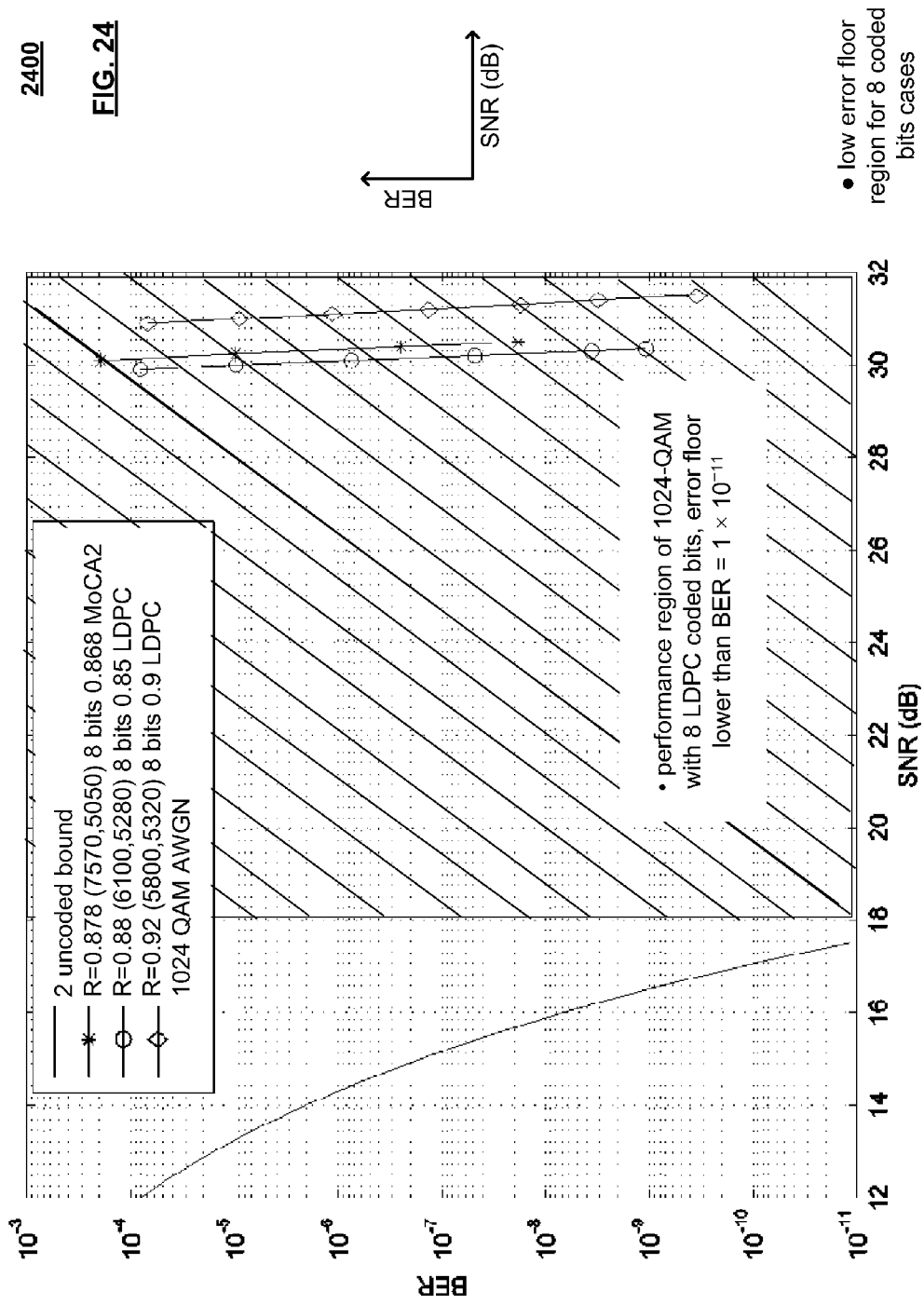
FIG. 24 illustrates an embodiment of performance comparison and showing a low-error floor region for various 8 coded bit cases.

FIG. 24 illustrates an embodiment 2400 of performance comparison and showing a low-error floor region for various 8 coded bit cases. As can be seen with respect to this diagram, there is no error floor within the diagonal line marked region on the right-hand side of the performance diagram. While at least one positive characteristic exists based upon the fact that that there is no error floor within this operating region, there are a relatively large number of coded bits (e.g., 8 coded bits) within this embodiment.

Certain of the various subsequent diagrams depicted herein relate to decreasing the number of coded bits employed.

Figure 25:
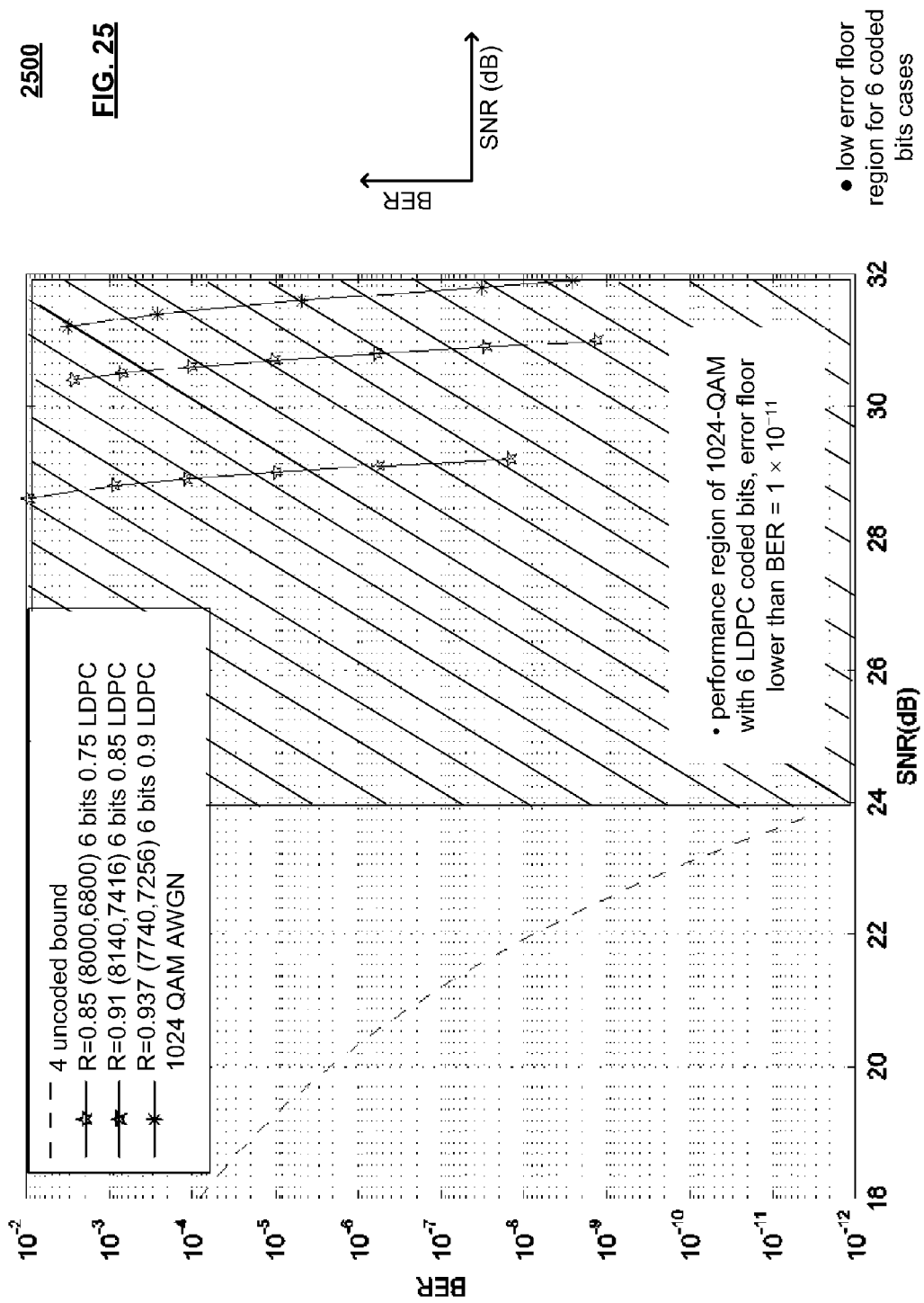
FIG. 25 illustrates an embodiment of performance comparison and showing a low-error floor region for various 6 coded bit cases.

FIG. 25 illustrates an embodiment 2500 of performance comparison and showing a low-error floor region for various 6 coded bit cases.

Figure 26:
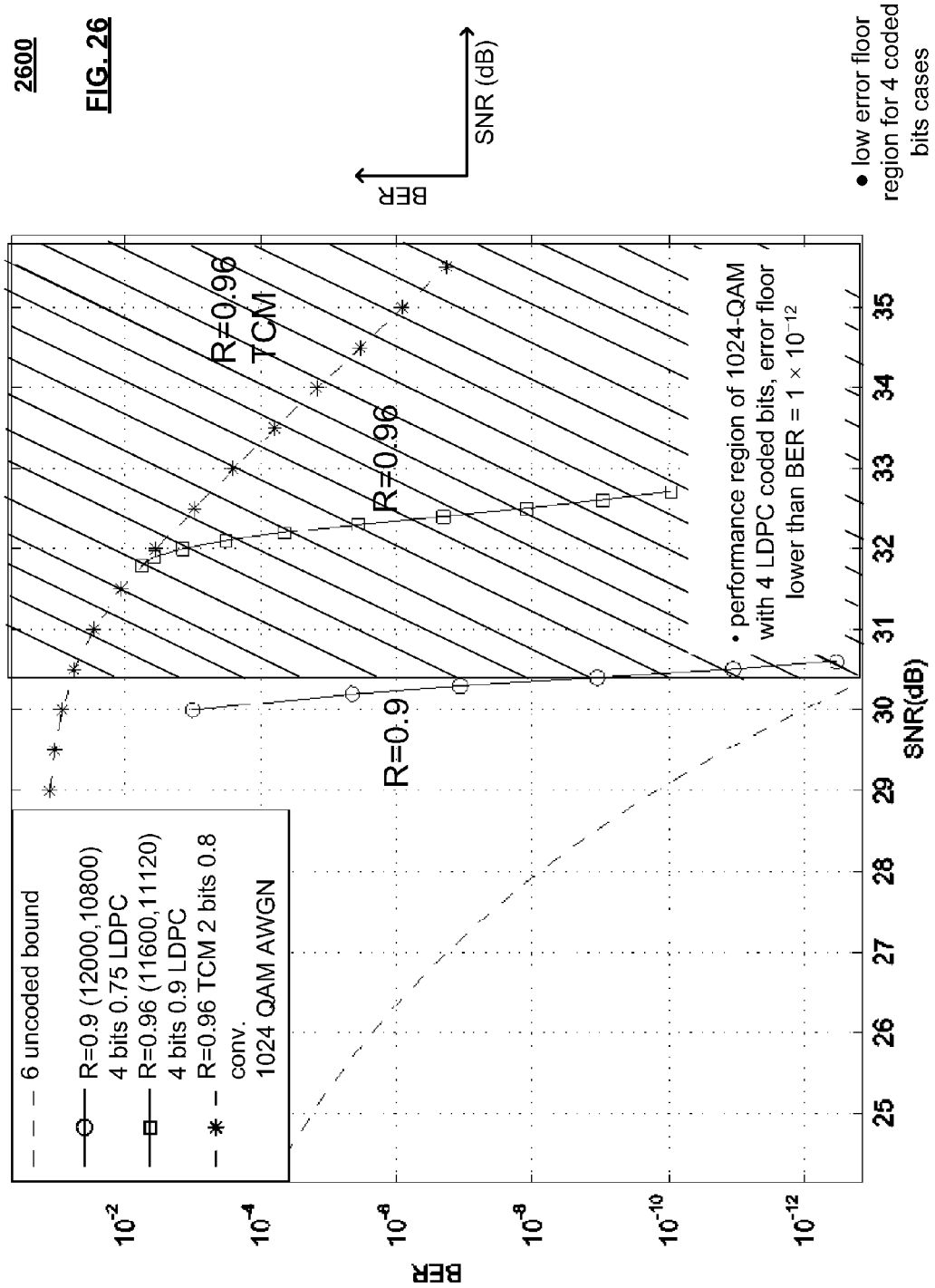
FIG. 26 illustrates an embodiment of performance comparison and showing a low-error floor region for various 4 coded bit cases.

FIG. 26 illustrates an embodiment 2600 of performance comparison and showing a low-error floor region for various 4 coded bit cases (e.g., 6 uncoded bits). As can be seen with respect to this diagram, the performance is approaching that of the BER bound of an embodiment including 6 uncoded bits.

Figure 27:
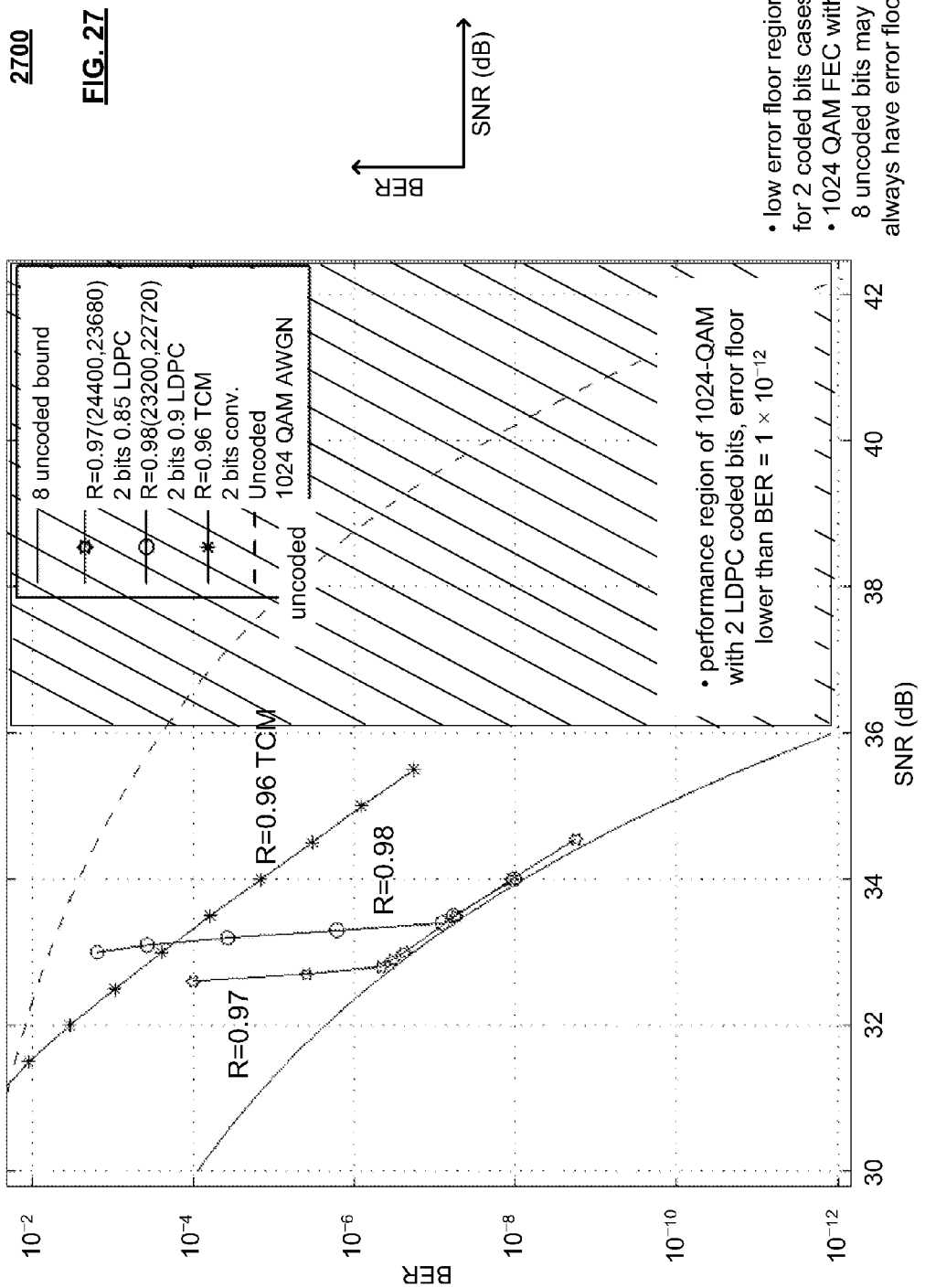
FIG. 27 illustrates an embodiment of performance comparison and showing a low-error floor region for various 2 coded bit cases.

FIG. 27 illustrates an embodiment 2700 of performance comparison and showing a low-error floor region for various 2 coded bit cases.

Figure 28:
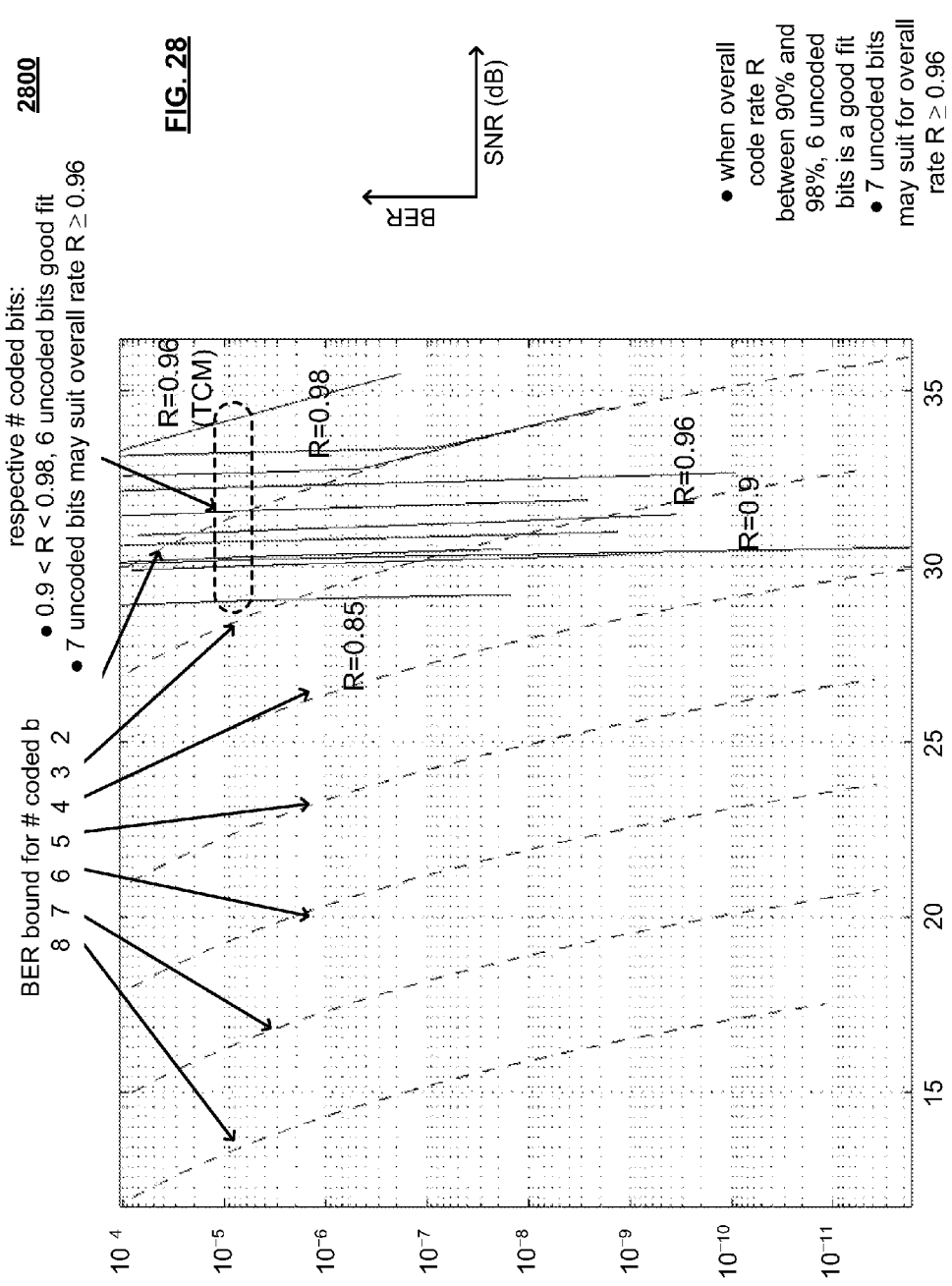
FIG. 28 illustrates an embodiment of performance comparisons for various numbers of uncoded bits

FIG. 28 illustrates an embodiment 2800 of performance comparisons for various numbers of uncoded bits. As may be seen with respect to this diagram, when the overall code rate R is between 90% to 98%, 6 uncoded bits is a relatively good and acceptable fit. An embodiment employing 7 uncoded bits may be suitable for an overall rate R≥0.96.

As may be understood with reference to at least FIG. 3 herein, one or more outer codes may be employed to help mitigate an error floor such as may be caused by including uncoded bits within a signal mapping composed of a mixture of both uncoded bits and coded bits.

Figure 29:
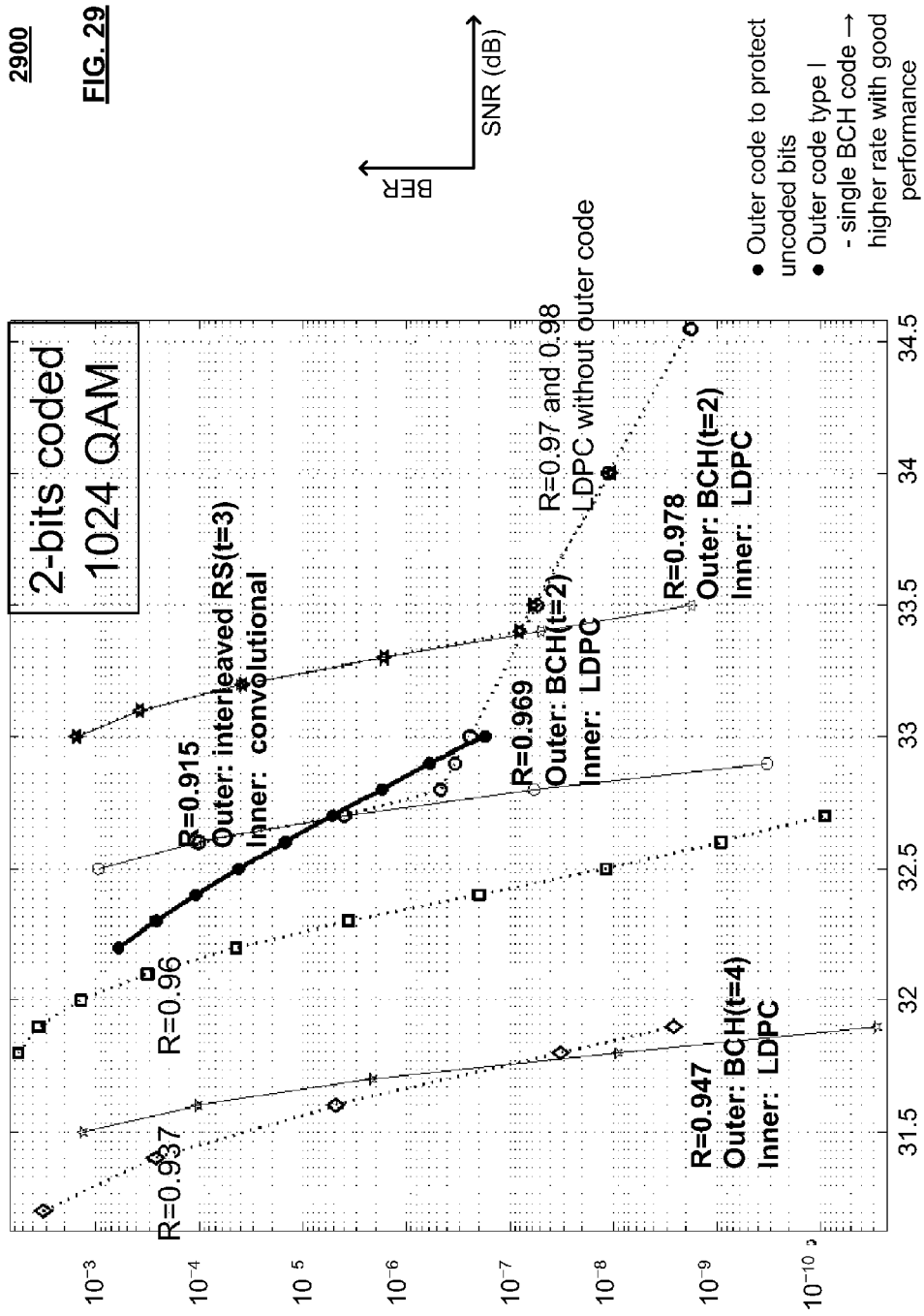
FIG. 29 illustrates an embodiment of performance comparison in accordance with employing an outer code, specifically using a single BCH (Bose and Ray-Chaudhuri) code, to protect uncoded bits.

FIG. 29 illustrates an embodiment 2900 of performance comparison in accordance with employing an outer code, specifically using a single BCH (Bose and Ray-Chaudhuri) code, to protect uncoded bits. With respect to this diagram, a single BCH code is employed which provides for a higher rate with relatively good performance.

Figure 30:
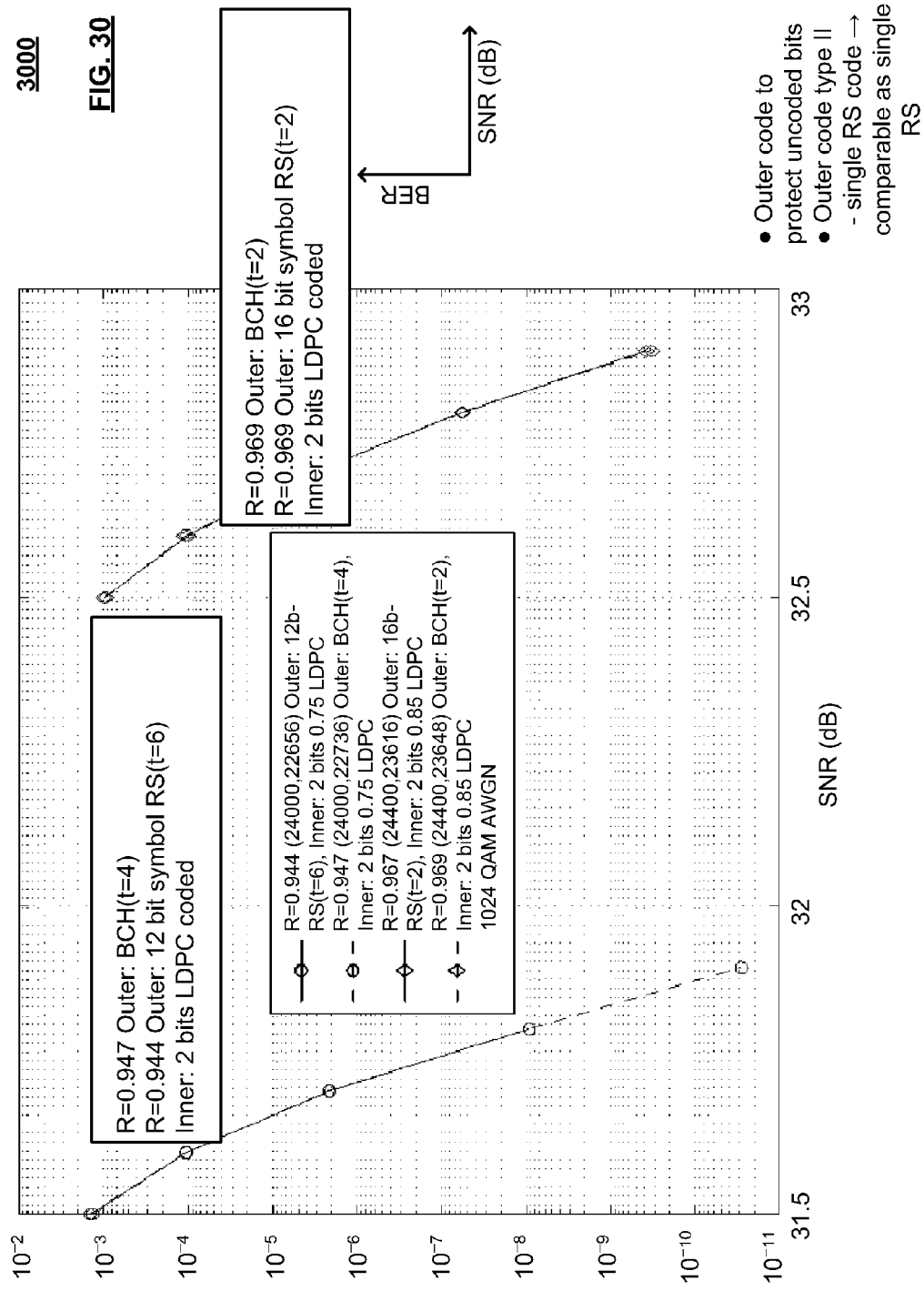
FIG. 30 illustrates an embodiment of performance comparison in accordance with employing an outer code, specifically using a single Reed-Solomon (RS) code, to protect uncoded bits.

FIG. 30 illustrates an embodiment 3000 of performance comparison in accordance with employing an outer code, specifically using a single Reed-Solomon (RS) code, to protect uncoded bits. With respect to this diagram, a single RS code is employed which provides for a higher rate with relatively good performance. In comparison to that performance provided and indicated with respect to the previous diagram, the performance is comparable to using a single BCH code as an outer code.

Figure 31:
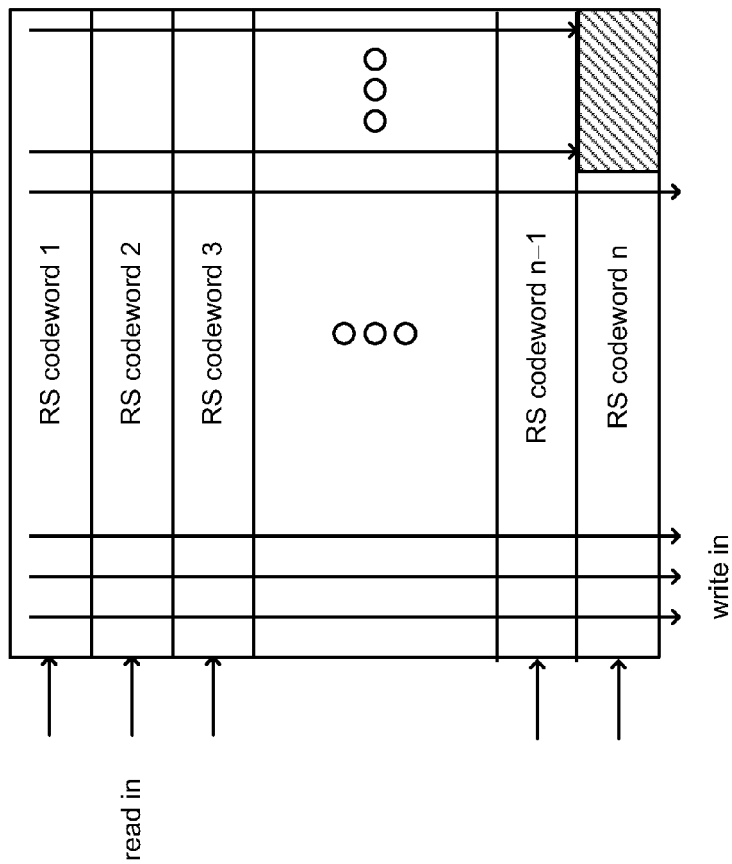
FIG. 31 illustrates an embodiment of depicting an interleaved (π) RS code.

FIG. 31 illustrates an embodiment 3100 of depicting an interleaved (π) RS code. In accordance with employing a Reed-Solomon (RS) code as an outer code, respective RS codewords are arranged horizontally and successively with respect to each other thereby forming a matrix shape in accordance with a 'read in' operation. To effectuate the appropriate interleaving, respective groups of bits are 'written out' vertically from the matrix shape.

It is noted that while an interleaved RS code is described herein, and interleaved convolution code may also be employed without departing from the scope and spirit of the invention. Generally speaking, the use of an interleaved convolutional code may provide comparable performance as an interleaved RS code, but may provide a savings in terms of area, memory, etc.

Figure 32:
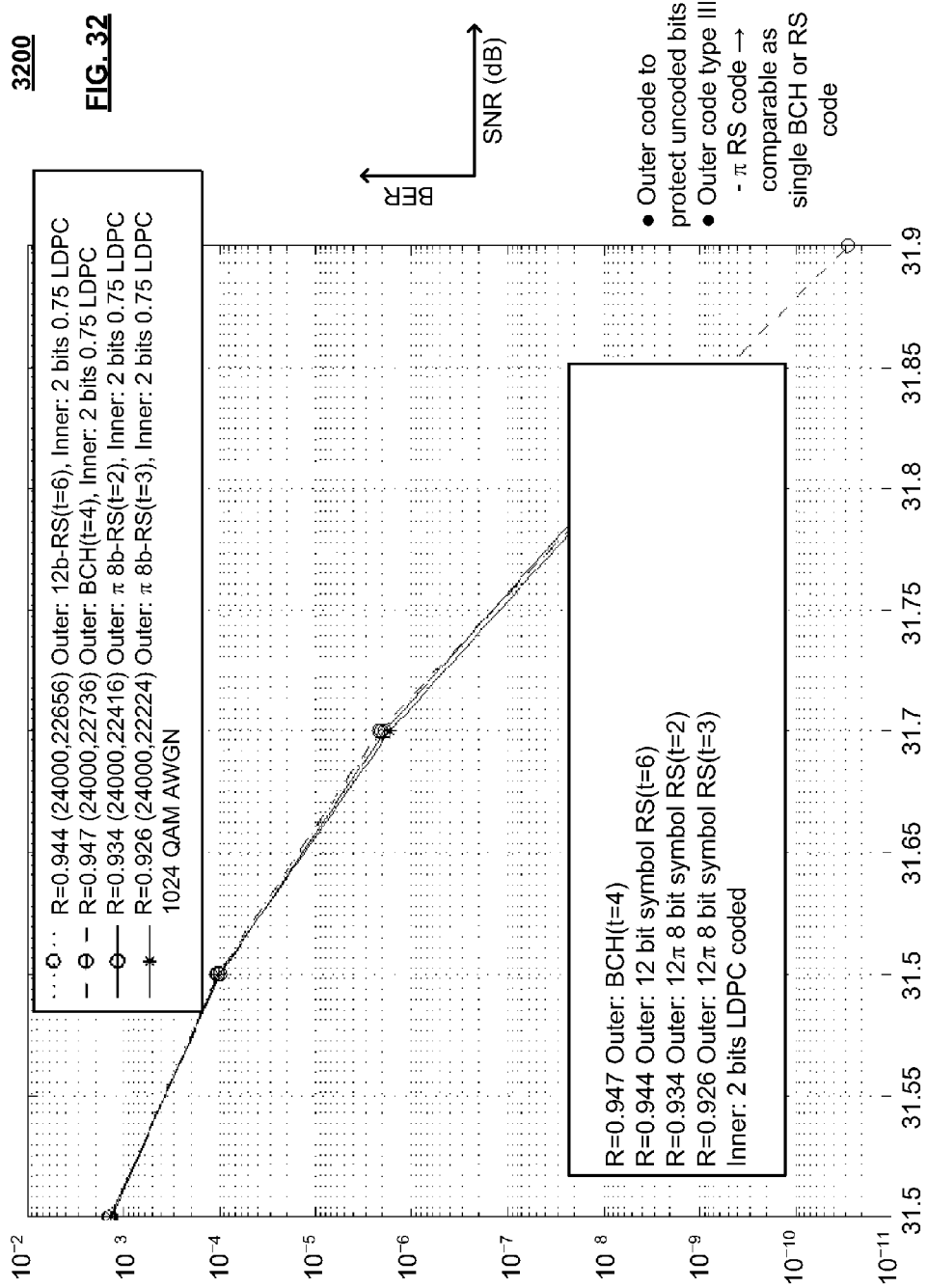
FIG. 32 illustrates an embodiment of performance comparison in accordance with employing an outer code, specifically using an interleaved (π) RS code, to protect uncoded bits.

FIG. 32 illustrates an embodiment 3200 of performance comparison in accordance with employing an outer code, specifically using an interleaved (π) RS code, to protect uncoded bits. As can be seen with respect to this diagram, the use of an interleaved RS code as an outer code provides comparable performance as a suspect to previous embodiments employing a single BCH code as an outer code and a single RS code as an outer code, respectively. Generally speaking, these three embodiments that employ some form of outer code provide substantially comparable performance.

Figure 33:
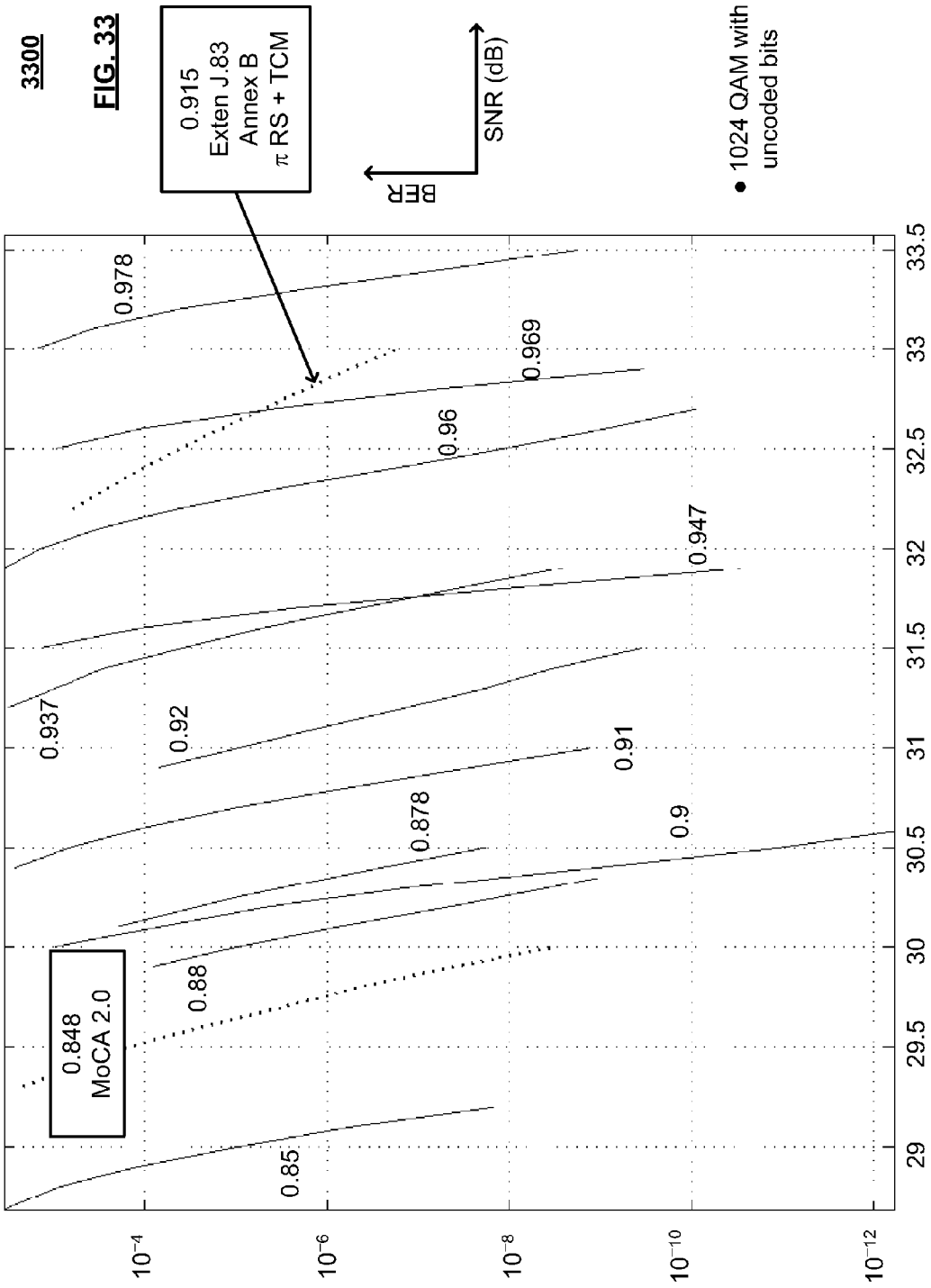
FIG. 33 illustrates an embodiment of performance comparison of a number of codes including uncoded bits.

FIG. 33 illustrates an embodiment 3300 of performance comparison of a number of codes including uncoded bits. This diagram corresponds to respective signal mappings of 1024 QAM with respective numbers of uncoded bits.

Figure 34:
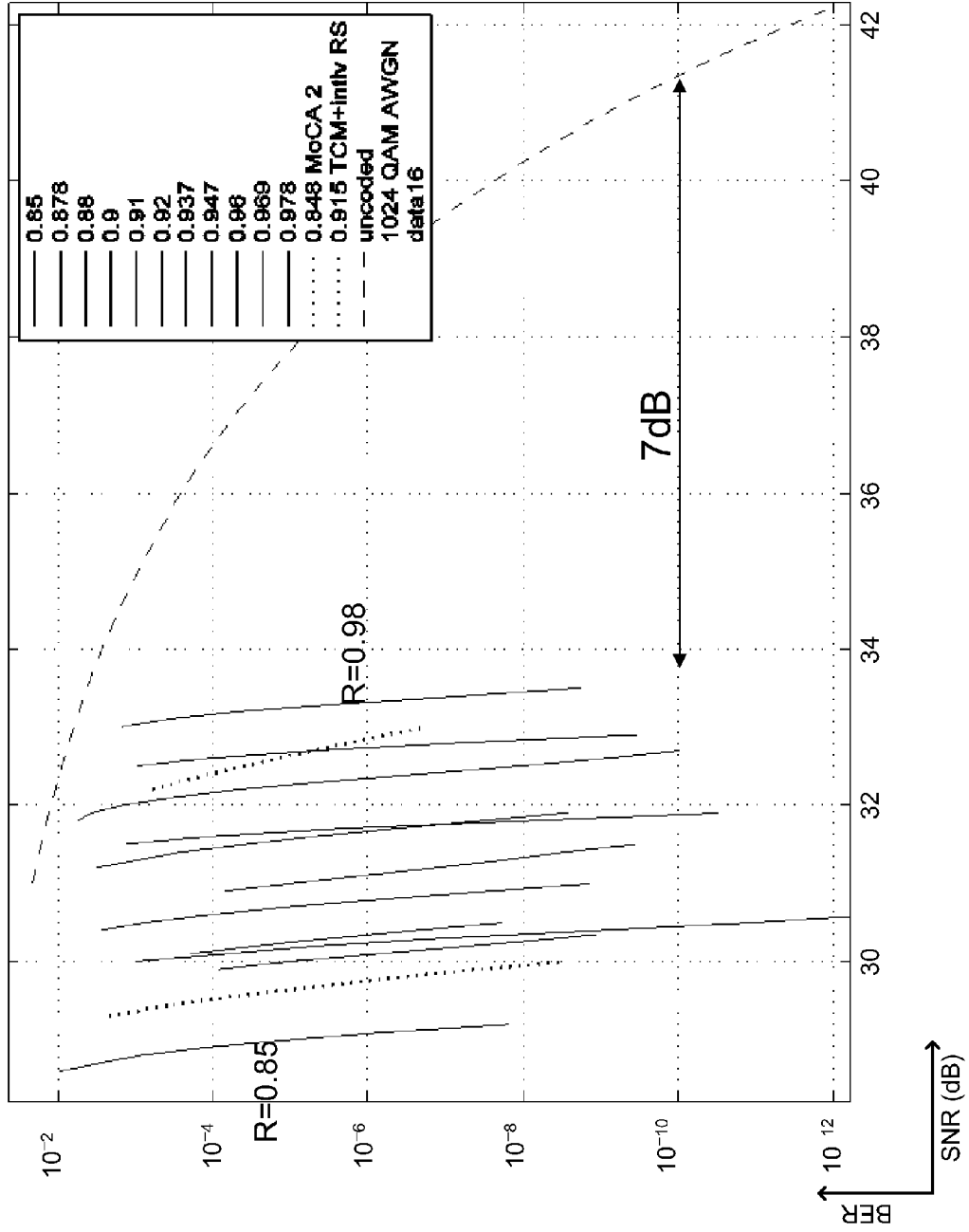
FIG. 34 illustrates an embodiment of performance comparison of a number of codes including uncoded bits, and specifically when compared to uncoded 1024 quadrature amplitude modulation (QAM).

FIG. 34 illustrates an embodiment 3400 of performance comparison of a number of codes including uncoded bits, and specifically when compared to uncoded 1024 quadrature amplitude modulation (QAM). As can be seen within the diagram, by employing symbol mapping in accordance with in accordance with various aspects, and their equivalents, of the invention, including combination of both coded bits and uncoded bits, a significant performance improvement of approximately 7 dB may be achieved by employing a combination of certain coded bits and uncoded bits, in comparison to employing uncoded 1024 QAM.

FIG. 35A, FIG. 35B, FIG. 36A, and FIG. 36B are diagrams illustrating embodiments of various methods as may be performed within one or more communication devices.

Figure 35:
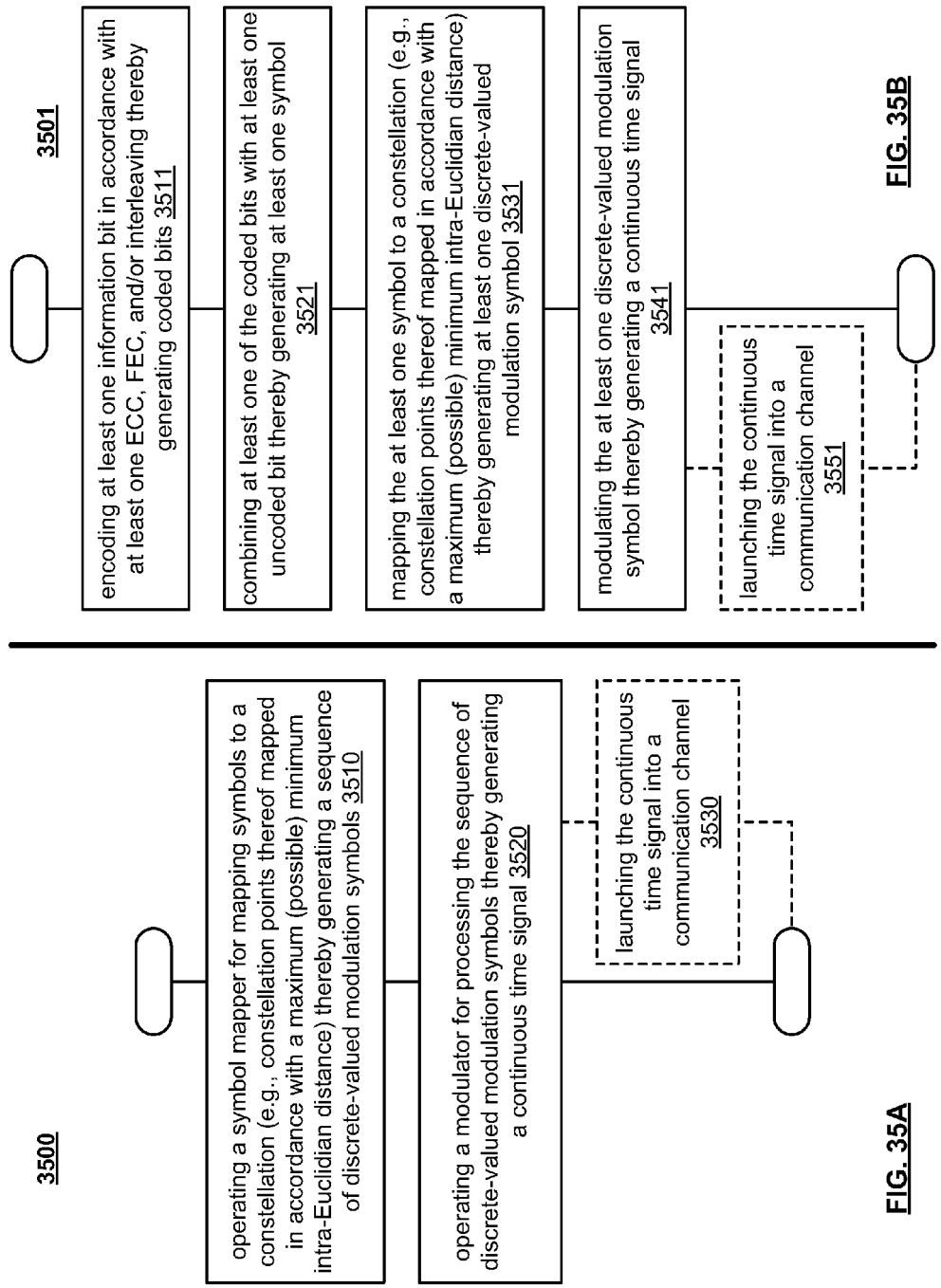
FIG. 35A, FIG. 35B, FIG. 36A, and FIG. 36B are diagrams illustrating embodiments of various methods as may be performed within one or more communication devices.

Referring to the method 3500 of FIG. 35A, the method 3500 begins by operating a symbol mapper for mapping symbols to a constellation thereby generating a sequence of discrete-valued modulation symbols, as shown a block 3510. Constellation points within the constellation are mapped in accordance with a maximum minimum intra-Euclidian distance. Further details are included above with respect to ensuring that the constellation points of a given mapping are mapped in accordance with a maximum possible minimum intra-Euclidian distance.

The method 3500 continues by operating modulator for processing the sequence of discrete-valued modulation symbols thereby generating a continuous time signal, as shown in a block 3520. In certain situations and embodiments, the method 3500 also includes launching the continuous time signal in a communication channel, as shown in a block 3530.

Such operations as described with respect to the method 3500, as well as other methods described within various diagrams and/or embodiments herein including those described in further detail below, may be performed within any of a number of devices including respective communication devices that may be implemented within any of a number of different types of communication systems including, but not limited to, those described with reference to FIG. 1.

Referring to the method 3501 of FIG. 35A, the method 3501 operates by encoding at least one information bit in accordance with at least one ECC, FEC, and/or interleaving thereby generating coded bits, as shown in a block 3511. The method 3501 continues by combining at least one of the coded bits with at least one uncoded bit thereby generating at least one symbol, as shown in a block 3521. In certain situations and/or embodiments, the at least one uncoded bit may be selected from or extracted from information bits from which the at least one information bit is also extracted from within the block 3511. For example, in some situations, the at least one information bit within the block 3511 is same as the at least one uncoded bit within the block 3521. As can be seen within such a situation, a copy or duplicate of the at least one information bit within the block 3511 may bypass encoding and be combined with at least one of the coded bits that is generated from the encoding. In even other embodiments, the at least one uncoded bit is from an entirely separate and different source or stream than that which provides the at least one information bit.

The method 3501 also operates by mapping the at least one symbol to a constellation thereby generating a sequence of discrete-valued modulation symbols, as shown a block 3531. Constellation points within the constellation are mapped in accordance with a maximum minimum intra-Euclidian distance. Further details are included above with respect to ensuring that the constellation points of a given mapping are mapped in accordance with a maximum possible minimum intra-Euclidian distance.

The method 3501 also performs at least one operation associated with modulating the at least one discrete-valued modulation symbol thereby generating a continuous time symbol, as shown in a block 3541. In certain situations and embodiments, the method 3501 also includes launching the continuous time signal in a communication channel, as shown in a block 3551.

Figure 36:
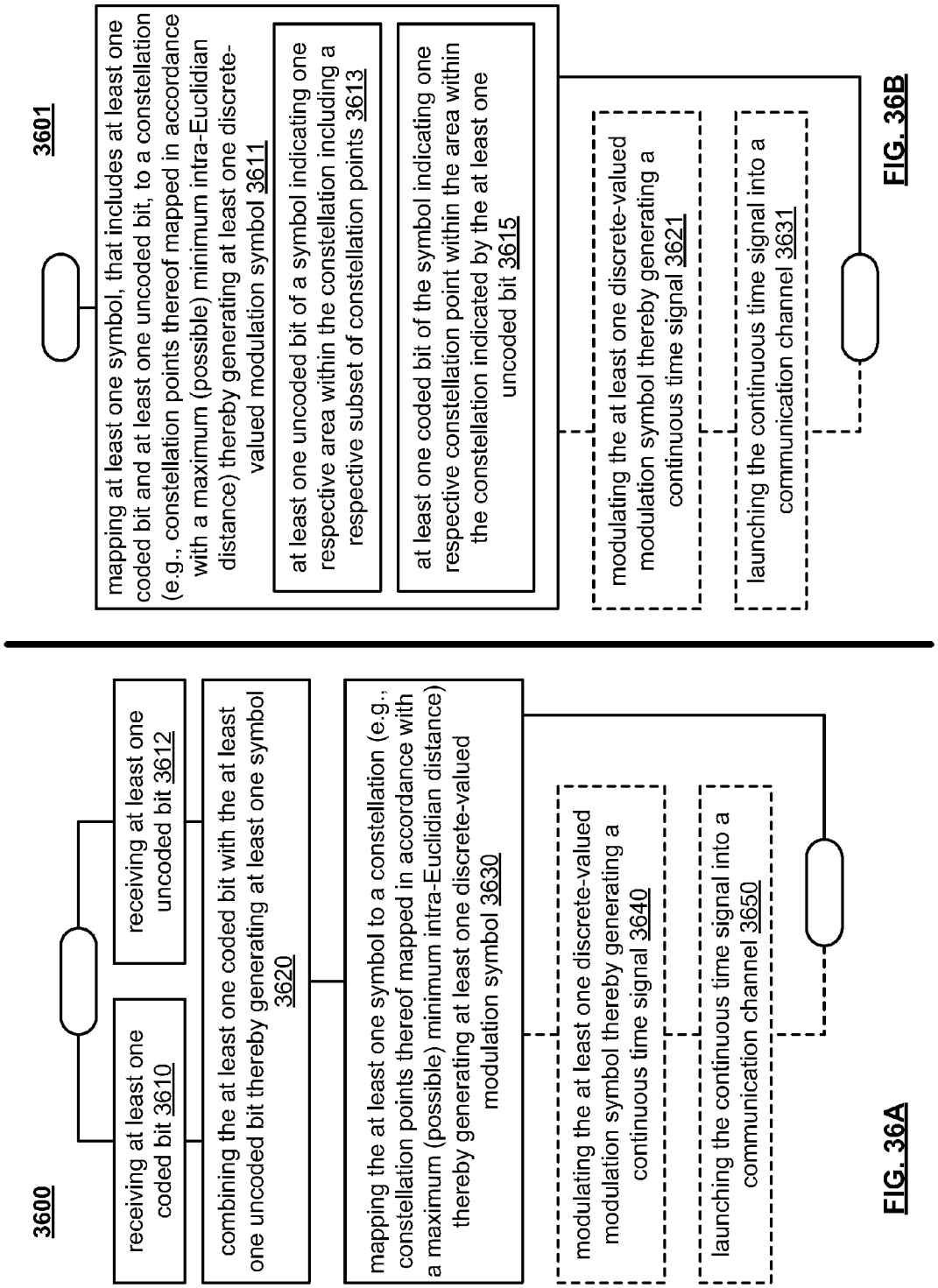

Referring to the method 3600 of FIG. 36A, the method 3600 operates by receiving at least one coded bit, as shown in a block 3610, and also by receiving at least one uncoded bit, as shown in a block 3612. In certain embodiments, the operations of the block 3610 and 3612 are performed substantially or relatively simultaneously, at the same time, in parallel with one another, etc. In other embodiments, the operations of the block 3610 and 3612 are performed successively with respect to each other, such that the operation of one of the blocks is performed before the other, such as in accordance with the serial implementation or embodiment.

The method 3600 also operates by combining the at least one coded bit with the at least one uncoded bit thereby generating at least one symbol, as shown in a block 3620. The method 3600 also operates by mapping the at least one symbol to a constellation thereby generating a sequence of discrete-valued modulation symbols, as shown a block 3630. Constellation points within the constellation are mapped in accordance with a maximum minimum intra-Euclidian distance. Again, as described with respect to other diagrams and/or embodiments, further details are included above with respect to ensuring that the constellation points of a given mapping are mapped in accordance with a maximum possible minimum intra-Euclidian distance.

In certain situations and embodiments, the method 3600 also performs at least one operation associated with modulating the at least one discrete-valued modulation symbol thereby generating a continuous time symbol, as shown in a block 3640. In certain situations and embodiments, the method 3600 also includes launching the continuous time signal in a communication channel, as shown in a block 3650.

Referring to the method 3601 of FIG. 36A, the method 3601 operates by mapping at least one symbol, that includes at least one coded that in at least one uncoded bit, to a constellation thereby generating a sequence of discrete-valued modulation symbols, as shown a block 3611. Constellation points within the constellation are mapped in accordance with a maximum minimum intra-Euclidian distance. Again, as described with respect to other diagrams and/or embodiments, further details are included above with respect to ensuring that the constellation points of a given mapping are mapped in accordance with a maximum possible minimum intra-Euclidian distance.

Also, with respect to the mapping of the constellation to which the at least one symbol is mapped, at least one uncoded bit of at least one symbol that undergoes mapping is implemented for indicating one respective area within the constellation including a respective subset of constellation points, as shown in a block 3613. For example, the constellation may be viewed as being partitioned into a number of areas such that each respective area is appropriately indicated by at least one uncoded bit of a respective symbol. In addition, at least one coded bit of the symbol is implemented for indicating one respective constellation point within the area within the constellation indicated by the at least one uncoded bit, as shown in a block 3615. Cooperatively, the at least one coded bit and the at least one uncoded bit within the symbol operate to specified the particular constellation point within the entire constellation. However, the at least one uncoded bit specifies a particular one area among a number of different areas within the constellation, and the at least one coded that specifies a particular one constellation point within that area indicated by the at least one uncoded bit.

It is also noted that while certain of various embodiments and/or diagrams herein are directed towards employing one or more uncoded bits for indicating a respective area, and one or more coded bits for indicating a respective constellation point within that area indicated by the one or more uncoded bits, the converse may alternatively be employed. For example, alternative embodiments may operate by employing one or more coded bits for indicating a respective area, and one or more uncoded bits for indicating a respective constellation point within that area indicated by the one or more coded bits. Generally speaking, various combinations may be employed such that either coded bits or uncoded bits are employed to indicate a respective area, and the other type of bits (e.g., either uncoded bits or coded bits, depending on what is employed for indicating the respective area) may be employed for indicating a respective constellation point within the area so indicated.

In certain situations and embodiments, the method 3601 also performs at least one operation associated with modulating the at least one discrete-valued modulation symbol thereby generating a continuous time symbol, as shown in a block 3621. In certain situations and embodiments, the method 3601 also includes launching the continuous time signal in a communication channel, as shown in a block 3631.

FIG. 37, FIG. 38, FIG. 39, FIG. 40, FIG. 41, and FIG. 42 illustrate even other alternative embodiments of a communication system. Subsequent respective embodiments of communication systems depict various manners by which respective symbols may be generated for subsequent symbol mapping and the modulation in accordance with generating a continuous time signal suitable for transmission via a communication channel Referring to the embodiment 3700 of FIG. 37, information bits are provided to a splitter/bit allocator. Some of the information bits are provided subsequently to LDPC encoder that is operative for encoding those particular information bits thereby generating at least one LDPC codeword or at least one group of LDPC coded bits.

Those information bits were not provided to the LDPC encoder may be generally viewed as uncoded bits. LDPC coded bits from the LDPC encoder and the uncoded bits are provided to a symbol mapper that is operative for forming symbols there from. For example, a symbol is formed using at least one of the uncoded bits and at least one of the LDPC coded bits. Also, it is noted that any desired combination, order, selection of the uncoded bits and the LDPC coded bits may be performed in accordance with forming symbols. That is to say, when forming a particular symbol, any one or more bits may be selected from the LDPC coded bits in any one or more bits may be selected from the uncoded bits. The particular one or more bits that are selected from the LDPC coded bits or the uncoded bits may be in any particular location respectively therein.

The symbol mapper is implemented to perform any desired symbol mapping which may include mapping different symbols to different modulations (i.e., constellations with respective mappings of the constellation points therein). In addition, a given shaped constellation may have at least two corresponding mappings of the constellation points therein such that any one of the various mappings is employed at a given time or for mapping a given label or symbol.

In alternative embodiments, the LDPC coded bits from the LDPC encoder and the uncoded bits are provided to an interleaver ($\pi$)/symbol mapper implemented to perform any desired combination of interleaving and symbol mapping which may symbol map different symbols to different modulations (i.e., constellations with respective mappings of the constellation points therein). In such an embodiment, the operational characteristics of the LDPC encoder in combination with the interleaver ($\pi$)/symbol mapper can be performed with any desired combination.

A modulator (e.g., which may be viewed as being an embodiment of a transmit driver) performs any necessary modification (e.g., frequency conversion, gain adjustment, filtering, etc.) to the sequence of discrete-valued modulation symbols output from the symbol mapper or the interleaver ($\pi$)/symbol mapper to generate a continuous time signal that comports with the characteristics of communication channel (e.g., including filtering, digital to analog conversion, frequency conversion, gain adjustment, etc.).

A demodulator is operative to receive the signal from the communication channel (e.g., the signal may have incurred certain deleterious effects including noise, interference, multi-path effects, etc.) and perform demodulation thereon. This may involve the calculation of certain metrics (e.g., by a metric generator) and symbol de-mapping (e.g., by a symbol de-mapper) for use in subsequent decoding. This may also generally involve any other demodulation function including filtering, analog to digital conversion, frequency conversion, gain adjustment, etc.

After undergoing the demodulation operations, in embodiments that include the interleaver ($\pi$)/symbol mapper, the bit sequence generated by the demodulator undergoes de-interleaving in de-interleaver ($\pi^{-1}$). After undergoing the demodulation operations, in embodiments that include the symbol de-mapper, at least some of the bit sequence generated by the demodulator is provided to an LDPC decoder, and at least some of the bit sequence provided to a bit combiner.

The LDPC decoder is implemented to decode those particular portions of the bit sequence output from the demodulator or the de-interleaver ($\pi^{-1}$) that correspond to the LDPC coded bits referred to above to generate estimates of the original information bits that were initially provided to the splitter/bit allocator. Those particular portions of the bit sequence output from the demodulator or the de-interleaver ($\pi^{-1}$) that correspond to the uncoded bits may be provided directly to the splitter/bit allocator. However, in certain embodiments, information corresponding to those portions of the bit sequence that correspond to the uncoded bits may be used to assist in the decoding being performed by the LDPC decoder.

Figure 37:
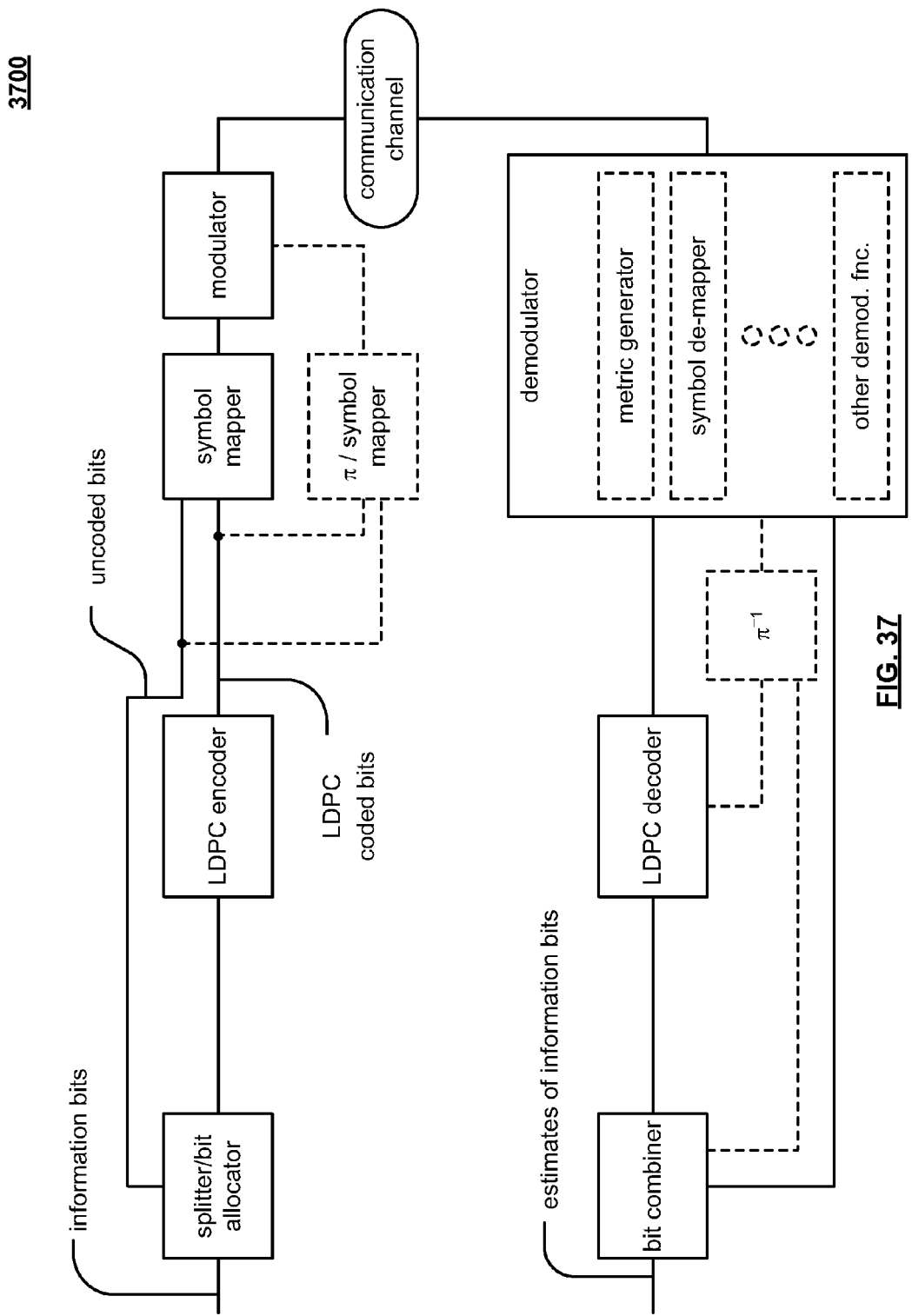
FIG. 37, FIG. 38, FIG. 39, FIG. 40, FIG. 41, and FIG. 42 illustrate even other alternative embodiments of a communication system.
Figure 38:
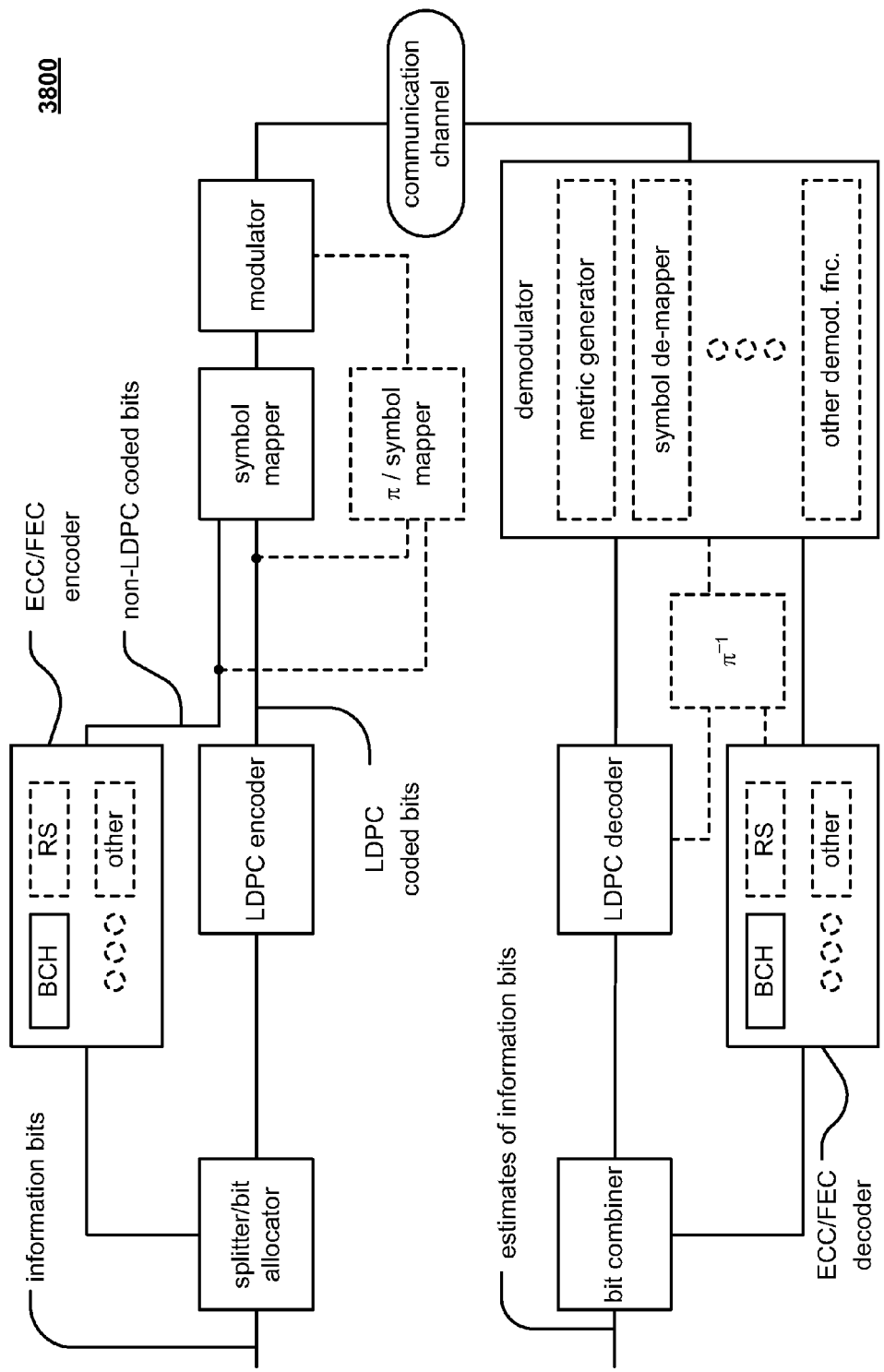

Referring to the embodiment 3800 of FIG. 38, this diagram has some similarities to the previous diagram with at least one difference being that an ECC/FEC encoder is placed in the path of the uncoded bits output from the splitter/bit allocator of the previous diagram. Generally speaking, the coded bits output from the ECC/FEC encoder may be referred to as non-LDPC coded bits. The operation and characteristics of the architecture of the embodiment 3800 are analogous to the previous embodiment 3700 of FIG. 37 with at least one difference being that the uncoded bits are replaced with non-LDPC coded bits, such as those which have been generated by the ECC/FEC encoder. Analogously, an ECC/FEC decoder is implemented within a receiver architecture to accommodate the ECC/FEC encoding that is performed by the ECC/FEC encoder in accordance with generating the non-LDPC coded bits. In accordance with the embodiment 3800 of this diagram, instead of forming symbols using LDPC coded bits and uncoded bits as is performed in the embodiment 3700 of FIG. 37, symbols are instead formed using LDPC coded bits as well as the non-LDPC coded bits that are generated by the ECC/FEC encoder.

Generally speaking, any desired one or more ECC/FEC may be employed by the ECC/FEC encoder. For example, in one particular embodiment, BCH (Bose and Ray-Chaudhuri coding is employed in accordance with generating the non-LDPC coded bits. In another embodiment, Reed-Solomon (RS) coding is employed in accordance with generating the non-LDPC coded bits. In even another embodiment, convolutional coding is employed in accordance with generating the non-LDPC coded bits. Generally, any desired ECC/FEC may be employed within the ECC/FEC encoder.

As few as one ECC/FEC coding may be employed by the ECC/FEC encoder. However, if desired, more than one ECC/FEC coding can be employed in a variety of ways. For example, in one embodiment, different respective ECC/FEC codings may be employed to respectively encode different subsets of the respective bits provided to the ECC/FEC encoder from the splitter/bit allocator. In another embodiment, different respective ECC/FEC codings may be implemented in a concatenated manner such that all of bits provided to the ECC/FEC encoder from the splitter/bit allocator first undergoing coding in accordance with a first ECC/FEC coding thereby generating first coded bits, then those first coded bits undergoing coding in accordance with a second ECC/FEC coding thereby generating second coded bits, etc.

Figure 39:
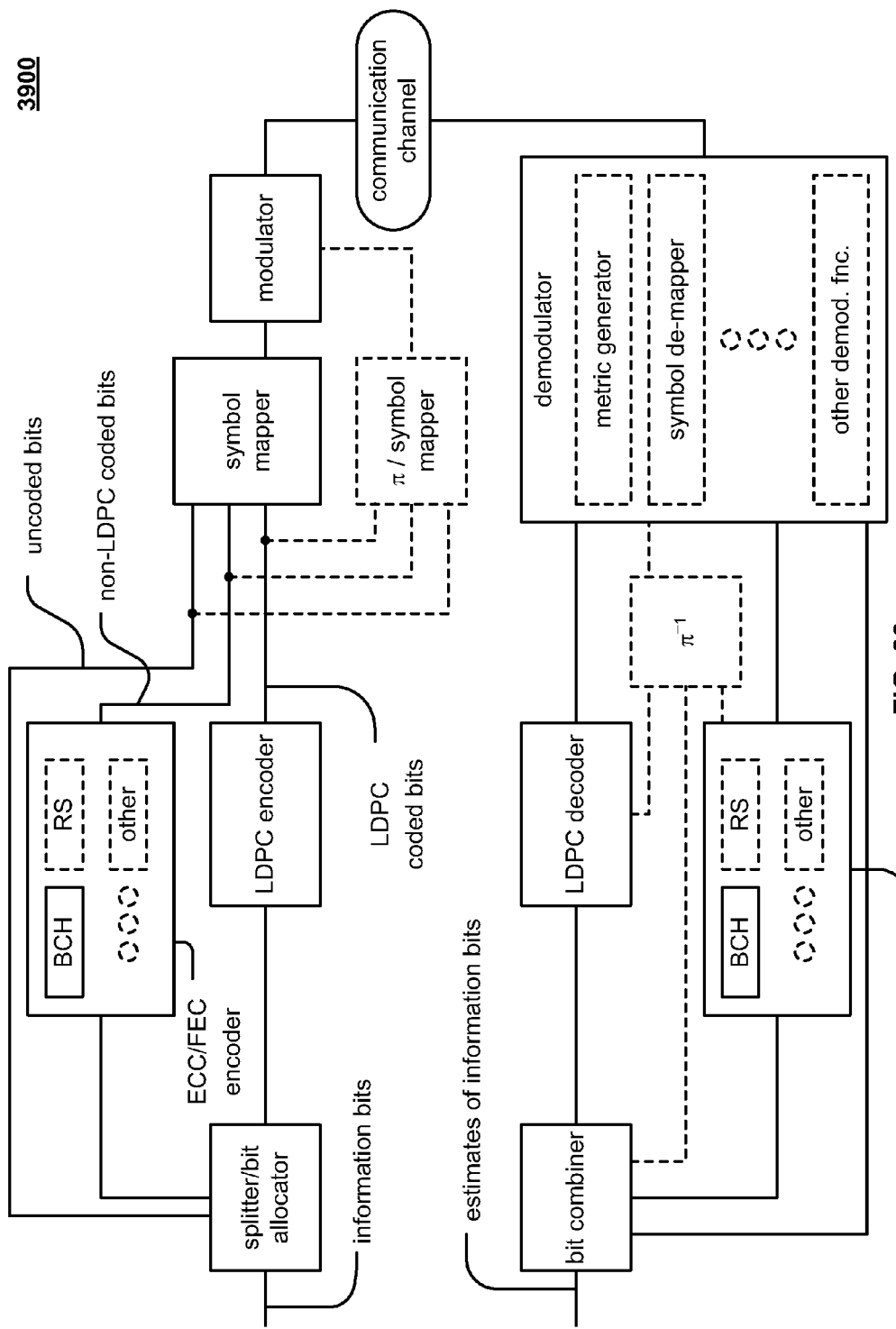

Referring to the embodiment 3900 of FIG. 39, this diagram has some similarities to the previous diagrams with at least one difference being that not only is an ECC/FEC encoder is placed in one of the paths from the splitter/bit allocator, but also a dedicated uncoded bit path is provided from the splitter/bit allocator. In this embodiment as with respect others, the coded bits output from the ECC/FEC encoder may be referred to as non-LDPC coded bits. The operation and characteristics of the architecture of this embodiment 3900 have some similarities to the previous embodiments with at least one difference being that the uncoded bits, non-LDPC coded bits (e.g., those which are output from the ECC/FEC encoder), as well as LDPC coded bits output from the LDPC encoder are all respectively provided to the symbol mapper.

Appropriately, an ECC/FEC decoder is implemented within a receiver architecture to accommodate the ECC/FEC encoding that is performed by the ECC/FEC encoder in accordance with generating the non-LDPC coded bits. In accordance with the embodiment 3800 of this diagram, instead of forming symbols using LDPC coded bits and uncoded bits as is performed in the embodiment 3700 of FIG. 37, and also instead of forming symbols using LDPC coded bits and non-LDPC coded bits (e.g., those which are output from the ECC/FEC encoder) as is performed in the embodiment 3800 of FIG. 38, symbols are instead formed using LDPC coded bits, the non-LDPC coded bits (e.g., those which are generated by and output from the ECC/FEC encoder), and uncoded bits in the embodiment 3900.

Figure 40:
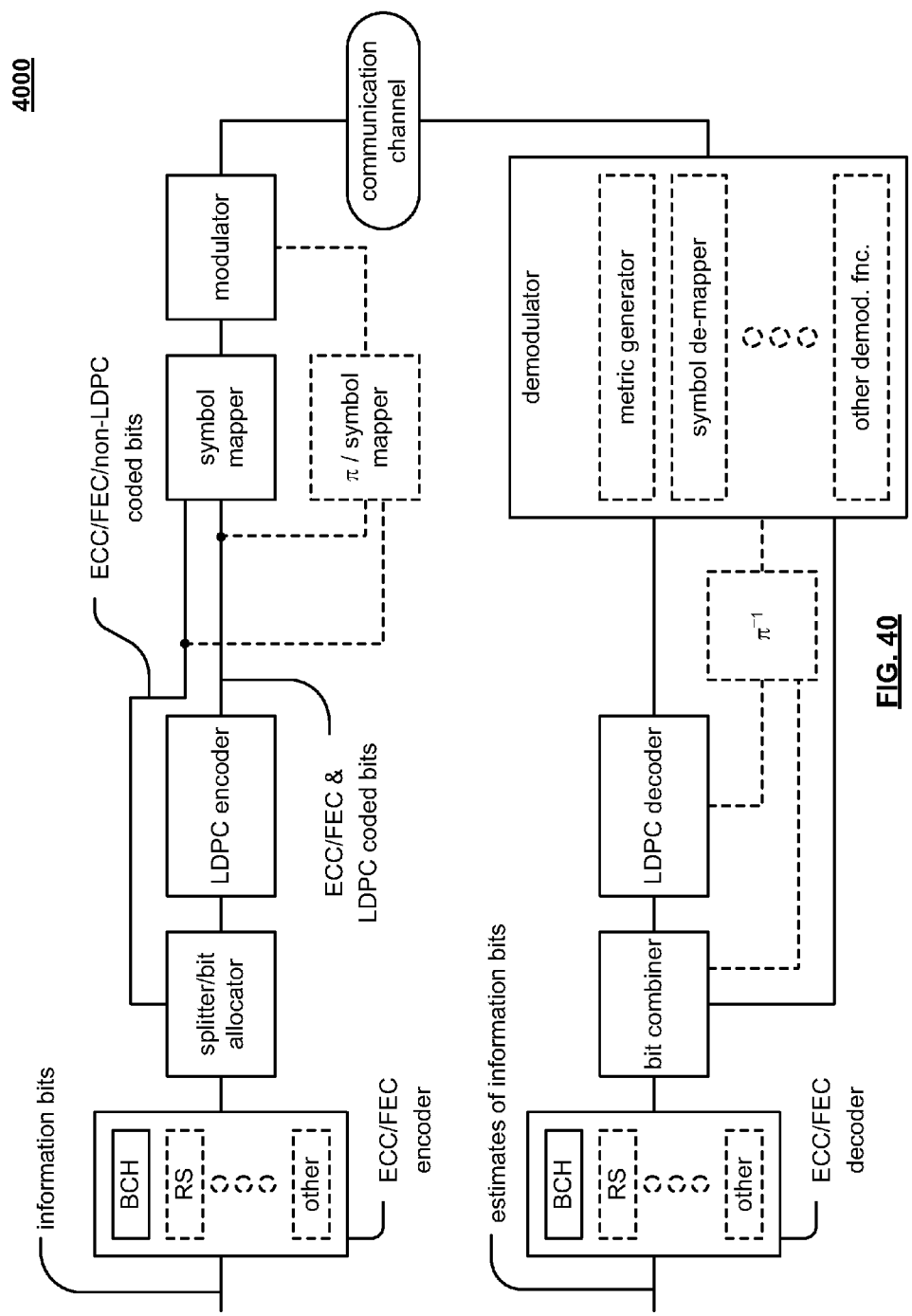

Referring to the embodiment 4000 of FIG. 40, this diagram has some similarities to the embodiment 3700 of the FIG. 37 with at least one difference being that an ECC/FEC encoder is implemented before the splitter/bit allocator in a transmitter device at one of the communication channel, and an ECC/FEC decoder is implemented after the bit combiner in a receiver device at the other end of the communication channel. As such, symbols are formed in this diagram using coded bits from a first path that involves both ECC/FEC encoding as well as LDPC encoding and a second path that involves only ECC/FEC encoding (e.g., the ECC/FEC/non-LDPC coded bits). While all of the information bits undergo ECC/FEC encoding within the ECC/FEC encoder, the coded bits output from the ECC/FEC encoder undergo partitioning by the splitter/bit allocator via to respective paths: one path which provided to the LDPC encoder and another path which is provided to the symbol mapper.

In this as well as other embodiments and/or diagrams herein, any desired one or more ECC/FEC may be employed by the ECC/FEC encoder. For example, in one particular embodiment, BCH (Bose and Ray-Chaudhuri coding is employed in accordance with generating the non-LDPC coded bits. In another embodiment, Reed-Solomon (RS) coding is employed in accordance with generating the non-LDPC coded bits. In even another embodiment, convolutional coding is employed in accordance with generating the non-LDPC coded bits. Generally, any desired ECC/FEC may be employed within the ECC/FEC encoder.

As few as one ECC/FEC coding may be employed by the ECC/FEC encoder. However, if desired, more than one ECC/FEC coding can be employed in a variety of ways. For example, in one embodiment, different respective ECC/FEC codings may be employed to respectively encode different subsets of the respective bits provided to the ECC/FEC encoder from the splitter/bit allocator. In another embodiment, different respective ECC/FEC codings may be implemented in a concatenated manner such that all of bits provided to the ECC/FEC encoder from the splitter/bit allocator first undergoing coding in accordance with a first ECC/FEC coding thereby generating first coded bits, then those first coded bits undergoing coding in accordance with a second ECC/FEC coding thereby generating second coded bits, etc.

Figure 41:
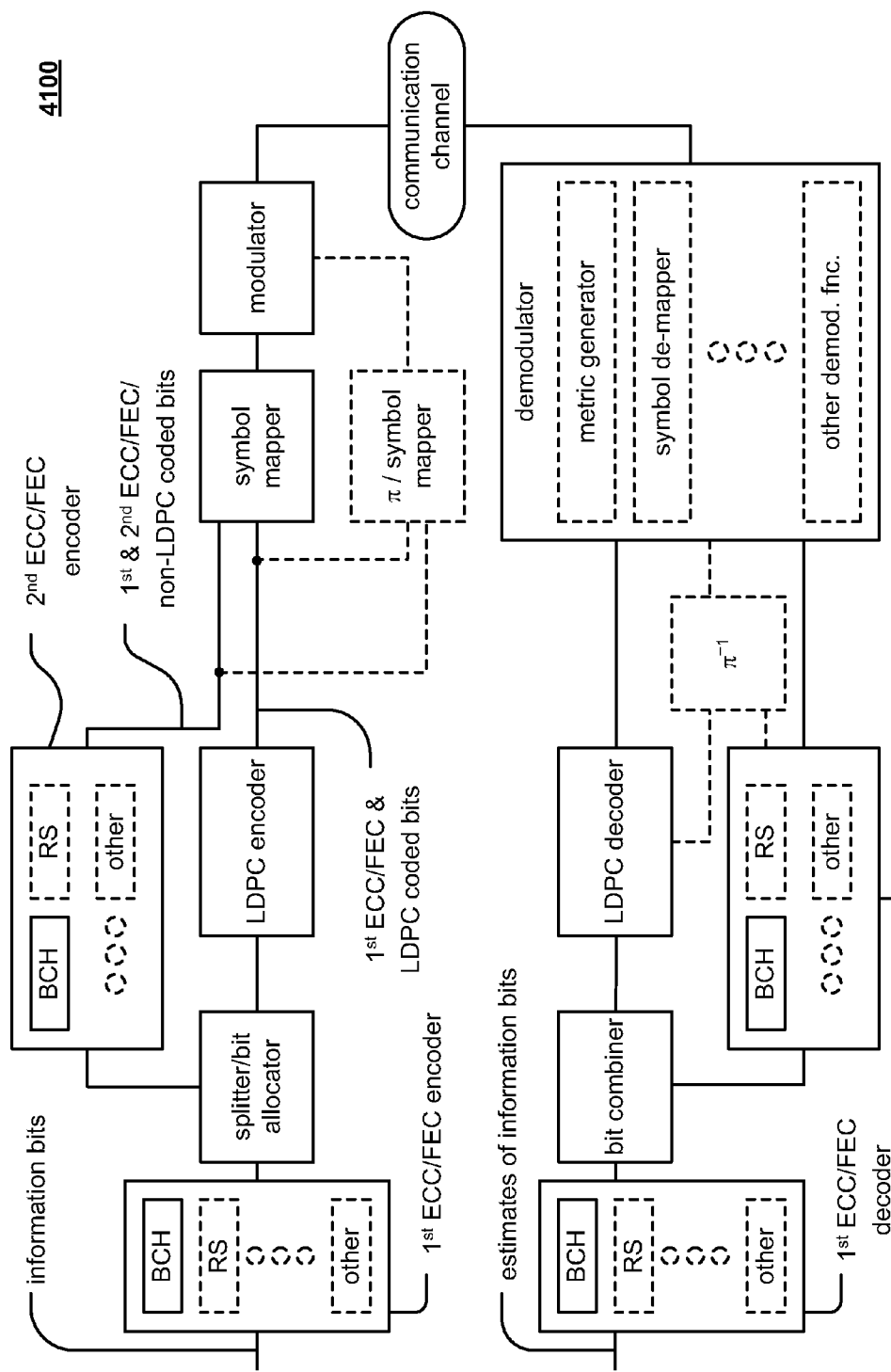

Referring to the embodiment 4100 of FIG. 41, this diagram has some similarities to the embodiment 3800 of the FIG. 38 with at least one difference being that an ECC/FEC encoder is implemented before the splitter/bit allocator in a transmitter device at one of the communication channel, and an ECC/FEC decoder is implemented after the bit combiner in a receiver device at the other end of the communication channel. As can be seen with respect to this diagram, there are two respective ECC/FEC encoders and two respective ECC/FEC decoders.

As such, symbols are formed in this diagram using coded bits from a first path that involves both the $1^{st}$ ECC/FEC encoding as well as LDPC encoding and coded bits from a second path that involves both the $1^{st}$ ECC/FEC encoding as well as the $2^{nd}$ ECC/FEC encoding (e.g., the $1^{st}$ & $2^{nd}$ ECC/FEC/non-LDPC coded bits). While all of the information bits undergo ECC/FEC encoding within the $1^{st}$ ECC/FEC encoder, the coded bits output from the $1^{st}$ ECC/FEC encoder undergo partitioning by the splitter/bit allocator via to respective paths: one path which provided to the LDPC encoder and another path which is provided to the $2^{nd}$ ECC/FEC encoder. The outputs from the LDPC encoder and the $2^{nd}$ ECC/FEC encoder are provided to the symbol mapper.

The comments made above with respect to the various and optional implementations of an ECC/FEC encoder and ECC/FEC decoder apply equally to both the $1^{st}$ ECC/FEC encoder and decoder as well as the $2^{nd}$ ECC/FEC encoder and decoder of this diagram.

Figure 42:
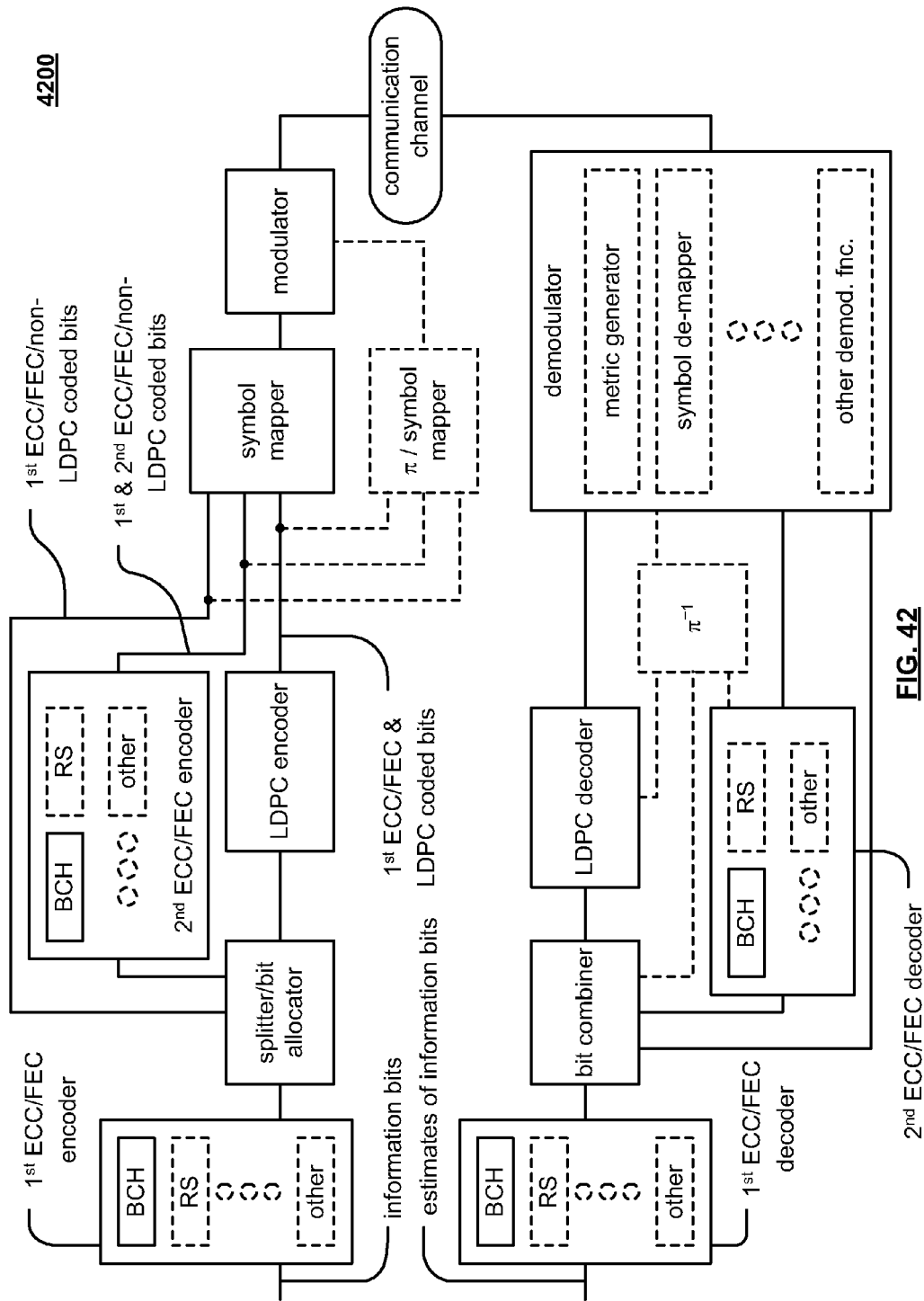

Referring to the embodiment 4200 of FIG. 42, this diagram has some similarities to the embodiment 3900 of the FIG. 39 with at least one difference being that an ECC/FEC encoder is implemented before the splitter/bit allocator in a transmitter device at one of the communication channel, and an ECC/FEC decoder is implemented after the bit combiner in a receiver device at the other end of the communication channel. As can be seen with respect to this diagram, there are two respective ECC/FEC encoders and two respective ECC/FEC decoders.

As such, symbols are formed in this diagram using coded bits from a first path that involves both the $1^{st}$ ECC/FEC encoding as well as LDPC encoding, coded bits from a second path that involves both the $1^{st}$ ECC/FEC encoding as well as the $2^{nd}$ ECC/FEC encoding (e.g., the $1^{st}$ & $2^{nd}$ ECC/FEC/non-LDPC coded bits), as well as coded bits from a third path that involves the $1^{st}$ ECC/FEC encoding. While all of the information bits undergo ECC/FEC encoding within the $1^{st}$ ECC/FEC encoder, the coded bits output from the $1^{st}$ ECC/FEC encoder undergo partitioning by the splitter/bit allocator via to respective paths: a first path which provided to the LDPC encoder, a second path which is provided to the $2^{nd}$ ECC/FEC encoder, and a third path which does not undergo any additional encoding. The outputs from the LDPC encoder and the $2^{nd}$ ECC/FEC encoder are provided to the symbol mapper.

The comments made above with respect to the various and optional implementations of an ECC/FEC encoder and ECC/FEC decoder apply equally to both the $1^{st}$ ECC/FEC encoder and decoder as well as the $2^{nd}$ ECC/FEC encoder and decoder of this diagram.

Figure 43:
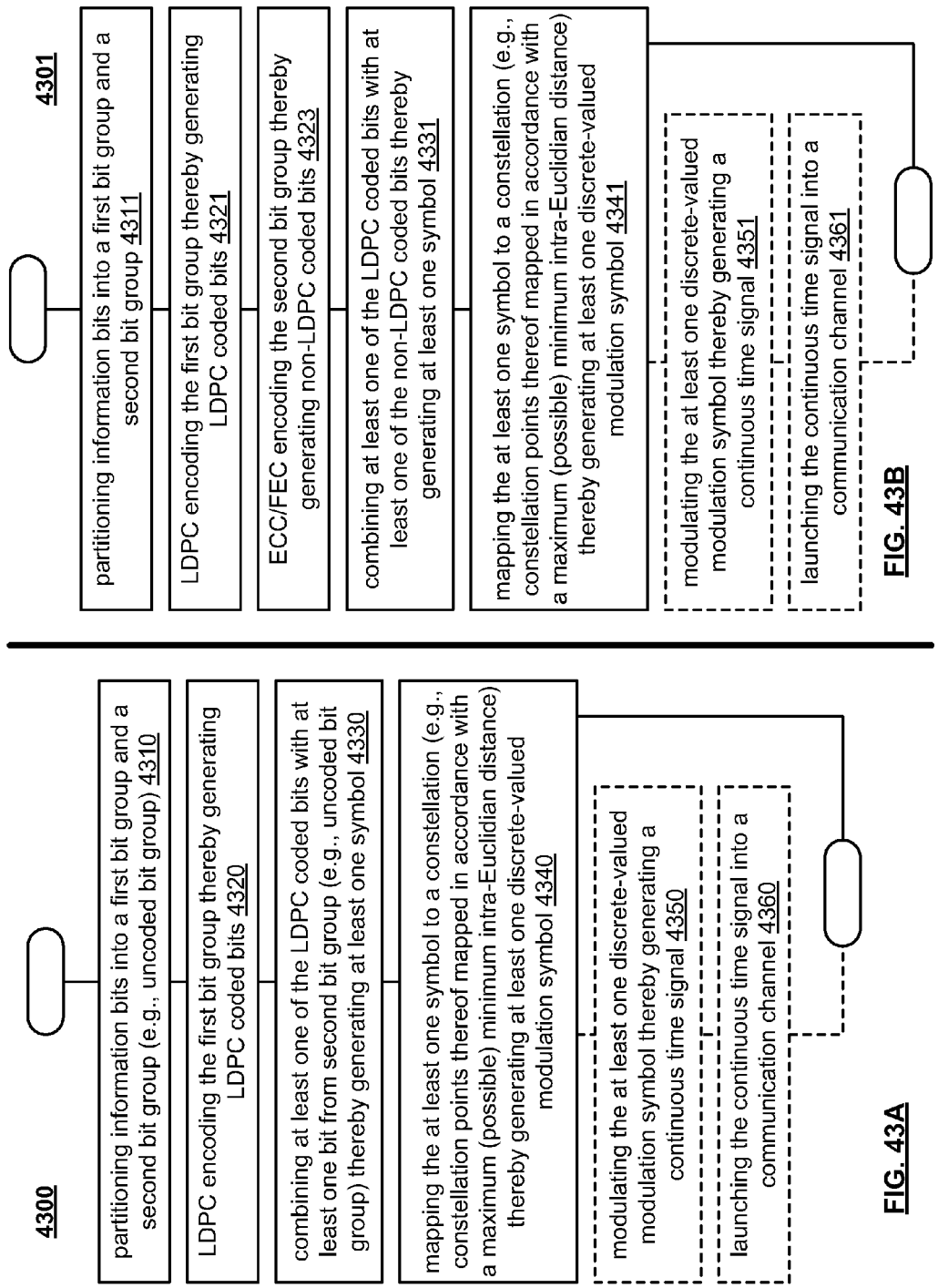
FIG. 43A, FIG. 43B, and FIG. 44 are diagrams illustrating even other embodiments of various methods as may be performed within one or more communication devices.
Figure 44:
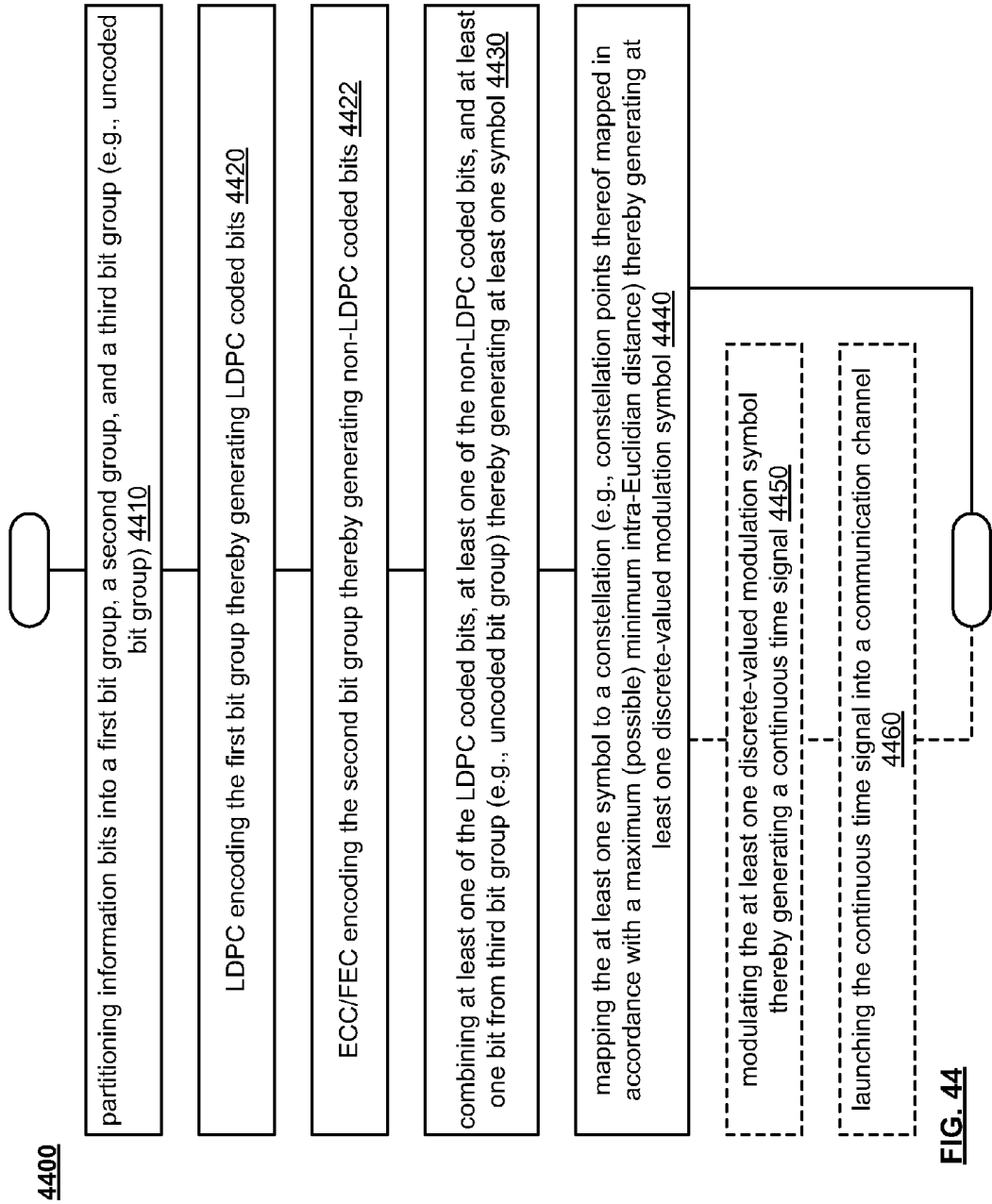

FIG. 43A, FIG. 43B, and FIG. 44 are diagrams illustrating even other embodiments of various methods as may be performed within one or more communication devices.

Referring to the method 4300 of FIG. 43A, the method 4300 operates by partitioning information bits into a first bit group and the second bit group, as shown in a block 4310. In certain embodiments, the second bit group is implemented as an uncoded bit group. The method 4300 then operates by performing LDPC encoding on the first bit group thereby generating LDPC coded bits, as shown in a block 4320. The method 4300 then operates by combining at least one of the LDPC coded bits with at least one bit from the second group thereby generating at least one symbol, as shown in a block 4330.

The method 4300 also operates by mapping the at least one symbol to a constellation thereby generating a sequence of discrete-valued modulation symbols, as shown a block 4340. Constellation points within the constellation are mapped in accordance with a maximum minimum intra-Euclidian distance. Again, as described with respect to other diagrams and/or embodiments, further details are included above with respect to ensuring that the constellation points of a given mapping are mapped in accordance with a maximum possible minimum intra-Euclidian distance.

In certain situations and embodiments, the method 4300 also performs at least one operation associated with modulating the at least one discrete-valued modulation symbol thereby generating a continuous time symbol, as shown in a block 4350. In certain situations and embodiments, the method 4300 also includes launching the continuous time signal in a communication channel, as shown in a block 4360.

Referring to the method 4301 of FIG. 43B, the method 4301 operates by partitioning information bits into a first bit group and a second bit group, as shown in a block 4311. The method 4301 continues by performing LDPC encoding on the first bit group thereby generating LDPC coded bits, as shown in a block 4321. The method 4301 operates by performing ECC/FEC encoding on the second bit group thereby generating non-LDPC coded bits, as shown in a block 4323. It is noted that these non-LDPC coded bits are in fact themselves coded bits, but have been generated using a different code, specifically, an ECC/FEC that is not an LDPC code. The method 4301 then operates by combining at least one of the LDPC coded bits with at least one of the non-LDPC coded bits thereby generating at least one symbol, as shown in a block 4331.

The method 4301 also operates by mapping the at least one symbol to a constellation thereby generating a sequence of discrete-valued modulation symbols, as shown a block 4341. Constellation points within the constellation are mapped in accordance with a maximum minimum intra-Euclidian distance. Again, as described with respect to other diagrams and/or embodiments, further details are included above with respect to ensuring that the constellation points of a given mapping are mapped in accordance with a maximum possible minimum intra-Euclidian distance.

In certain situations and embodiments, the method 4301 also performs at least one operation associated with modulating the at least one discrete-valued modulation symbol thereby generating a continuous time symbol, as shown in a block 4351. In certain situations and embodiments, the method 4300 also includes launching the continuous time signal in a communication channel, as shown in a block 4361.

Referring to the method 4400 of FIG. 44, the method 4400 operates by partitioning information bits into three respective groups, namely, a first big group, a second bit group, and a third big group, as shown in a block 4410. In certain embodiments, the third bit group is implemented as an uncoded bit group. The method 4400 then operates by performing LDPC encoding on the first bit group thereby generating LDPC coded bits, as shown in a block 4420. The method 4400 also operates by performing ECC/FEC encoding on the second bit group thereby generating non-LDPC coded bits, as shown in a block 4422. It is noted that these non-LDPC coded bits are in fact themselves coded bits, but have been generated using a different code, specifically, an ECC/FEC that is not an LDPC code. The method 4401 then operates by combining at least one of the LDPC coded bits, at least one of the non-LDPC coded bits, and at least one bit from the third group (e.g., from an uncoded bit group) thereby generating at least one symbol, as shown in a block 4430.

The method 4400 also operates by mapping the at least one symbol to a constellation thereby generating a sequence of discrete-valued modulation symbols, as shown a block 4440. Constellation points within the constellation are mapped in accordance with a maximum minimum intra-Euclidian distance. Again, as described with respect to other diagrams and/or embodiments, further details are included above with respect to ensuring that the constellation points of a given mapping are mapped in accordance with a maximum possible minimum intra-Euclidian distance.

In certain situations and embodiments, the method 4400 also performs at least one operation associated with modulating the at least one discrete-valued modulation symbol thereby generating a continuous time symbol, as shown in a block 4450. In certain situations and embodiments, the method 4400 also includes launching the continuous time signal in a communication channel, as shown in a block 4460.

It is also noted that the various operations and functions as described with respect to various methods herein may be performed within a communication device, such as within either of the devices 110 and 120 as within FIG. 1, within a transmitter 297 as within FIG. 2, within a communication device including a symbol mapper 320*a* as within FIG. 3, and/or generally within any communication device operative to perform mapping of labels (e.g., a group of this), symbols, etc. to a constellation having a mapping of the respective consolation points therein being mapped such that there is a (relatively) maximum minimum intra-Euclidean distance between the respective constellation points. Such mapping may generally be described as operative to generate a sequence of discrete-valued modulation symbols. The sequence of discrete-valued modulation symbols may then subsequently undergo modulation of any of a number of different operations (e.g., digital to analog conversion as within a digital to analog converter (DAC), scaling, frequency shifting, filtering, etc.) to generate a continuous time signal for transmission via a communication channel. Such a device operative to perform including such functionality, circuitry, capability, etc., may be implemented to be operative within any desired communication system (e.g., satellite, wireless, wired, fiber-optic, and/or combination thereof, etc.).

In some embodiments, one or more modules, circuitries, functional blocks, etc. (which may be implemented in the same device or separate devices) can perform such processing to generate a sequence of discrete-valued modulation symbols and/or a continuous time signal for transmission using at least one of any number of radios, analog front ends (AFEs), transmit drivers, antennae, and/or other components, etc. to another communication device (e.g., which also may include at least one of any number of radios, analog front ends (AFEs), transmit drivers, antennae, and/or other components etc.) in accordance with various aspects of the invention, and/or any other operations and functions as described herein, etc. or their respective equivalents. In some embodiments, such processing is performed cooperatively by a first one or more modules, circuitries, functional blocks, etc. within a first device, and also by a second one or more modules, circuitries, functional blocks, etc. within a second device. In other embodiments, such processing is performed wholly by one or more modules, circuitries, functional blocks, etc. within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   a low density parity check (LDPC) encoder configured to encode at least one information bit, of a plurality of information bits, to generate a plurality of LDPC coded bits;
   a symbol mapper configured to map a plurality of symbols to a constellation having a mapping of a plurality of constellation points mapped based on a maximum minimum intra-Euclidean distance there between to generate a sequence of discrete-valued modulation symbols; and
   a modulator configured to process the sequence of discrete-valued modulation symbols to generate a continuous time signal for transmission via a communication channel, wherein:
   the constellation including a plurality of areas such that each of the plurality of areas including a respective, corresponding subset of the plurality of constellation points;
   a first of the plurality of symbols including a first at least one uncoded bit, selected from the plurality of information bits, and a first at least one of the plurality of LDPC coded bits cooperatively corresponding to a first of the plurality of constellation points;
   the first at least one uncoded bit corresponding to a first of the plurality of areas;
   the first at least one coded bit corresponding to a respective one constellation point within a first corresponding subset of the plurality of constellation points;
   a second of the plurality of symbols including a second at least one uncoded bit, selected from the plurality of information bits, and a second at least one of the plurality of LDPC coded bits cooperatively corresponding to a second of the plurality of constellation points;

the second at least one uncoded bit corresponding to a second of the plurality of areas; and the second at least one coded bit corresponding to a respective one constellation point within a second corresponding subset of the plurality of constellation points.

2. The apparatus of claim 1, wherein:

the second at least one uncoded bit having a same value as the first at least one uncoded bit; and the second of the plurality of areas being the first of the plurality of areas.

3. The apparatus of claim 1, wherein uncoded bit mapping of a first subset of the plurality of constellation points within a first of the plurality of areas being same as uncoded bit mapping of a second subset of the plurality of constellation points within a second of the plurality of areas.

4. The apparatus of claim 1, further comprising:

a communication device operative within at least one of a satellite communication system, a wireless communication system, a wired communication system, and a fiber-optic communication system.

5. An apparatus comprising:

a symbol mapper configured to map a plurality of symbols to a constellation having a mapping of a plurality of constellation points mapped based on a maximum minimum intra-Euclidean distance there between to generate a sequence of discrete-valued modulation symbols, wherein one of the plurality of symbols includes at least one uncoded bit and at least one coded bit, wherein the at least one uncoded bit specifies one of a plurality of areas that includes one subset of a plurality of subsets of the plurality of constellation points, and wherein the at least one coded bit specifies one constellation point in the one subset of a plurality of subsets of the plurality of constellation points; and a modulator configured to process the discrete sequence of discrete-valued modulation symbols to generate a continuous time signal for transmission via a communication channel.

6. The apparatus of claim 5, wherein:

each of the plurality of symbols respectively including at least one respective uncoded bit and at least one respective coded bit cooperatively corresponding to a respective one of the plurality of constellation points;

the constellation including a plurality of areas such that each of the plurality of areas including a respective subset of the plurality of constellation points;

the at least one respective uncoded bit corresponding to a respective one area of the plurality of areas; and the at least one respective coded bit corresponding to a respective one constellation point within the respective subset of the plurality of constellation points.

7. The apparatus of claim 5, wherein:

the constellation including a plurality of areas such that each of the plurality of areas including a respective, corresponding subset of the plurality of constellation points;

a first of the plurality of symbols including a first at least one uncoded bit and a first at least one coded bit cooperatively corresponding to a first of the plurality of constellation points;

the first at least one uncoded bit corresponding to a first of the plurality of areas;

the first at least one coded bit corresponding to a respective one constellation point within a first corresponding subset of the plurality of constellation points;

a second of the plurality of symbols including a second at least one uncoded bit and a second at least one coded bit cooperatively corresponding to a second of the plurality of constellation points;

the second at least one uncoded bit corresponding to a second of the plurality of areas; and the second at least one coded bit corresponding to a respective one constellation point within a second corresponding subset of the plurality of constellation points.

8. The apparatus of claim 5, wherein:

the constellation including a plurality of areas such that each of the plurality of areas including a respective, corresponding subset of the plurality of constellation points;

a first of the plurality of symbols including at least one uncoded bit and a first at least one coded bit cooperatively corresponding to a first of the plurality of constellation points;

the at least one uncoded bit corresponding to a respective one of the plurality of areas;

the first at least one coded bit corresponding to a first constellation point within a respective one subset of the plurality of constellation points;

a second of the plurality of symbols including the at least one uncoded bit, corresponding to the respective one of the plurality of areas, and a second at least one coded bit cooperatively corresponding to a second of the plurality of constellation points; and the second at least one coded bit corresponding to a second constellation point within the respective one subset of the plurality of constellation points.

9. The apparatus of claim 7, wherein:

the second at least one uncoded bit having a same value as the first at least one uncoded bit; and the second of the plurality of areas being the first of the plurality of areas.

10. The apparatus of claim 5, wherein:

uncoded bit mapping of a first subset of the plurality of constellation points within a first of the plurality of areas being same as uncoded bit mapping of a second subset of the plurality of constellation points within a second of the plurality of areas.

11. The apparatus of claim 5, further comprising:

a low density parity check (LDPC) encoder configured to encode at least one information bit to generate at least one codeword including the plurality of symbols.

12. The apparatus of claim 5, further comprising:

an outer code encoder configured to encode at least one information bit to generate the plurality of encoded bits; and a low density parity check (LDPC) encoder configured to encode the plurality of encoded bits to generate at least one codeword including the plurality of symbols.

13. The apparatus of claim 12, further comprising:

the outer code encoder configured to perform at least one of BCH (Bose and Ray-Chaudhuri coding, Reed-Solomon (RS) coding, interleaved RS coding, convolutional coding, turbo coding, turbo trellis coded modulation (TTCM) coding, and LDPC (Low Density Parity Check) coding.

14. The apparatus of claim 5, further comprising:

a Reed-Solomon (RS) encoder configured to encode at least one information bit based on an interleaved RS code to generate at least one RS codeword including a plurality of encoded bits; and a low density parity check (LDPC) encoder configured to encode the plurality of encoded bits to generate at least one codeword including the plurality of symbols.

15. The apparatus of claim 5, further comprising:
a communication device operative within at least one of a satellite communication system, a wireless communication system, a wired communication system, and a fiber-optic communication system.

16. A method for execution by a communication device, the method comprising:
operating a symbol mapper for mapping a plurality of symbols to a constellation having a mapping of a plurality of constellation points mapped based on a maximum minimum intra-Euclidean distance there between to generate a sequence of discrete-valued modulation symbols, wherein one of the plurality of symbols includes at least one uncoded bit and at least one coded bit, wherein the at least one uncoded bit specifies one of a plurality of areas that includes one subset of a plurality of subsets of the plurality of constellation points, and wherein the at least one coded bit specifies one constellation point in the one subset of a plurality of subsets of the plurality of constellation points; and
operating a modulator for processing the sequence of discrete-valued modulation symbols to generate a continuous time signal for transmission via a communication channel.

17. The method of claim 16, wherein:
each of the plurality of symbols respectively including at least one respective uncoded bit and at least one respective coded bit cooperatively corresponding to a respective one of the plurality of constellation points;
the constellation including a plurality of areas such that each of the plurality of areas including a respective subset of the plurality of constellation points;
the at least one respective uncoded bit corresponding to a respective one area of the plurality of areas; and
the at least one respective coded bit corresponding to a respective one constellation point within the respective subset of the plurality of constellation points.

18. The method of claim 16, wherein:
the constellation including a plurality of areas such that each of the plurality of areas including a respective, corresponding subset of the plurality of constellation points;
a first of the plurality of symbols including a first at least one uncoded bit and a first at least one coded bit cooperatively corresponding to a first of the plurality of constellation points;
the first at least one uncoded bit corresponding to a first of the plurality of areas;
the first at least one coded bit corresponding to a respective one constellation point within a first corresponding subset of the plurality of constellation points;
a second of the plurality of symbols including a second at least one uncoded bit and a second at least one coded bit cooperatively corresponding to a second of the plurality of constellation points;
the second at least one uncoded bit corresponding to a second of the plurality of areas; and the second at least one coded bit corresponding to a respective one constellation point within a second corresponding subset of the plurality of constellation points.

19. The method of claim 16, wherein:
the constellation including a plurality of areas such that each of the plurality of areas including a respective, corresponding subset of the plurality of constellation points;
a first of the plurality of symbols including at least one uncoded bit and a first at least one coded bit cooperatively corresponding to a first of the plurality of constellation points;
the at least one uncoded bit corresponding to a respective one of the plurality of areas;
the first at least one coded bit corresponding to a first constellation point within a respective one subset of the plurality of constellation points;
a second of the plurality of symbols including the at least one uncoded bit, corresponding to the respective one of the plurality of areas, and a second at least one coded bit cooperatively corresponding to a second of the plurality of constellation points; and
the second at least one coded bit corresponding to a second constellation point within the respective one subset of the plurality of constellation points.

20. The method of claim 18, wherein:
the second at least one uncoded bit having a same value as the first at least one uncoded bit; and
the second of the plurality of areas being the first of the plurality of areas.

21. The method of claim 16, wherein uncoded bit mapping of a first subset of the plurality of constellation points within a first of the plurality of areas being same as uncoded bit mapping of a second subset of the plurality of constellation points within a second of the plurality of areas.

22. The method of claim 16, further comprising:
low density parity check (LDPC) encoding at least one information bit to generate at least one codeword including the plurality of symbols.

23. The method of claim 16, further comprising:
outer code encoder encoding at least one information bit to generate the plurality of encoded bits; and
low density parity check (LDPC) encoding the plurality of encoded bits to generate at least one codeword including the plurality of symbols.

24. The method of claim 23, wherein the outer code encoder being for performing at least one of BCH (Bose and Ray-Chaudhuri coding, Reed-Solomon (RS) coding, interleaved RS coding, convolutional coding, turbo coding, turbo trellis coded modulation (TTCM) coding, and LDPC (Low Density Parity Check) coding.

25. The method of claim 16, further comprising:
Reed-Solomon (RS) encoding at least one information bit based on an interleaved RS code to generate at least one RS codeword including a plurality of encoded bits; and
low density parity check (LDPC) encoding the plurality of encoded bits to generate at least one codeword including the plurality of symbols.

26. The method of claim 16, wherein the communication device is operative within at least one of a satellite communication system, a wireless communication system, a wired communication system, and a fiber-optic communication system.

* * * * *